US012732744B2

(12) United States Patent
Zhang et al.

(10) Patent No.: US 12,732,744 B2
(45) Date of Patent: Sep. 8, 2026

(54) ACOUSTIC OUTPUT DEVICES

(71) Applicant: SHENZHEN SHOKZ CO., LTD., Shenzhen (CN)

(72) Inventors: Lei Zhang, Shenzhen (CN); Zhen Wang, Shenzhen (CN); Liwei Wang, Shenzhen (CN); Peigeng Tong, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 446 days.

(21) Appl. No.: 18/313,354

(22) Filed: May 7, 2023

(65) Prior Publication Data

US 2023/0276166 A1 Aug. 31, 2023

Related U.S. Application Data

(63) Continuation of application No. PCT/CN2021/095546, filed on May 24, 2021.

(30) Foreign Application Priority Data

Apr. 9, 2021 (CN) ........................ 202110383452.2

(51) Int. Cl.
*H04R 1/28* (2006.01)
*H04R 1/02* (2006.01)
(Continued)

(52) U.S. Cl.
CPC ........... *H04R 1/2811* (2013.01); *H04R 1/023* (2013.01); *H04R 1/1008* (2013.01);
(Continued)

(58) Field of Classification Search
CPC .... H04R 1/2811; H04R 1/023; H04R 1/1008; H04R 1/1075; H04R 1/2826; H04R 1/345;
(Continued)

(56) References Cited

U.S. PATENT DOCUMENTS 10,462,558 B2 10/2019 Silver et al.
10,555,071 B2 2/2020 Wakeland et al.
(Continued)

FOREIGN PATENT DOCUMENTS

CN 205793186 U 12/2016
CN 106937222 A 7/2017
(Continued)

OTHER PUBLICATIONS

International Search Report in PCT/CN2021/095546 mailed on Sep. 8, 2021, 8 pages.
(Continued)

*Primary Examiner* — Ahmad F. Matar
*Assistant Examiner* — Sabrina Diaz
(74) *Attorney, Agent, or Firm* — METIS IP LLC

(57) ABSTRACT

The present disclosure provides an acoustic output device comprising a bone conduction acoustic assembly used to generate a bone conduction acoustic wave; an air conduction acoustic assembly used to generate an air conduction acoustic wave; and a housing used to accommodate at least a portion of elements of the bone conduction acoustic assembly and the air conduction acoustic assembly. The housing includes a first chamber used to accommodate at least a portion of the bone conduction acoustic assembly; and a second chamber. The housing is provided with a sound outlet communicated with the second chamber. The air conduction acoustic wave is transmitted to an outside of the acoustic output device via the sound outlet. A frequency
(Continued)

400 response curve of the air conduction acoustic wave has at least one resonance peak. A peak resonance frequency of the at least one resonance peak is greater than or equal to 1 kHz.

15 Claims, 34 Drawing Sheets

(51) Int. Cl.

| | |
|---|---|
| ***H04R 1/10*** | (2006.01) |
| ***H04R 1/34*** | (2006.01) |
| ***H04R 1/40*** | (2006.01) |
| ***H04R 7/12*** | (2006.01) |
| ***H04R 9/02*** | (2006.01) |
| ***H04R 9/04*** | (2006.01) |
| ***H04R 9/06*** | (2006.01) |
| ***H04R 23/02*** | (2006.01) |

(52) U.S. Cl.
CPC ......... *H04R 1/1075* (2013.01); *H04R 1/2826* (2013.01); *H04R 1/345* (2013.01); *H04R 1/406* (2013.01); *H04R 7/12* (2013.01); *H04R 9/025* (2013.01); *H04R 9/045* (2013.01); *H04R 9/06* (2013.01); *H04R 23/02* (2013.01); *H04R 1/1041* (2013.01); *H04R 2460/11* (2013.01); *H04R 2460/13* (2013.01)

(58) Field of Classification Search
CPC ........ H04R 1/406; H04R 1/1041; H04R 7/12; H04R 9/025; H04R 9/045; H04R 9/06; H04R 23/02; H04R 2460/11; H04R 2460/13
USPC ......................................... 381/151, 182, 380
See application file for complete search history.

(56) References Cited

U.S. PATENT DOCUMENTS

| | | | | |
|---|---|---|---|---|
| 10,951,976 | B2 | 3/2021 | Wakeland et al. | |
| 2009/0285417 | A1* | 11/2009 | Shin | H04R 9/06 381/151 |
| 2017/0164088 | A1 | 6/2017 | Fukuda | |
| 2018/0352061 | A1 | 12/2018 | Hosoi et al. | |
| 2019/0132689 | A1 | 5/2019 | Qi et al. | |
| 2019/0174233 | A1 | 6/2019 | Fukuda | |
| 2020/0045397 | A1 | 2/2020 | Wu et al. | |
| 2020/0296526 | A1 | 9/2020 | Kim et al. | |
| 2021/0067858 | A1* | 3/2021 | Struzik | H04R 1/1008 |
| 2021/0076123 | A1 | 3/2021 | Zhang et al. | |

FOREIGN PATENT DOCUMENTS

| | | | | |
|---|---|---|---|---|
| CN | 111182426 | A | 5/2020 | |
| CN | 111954142 | A | 11/2020 | |
| CN | 211909096 | U | 11/2020 | |
| CN | 112383865 | A | 2/2021 | |
| CN | 214708013 | U | 11/2021 | |
| KR | 101328390 | B1 | 11/2013 | |
| KR | 20210018001 | A | 2/2021 | |
| TW | 201820891 | A | 6/2018 | |
| WO | 2007083903 | A1 | 7/2007 | |
| WO | WO-2018079340 | A1 * | 5/2018 | H04R 9/02 |

OTHER PUBLICATIONS

First Office Action in Chinese Application No. 202110383452.2 mailed on Apr. 16, 2024, 12 pages.
The Extended European Search Report in European Application No. 21935679.7 mailed on Apr. 4, 2024, 8 pages.
Notice of Preliminary Rejection in Korean Application No. 10-2023-7022666 mailed on Aug. 13, 2025, 14 pages.

* cited by examiner

ACOUSTIC OUTPUT DEVICES

CROSS-REFERENCE TO RELATED APPLICATIONS

This application is a continuation of International Patent Application No. PCT/CN2021/095546, filed on May 24, 2021, which claims priority of Chinese Patent Application No. 202110383452.2, filed on Apr. 9, 2021, the contents of each of which are hereby incorporated by reference.

TECHNICAL FIELD

The present disclosure relates to the field of acoustic outputs, and in particular to an acoustic output device.

BACKGROUND

Currently, wearable devices with acoustic output devices are emerging and becoming more and more popular. In particular, due to the health and safety features, there are more and more open binaural acoustic output devices (e.g., bone conduction speakers) to facilitate sound conduction to users. However, the bone conduction speaker has the problem of sound leakage in the mid-low frequency range.

Therefore, it is desirable to provide an acoustic output device that can reduce sound leakage and improve the audio experience of users.

SUMMARY

Embodiments of the present disclosure provide an acoustic output device comprising: a bone conduction acoustic assembly used to generate a bone conduction sound wave; an air conduction acoustic assembly used to generate an air conduction sound wave; and a housing used to accommodate at least a portion of elements of the bone conduction acoustic assembly and the air conduction acoustic assembly. The housing may include a first chamber and a second chamber, the first chamber being used to accommodate at least a portion of the bone conduction acoustic assembly, the housing may be provided with a sound outlet communicated with the second chamber. The air conduction sound wave may be transmitted to an outside of the acoustic output device via the sound outlet. A frequency response curve of the air conduction sound wave may have at least one resonance peak, a peak resonance frequency of the at least one resonance peak may be greater than or equal to 1 kHz.

In some embodiments, the air conduction acoustic assembly may include at least one diaphragm, the at least one diaphragm being connected to the bone conduction acoustic assembly or the housing, the air conduction sound wave being generated based on a vibration of the at least one diaphragm or the housing.

In some embodiments, the at least one diaphragm may separate a chamber of the housing into the first chamber and the second chamber.

In some embodiments, the housing may be further provided with at least one pressure relief hole communicated with the first chamber.

In some embodiments, the at least one pressure relief hole may include a first pressure relief hole and a second pressure relief hole. The first pressure relief hole may be provided farther away from the sound outlet than the second pressure relief hole, an effective area of an outlet end of the first pressure relief hole may be larger than an effective area of an outlet end of the second pressure relief hole.

In some embodiments, the sound outlet and the first pressure relief hole may be located on opposite sides of the bone conduction acoustic assembly.

In some embodiments, the housing may include a first side wall, a second side wall, a third side wall, and a fourth side wall. The side wall and the second side wall are disposed on opposite sides of the bone conduction acoustic assembly, the third side wall and the fourth side wall are connected to the first side wall and the second side wall and spaced apart from each other. The sound outlet and the first pressure relief hole is provided on the first side wall and the second side wall, respectively, and the second pressure relief hole is provided on the third side wall or the fourth side wall.

In some embodiments, the at least one pressure relief hole may further include a third pressure relief hole. The effective area of the outlet end of the second pressure relief hole is larger than an effective area of an outlet end of the third pressure relief hole, the second pressure relief hole and the third pressure relief hole are provided on the third side wall and the fourth side wall, respectively.

In some embodiments, an actual area of the outlet end of the first pressure relief hole may be greater than an actual area of the outlet end of the second pressure relief hole, and the actual area of the outlet end of the second pressure relief hole may be greater than an actual area of the outlet end of the third pressure relief hole.

In some embodiments, the housing may be further provided with at least one tuning hole communicated with the second chamber, the peak resonance frequency of the at least one resonance peak when the at least one tuning hole is in an open state is shifted to high frequency compared to the peak resonance frequency of the at least one resonance peak when the at least one tuning hole is in a closed state.

In some embodiments, an offset towards high frequency may be greater than or equal to 500 Hz.

In some embodiments, the offset towards high frequency may be greater than or equal to 1 kHz.

In some embodiments, the peak resonance frequency of the at least one resonance peak when the at least one tuning hole is in the open state may be greater than or equal to 2 kHz.

In some embodiments, the at least one tuning hole may include a plurality of tuning holes, and a sum of effective areas of outlet ends of the plurality of tuning holes may be greater than or equal to 1.5 mm2.

In some embodiments, the housing may include a first side wall and a second side wall disposed on opposite sides of the bone conduction acoustic assembly. The at least one tuning hole may include a first tuning hole, the sound outlet and the first tuning hole being disposed on the first side wall and the second side wall, respectively.

In some embodiments, the housing further may include a third side wall and a fourth side wall connecting the first side wall and the second side wall and spaced apart from each other. The at least one tuning hole may further include a second tuning hole, the second tuning hole being provided on the third side wall or the fourth side wall.

In some embodiments, an effective area of an outlet end of the first tuning hole may be larger than an effective area of an outlet end of the second tuning hole.

In some embodiments, an actual area of the outlet end of the first tuning hole may be larger than an actual area of the outlet end of the second tuning hole.

In some embodiments, the actual area of the outlet end of the first tuning hole may be greater than or equal to 3.8 $mm^2$; and/or, the actual area of the outlet end of the second tuning hole may be greater than or equal to 2.8 $mm^2$.

In some embodiments, the outlet ends of the first tuning hole and the second tuning hole may be both covered with an acoustic resistance net, a porosity of the acoustic resistance net being less than or equal to 16%.

In some embodiments, the housing may be provided with at least one pressure relief hole communicated with the first chamber. The at least one tuning hole and the at least one pressure relief hole may form at least one pair of adjacent holes, each pair of adjacent holes including one of the at least one tuning hole and one of the at least one pressure relief hole arranged adjacent to each other, and an interval distance between the tuning hole and the pressure relief hole in each pair of adjacent holes may be less than or equal to 2 mm.

In some embodiments, in each pair of adjacent holes, an effective area of an outlet end of the pressure relief hole may be greater than an effective area of an outlet end of the sound tuning hole.

In some embodiments, in each pair of adjacent holes, an actual area of the outlet end of the pressure relief hole may be greater than an actual area of the outlet end of the sound tuning hole; and/or, the outlet ends of the adjacent provided pressure relief hole and the tuning hole may be respectively covered with a first acoustic resistance net and a second acoustic resistance net, a porosity of the first acoustic resistance net being greater than a porosity of the second acoustic resistance net.

In some embodiments, a ratio of the effective area of the outlet end of the pressure relief hole to the effective area of the outlet end of the tuning hole may be less than or equal to 2.

In some embodiments, a frequency response curve of an air conduction sound output to the outside of the acoustic output device via the at least one pressure relief hole may have a first resonance peak, and a frequency response curve of an air conduction sound output to the outside of the acoustic output device via the tuning hole may have a second resonance peak, a peak resonance frequency of the first resonance peak and a peak resonance frequency of the second resonance peak may be respectively greater than or equal to 2 kHz.

In some embodiments, a ratio of a difference between the peak resonance frequency of the first resonance peak and the peak resonance frequency of the second resonance peak to the peak resonance frequency of the first resonance peak may be less than or equal to 60%.

In some embodiments, each of the peak resonance frequency of the first resonance peak and the peak resonance frequency of the second resonance peak may be greater than or equal to 3.5 kHz.

In some embodiments, the difference between the peak resonance frequency of the first resonance peak and the peak resonance frequency of the second resonance peak may be less than or equal to 2 kHz.

In some embodiments, the acoustic output device may further include a sound conduction component connected to the housing, the sound conduction component being provided with a sound guiding channel, the sound guiding channel being communicated with the sound outlet and being used to guide the air conduction sound wave to the outside of the acoustic output device.

In Some Embodiments, a Length of the Sound Guiding Channel May be Between 2 Mm and 5 mm.

In some embodiments, a cross-sectional area of the sound conducting channel may be greater than or equal to 4.8 $mm^2$.

In some embodiments, the cross-sectional area of the sound guiding channel may increase gradually along a transmission direction of the air conduction sound wave.

In some embodiments, a cross-sectional area of an inlet end of the sound guiding channel may be greater than or equal to 10 $mm^2$; or a cross-sectional area of an outlet end of the sound guiding channel may be greater than or equal to 15 $mm^2$.

In some embodiments, a ratio of a volume of the sound guiding channel to a volume of the second chamber may be between 0.05 and 0.9.

In some embodiments, along a vibration direction of the bone conduction acoustic assembly, a distance from an outlet end of the sound guiding channel to an inner wall of the housing away from a skin contact region may be greater than or equal to 3 mm.

In some embodiments, an outlet end of the sound guiding channel may be covered with an acoustic resistance net, a porosity of the acoustic resistance net may be greater than or equal to 13%.

In some embodiments, the housing may be provided with at least one pressure relief hole communicated with the first chamber. An effective area of an outlet end of the sound guiding channel may be greater than or equal to a sum of an effective area of an outlet end of each of the at least one pressure relief hole communicated with the first chamber on the housing.

In some embodiments, a ratio of the sum of the effective area of the outlet end of each of the at least one pressure relief hole to the effective area of the outlet end of the sound guiding channel may be greater than or equal to 0.15.

In some embodiments, a porosity of the acoustic resistance net covering the outlet end of the sound guiding channel may be greater than or equal to a porosity of the acoustic resistance net covering the outlet end of any one of at least a portion of the at least one pressure relief hole.

In some embodiments, the housing may be provided with at least one tuning hole communicated with the second chamber. An effective area of an outlet end of the sound guiding channel may be greater than an effective area of an outlet end of each tuning hole in the at least one tuning hole.

In some embodiments, the effective area of the outlet end of the sound guiding channel may be greater than a sum of an effective area of the outlet end of each of the at least one tuning hole.

In some embodiments, a ratio of the sum of the effective area of the outlet end of each of the at least one tuning hole to the effective area of the outlet end of the sound guiding channel may be greater than or equal to 0.08.

In some embodiments, a porosity of the acoustic resistance net covering the outlet end of the sound guiding channel may be greater than a porosity of the acoustic resistance net covering the outlet end of any one of the at least one tuning hole.

In some embodiments, the bone conduction acoustic assembly may include a magnetic circuit system and a coil assembly, wherein the magnetic circuit system may form a magnetic gap, the coil assembly may be provided in the first chamber and may extend into the magnetic gap, and the coil assembly may be provided with at least one communication hole.

In some embodiments, the at least one communication hole may be located on a portion of the coil assembly located outside the magnetic gap.

In some embodiments, the coil assembly may include a coil and a coil support. The coil support may be used to connect the coil to the housing and to make the coil extend into the magnetic gap. The at least one communication hole may be provided on the coil support.

In some embodiments, the bone conduction acoustic assembly may further include an elastic element located in the first chamber. A central region of the elastic element may be connected to the magnetic circuit system, and a peripheral region of the elastic element may be connected to the housing, thereby suspending the magnetic circuit system within the housing.

In some embodiments, the coil support may include a main part and a first support part. The main part may be connected to the elastic element, one end of the first support part may be connected to the main part, the coil may be connected to the other end of the first support part away from the main part, and the at least one communication hole may be located at a connection position between the main part and the first support part.

In some embodiments, the at least one communication hole may include multiple communication holes, the multiple communication holes being disposed at intervals along an annulus direction of the coil assembly.

In some embodiments, each communication hole may have a cross-sectional area greater than or equal to 2 $mm^2$.

In some embodiments, the housing may be provided with a pressure relief hole communicated with the first chamber, a frequency response curve of an air conduction sound output via the pressure relief hole to the outside of the acoustic output device may have a resonance peak, the at least one communication hole may be provided so that the peak resonance frequency of the resonance peak is greater than or equal to 2 kHz.

In some embodiments, the peak resonance frequency of the resonance peak when the at least one communication hole is in an open state may be shifted to high frequency compared to the peak resonance frequency of the resonance peak when the at least one communication hole is not provided, and an offset to high frequency may be greater than or equal to 500 HZ.

In some embodiments, the acoustic output device may further include: a communication channel communicating the first chamber with the second chamber, a peak resonance frequency of the at least one resonance peak when the communication channel is in an open state being shifted to high frequency compared to the peak resonance frequency of the at least one resonance peak when the communication channel is in a closed state, an offset to high frequency being greater than or equal to 500 Hz.

In some embodiments, the frequency response curve of the air conduction sound output to the outside of the acoustic output device via the sound outlet may have a resonance peak, the peak resonance frequency of the resonance peak being greater than or equal to 2 kHz.

In some embodiments, the communication channel may include a hole array disposed on the diaphragm, at least part of holes in the hole array and the sound outlet being disposed on opposite sides of the bone conduction acoustic assembly, respectively.

In some embodiments, an actual area of at least one hole in the hole array may be between 0.01 $mm^2$ and 0.04 $mm^2$.

In some embodiments, the bone conduction acoustic assembly may include a magnetic circuit system and a coil assembly, the magnetic circuit system may form a magnetic gap, the coil assembly may be provided in the first chamber and may extend into the magnetic gap, the communication channel may run through the magnetic circuit system such that the first chamber is communicated with the second chamber.

In some embodiments, the housing may be further provided with a pressure relief hole communicated with the first chamber and a tuning hole communicated with the second chamber, the communication channel being provided outside of the housing and connecting the pressure relief hole and the tuning hole.

In some embodiments, an acoustic resistance net may be arranged in a communication path defined by the communication channel, a porosity of the acoustic resistance net being less than or equal to 18%.

BRIEF DESCRIPTION OF THE DORIGINALINGS

The present disclosure is further illustrated in terms of exemplary embodiments. These exemplary embodiments are described in detail with reference to the drawings. These embodiments are not limited. In these embodiments, the same number represents the same structure, wherein.

DETAILED DESCRIPTION

Figure 1:
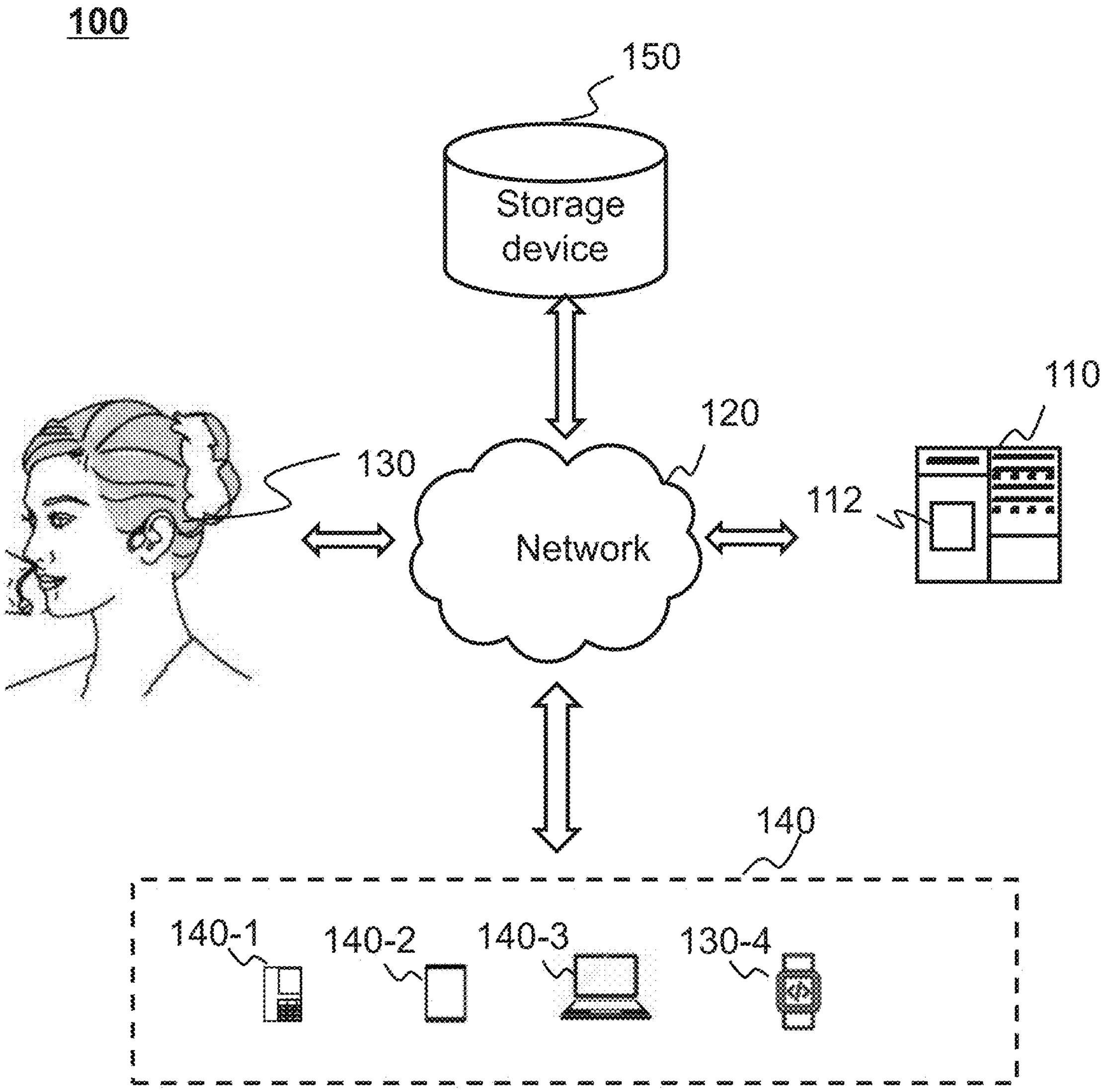
FIG. 1 is a schematic diagram illustrating an acoustic output system according to some embodiments of the present disclosure.

The technical schemes of embodiments of the present disclosure will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be understood that the “system,” “device,” “unit” and/or “module” used herein is a method for distinguishing different components, elements, components, parts or assemblies of different levels. However, if other words may achieve the same purpose, the words may be replaced by other expressions.

As shown in the present disclosure and claims, unless the context clearly prompts the exception, “a,” “one,” and/or “the” is not specifically singular, and the plural may be included. It will be further understood that the terms “comprise,” “comprises,” and/or “comprising,” “include,” “includes,” and/or “including,” when used in the present disclosure, specify the presence of stated features, integers, steps, operations, elements, and/or components, but do not preclude the presence or addition of one or more other features, integers, steps, operations, elements, components, and/or groups thereof.

The flowcharts are used in the present disclosure to illustrate the operations performed by the system according to the embodiment of the present disclosure. It should be understood that the preceding or following operations are not necessarily performed in order to accurately. Instead, the operations may be processed in reverse order or simultaneously. Moreover, one or more other operations may be added to the flowcharts. One or more operations may be removed from the flowcharts.

Embodiments of the present disclosure relate to an acoustic output device. The acoustic output device may include a bone conduction acoustic assembly, an air conduction acoustic assembly, and a housing configured to accommodate at least a portion of elements of the bone conduction acoustic assembly and the air conduction acoustic assembly. In some embodiments, the bone conduction acoustic assembly may be used to generate a bone conduction sound wave. When the bone conduction acoustic assembly generates the bone conduction sound wave, the air conduction acoustic assembly may generate an air conduction sound wave based on the vibration of the housing and/or the bone conduction acoustic assembly. In some embodiments, by arranging one or more acoustic structures (e.g., a sound outlet, a pressure relief hole, a tuning hole, a sound guiding channel, a communication hole, etc.) in the acoustic output device, the quality of the sound output from the acoustic output device can be improved, the sound of the acoustic output device at a mid-low frequency can be enriched, and the leakage of the acoustic output device can be reduced, thereby improving an audio experience of a user. For example, the housing of the acoustic output device may include a first chamber (also known as a front chamber) and a second chamber (also known as a rear chamber). The housing may be provided with a sound outlet communicated with the second chamber, and the air conduction sound wave may be transmitted to an outside of the acoustic output device via the sound outlet. In some embodiments, a frequency response curve of the air conduction sound wave may have at least one resonance peak, and a peak resonance frequency of the at least one resonance peak may be greater than or equal to 1 kHz. As another example, a side wall of the housing of the acoustic output device may also be provided with at least one pressure relief hole communicated with the first chamber, and the pressure relief hole may regulate the pressure in the first chamber by facilitating the communication between the first chamber and the outside of the acoustic output device, thereby helping to regulate the frequency response of the air conduction acoustic assembly in a low frequency range. In some embodiments, a number, a size, a shape, a position, etc., of one or more acoustic structures (e.g., the sound outlet, the pressure relief hole, the tuning hole, the sound guiding channel, the communication hole, etc.) in the acoustic output device may be adjusted to optimize the frequency response curve of the acoustic output device, thereby improving the quality of the sound output from the acoustic output device. For example, a distance between the pressure relief hole communicated with the first chamber and the tuning hole communicated with the second chamber in the acoustic output device may be small (e.g., the pressure relief hole and the tuning hole may be provided on two adjacent side walls of the housing), so that the air conduction sound waves output to the outside of the acoustic output device via the pressure relief hole and the tuning hole, respectively, interfere and cancel each other as much as possible in a high frequency range (e.g., 2 kHz-4 kHz), thereby reducing the sound leakage of the acoustic output device and improving the sound quality of the acoustic output device.

FIG. 1 is a schematic diagram illustrating an acoustic output system according to some embodiments of the present disclosure. As shown in FIG. 1, an acoustic output system 100 may include a multimedia platform 110, a network 120, an acoustic output device 130, a user terminal 140, and a storage device 150.

The multimedia platform 110 may communicate with one or more components of the acoustic output system 100 or an external data source (e.g., a cloud data center). In some embodiments, the multimedia platform 110 may provide data or signals (e.g., audio data of music) to the acoustic output device 130 and/or the user terminal 140. In some embodiments, the multimedia platform 110 may be used for data/signal processing of the acoustic output device 130 and/or the user terminal 140. In some embodiments, the multimedia platform 110 may be implemented on a single server or a group of servers. The group of servers may be a centralized server group connected to the network 120 via a distributed server group of one or more access points. In some embodiments, the multimedia platform 110 may be locally connected to the network 120 or remotely connected to the network 120. For example, the multimedia platform 110 may access information and/or data stored in the acoustic output device 130, the user terminal 140, and/or the storage device 150 via the network 120. As another example, the storage device 150 may be used as back-end data storage for the multimedia platform 110. In some embodiments, the multimedia platform 110 may be implemented on a cloud platform. Merely by way of example, the cloud platform may include a private cloud, a public cloud, a hybrid cloud, a community cloud, a distributed cloud, an internal cloud, a multi-tier cloud, or the like, or any combination thereof.

In some embodiments, the multimedia platform 110 may include a processing device 112. The processing device 112 may perform the primary functions of the multimedia platform 110. For example, the processing device 112 may retrieve audio data from the storage device 150 and send the retrieved audio data to the acoustic output device 130 and/or the user terminal 140 to generate sound. In other embodiments, the processing device 112 may process signals from the acoustic output device 130 (e.g., generate control signals).

In some embodiments, the processing device 112 may include one or more processing units (e.g., a single-core processing device or a multi-core processing device). By way of exemplary illustration only, the processing device 112 may include a central processing unit (CPU), a specialized integrated circuit (ASIC), a specialized instruction set processor (ASIP), a graphics processing unit (GPU), a physical processing unit (PPU), a digital signal processor (DSP), a field programmable gate array (FPGA), a programmable logic device (PLD), a controller microcontroller unit, a reduced instruction set computer (RISC), a microprocessor, etc., or any combination thereof.

The network 120 may facilitate the exchange of information and/or data. In some embodiments, one or more components of the acoustic output system 100 (e.g., the multimedia platform 110, the acoustic output device 130, the user terminal 140, the storage device 150) may send information and/or data to other components of the acoustic output system 100 via the network 120. In some embodiments, the network 120 may be any type of wired or wireless network, or a combination thereof. By way of exemplary illustration only, the network 120 may include a wired network, a wired network, a fiber optic network, a telecommunication network, an Intranet, the Internet, a local area network (LAN), a wide area network (WAN)), a wireless local area network (WLAN), a metropolitan area network (MAN), a wide area network (WAN), a public switched telephone network (PSTN), a Bluetooth network, a ZigBee network, a near field communication (NFC) network, etc., or any combination thereof. In some embodiments, the network 120 may include one or more network access points. For example, the network 120 may include a wired or wireless network access point such as a base station and/or an Internet exchange point, and one or more components of the acoustic output system 100 may be connected to the network 120 to exchange data and/or information.

The acoustic output device 130 may output sound to and interact with the user. In some embodiments, the acoustic output device 130 may provide at least an audio content, such as a song, a poem, a news broadcast, a weather broadcast, an audio lesson, etc., to the user. In some embodiments, the user may provide feedback to the acoustic output device 130 via, for example, a key, a screen touch, a body movement, a voice, a gesture, a thought, etc. In some embodiments, the acoustic output device 130 may be a wearable device. Unless otherwise stated, as used herein, the wearable device may include a headset and various other types of personal devices, such as a head-worn device, a shoulder-worn device, or a body-worn device. The wearable device may provide at least an audio content to the user with or without contacting the user. In some embodiments, the wearable device may include a smart headset, a head mountable display (HMD), a smart bracelet, a smart shoe, a smart watch, a smart suit, a smart backpack, a smart accessory, a virtual reality headset, etc., or any combination thereof.

The acoustic output device 130 may be in communication with the user terminal 140 via the network 120. In some embodiments, various types of data and/or information may be received by the acoustic output device 130 from the user, e.g., a gesture (e.g., a handshake gesture, a head shake gesture, etc.), etc. In some embodiments, the various types of data and/or information may include, but are not limited to, a movement parameter (e.g., a geographic position, a movement direction, a movement speed, an acceleration, etc.), a voice parameter (a volume of the voice, a content of the voice, etc.), etc. In some embodiments, the acoustic output device 130 may also send the received data and/or information to the multimedia platform 110 or the user terminal 140. For more information about the acoustic output device 130, please refer to the detailed description elsewhere in the present application, e.g., FIGS. 2-3, etc.

In some embodiments, the user terminal 140 may be customized, for example, by installing an application in the user terminal 140. The application may be used to communicate with the acoustic output device 130 and process data and/or signals. The user terminal 140 may include a mobile device 130-1, a tablet computer 130-2, a laptop computer 130-3, a built-in device 130-4 in a vehicle, etc., or any combination thereof. In some embodiments, the mobile device 130-1 may include a smart home device, a smart mobile device, etc., or any combination thereof. In some embodiments, the smart home device may include a smart lighting device, a smart appliance control device, a smart surveillance device, a smart TV, a smart camera, an intercom, etc., or any combination thereof. In some embodiments, the smart mobile device may include a smart phone, a personal digital assistant (PDA), a gaming device, a navigation device, etc., or any combination thereof. In some embodiments, the built-in device 130-4 in the vehicle may include a built-in computer, a built-in television, a built-in tablet, etc. In some embodiments, the user terminal 140 may include a signal transmitter and a signal receiver configured to communicate with a positioning device (not shown in the figure) that locates the user and/or the position of the user terminal 140. In some embodiments, the multimedia platform 110 or the storage device 150 may be integrated into the user terminal 140. In this case, the functions that can be achieved by the multimedia platform 110 described above can be similarly implemented through the user terminal 140.

The storage device 150 may store data and/or instructions. In some embodiments, the storage device 150 may store data obtained from the multimedia platform 110, the acoustic output device 130, and/or the user terminal 140. In some embodiments, the storage device 150 may store data and/or instructions for various functions that can be performed by the multimedia platform 110, the acoustic output device 130, and/or the user terminal 140. In some embodiments, the storage device 150 may include a mass storage device, a removable memory, a volatile read-write memory, a read-only memory (ROM), etc., or any combination thereof. Exemplary mass storage devices may include a disk, an optical disk, a solid-state drive, etc. Exemplary removable memories may include a flash drive, a floppy disk, an optical disk, a memory card, a zip disk, a magnetic tape, etc. Exemplary volatile read-write memories may include a random-access memory (RAM). Example RAM may include a dynamic random-access memory (DRAM), a double data rate synchronous dynamic random-access memory (DDRSDRAM), a static random-access memory (SRAM), a thyristor random access memory (T-RAM), and a zero-capacitance random access memory (Z-RAM), etc. Exemplary ROM may include a programmable ROM (PROM), an erasable programmable ROM (EPROM), an electrically erasable programmable ROM (EEPROM), a compact disc ROM (CD-ROM), and a digital multifunction disk ROM, etc. In some embodiments, the storage device 150 may be implemented on a cloud platform. Merely by way of example, the cloud platform may include a private cloud, a public cloud, a hybrid cloud, a community cloud, a distributed cloud, an internal cloud, a multi-tier cloud, etc., or any combination thereof. In some embodiments, one or more components of the acoustic output system 100 may access data and/or instructions stored in the storage device 150 via the network 120. In some embodiments, the storage device 150 may be directly connected to the multimedia platform 110 as back-end storage.

In some embodiments, the multimedia platform 110, the network 120, the user terminal 140, and/or the storage device 150 may be integrated into the acoustic output device 130. Specifically, with the advancement of technology and the improvement of the processing capability of the acoustic output device 130, all processing may be performed by the acoustic output device 130. For example, the acoustic output device 130 may be a smart headset, an MP3 player, etc., with highly integrated electronic elements such as a central processing unit (CPU), a graphics processing unit (GPU), etc.

Figure 2:
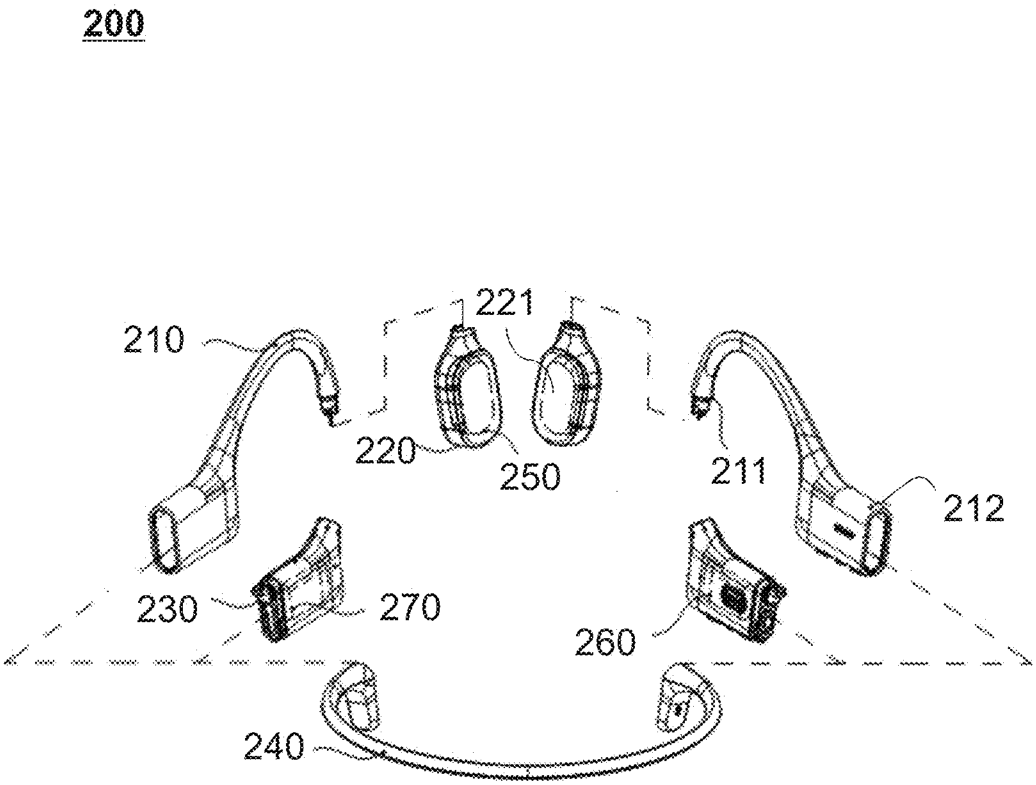
FIG. 2 is a schematic diagram illustrating an acoustic output device according to some embodiments of the present disclosure.

FIG. 2 is a schematic diagram illustrating an acoustic output device according to some embodiments of the present disclosure. As shown in FIG. 2, an acoustic output device 200 may include an ear hook 210, a housing 220, a circuit housing 230, a rear hook 240, an acoustic assembly 250, a control circuit 260, and a battery 270. The housing 220 and the circuit housing 230 may be provided at each end of the ear hook 210, and the rear hook 240 may be provided at one end of the circuit housing 230 away from the ear hook 210. The housing 220 may be used to accommodate different acoustic assemblies 250. The circuit housing 230 may be used to accommodate the control circuit 260 and the battery 270. Both ends of the rear hook 240 may be physically connected to the corresponding circuit housings 230, respectively. The ear hook 210 may refer to a structure that may hold the housing 220 and the acoustic assembly 250 in a predetermined position at the user's ear when the user wears the acoustic output device 200.

In some embodiments, the ear hook 210 may include an elastic support member that may be used to hang the acoustic output device 200 on the ear when the user wears the acoustic output device 200. The elastic support member may be configured to hold the ear hook 210 in a shape that matches the user's ear, such that the ear hook 210 may produce a matching elastic deformation based on the shape of the ear and the shape of the user's head. When the user wears the acoustic output device 200, the elastic support member may accommodate users with different ear shapes and head shapes. In some embodiments, the elastic support member may be made of a memory alloy with a good deformation recovery capability. The memory alloy refers to a material composed of two or more metallic elements that have a shape memory effect through thermos-elasticity and martensitic phase transformation and their inversion. In some embodiments, the memory alloy may include, but is not limited to, any one or more of nickel-titanium alloy, copper-zinc alloy, iron-manganese alloy, nickel-aluminum alloy, gold-cadmium alloy, etc. In some embodiments, the elastic support member may also be a support member made of other materials (e.g., an organic polymer material). In some embodiments, the organic polymer material may include any one or more of rubber, chemical fiber, plastic, etc. In some embodiments, the elastic support member may also be made of a non-memory alloy. In some embodiments, a wire in the elastic support member may establish an electrical connection between the acoustic assembly 250 and other components (e.g., the control circuit 260, the battery 270, etc.) to facilitate power and data transmission of the acoustic assembly 250. In some embodiments, the ear hook 210 may further include a protective sleeve 211 and a housing protection member 212 integrally formed with the protective sleeve 211, wherein the protective sleeve 211 is wrapped around an outside of the elastic support member and the housing protection member 212 covers an outside of the housing 220 and is adapted to the housing 220.

The housing 220 may be configured to accommodate the acoustic assembly 250. In some embodiments, the acoustic assembly 250 may include a bone conduction acoustic assembly, an air conduction acoustic assembly, etc. The bone conduction acoustic assembly may be configured to output a sound wave (also referred to as a bone conduction sound wave) through a solid medium (e.g., a bone). For example, the bone conduction acoustic assembly may convert an audio signal (e.g., an electrical signal) into a vibration and transmit it to a bone (e.g., the skull) of the user. In some embodiments, the bone conduction acoustic assembly may include a magnetic circuit system, one or more vibration plates, and a voice coil. The magnetic circuit system may generate a magnetic field such that the voice coil located in a magnetic gap vibrates under the action of the magnetic field, and the vibration of the voice coil may drive the one or more vibration plates to vibrate. At least one of the one or more vibration plates may be physically connected to the housing 220, which may contact the skin of the user (e.g., the skin on the user's head) and transfer the bone conduction sound wave to the cochlea of the user wearing the acoustic output device 200. The air conduction acoustic assembly may be configured to output a sound wave through the air (also referred to as an air conduction sound wave). For example, the air conduction acoustic assembly may convert vibrations of the housing 220, the bone conduction acoustic assembly, and/or the air in the housing 220 into air vibrations that can be received through the user's ear. In some embodiments, the air conduction acoustic assembly may include at least one diaphragm, and the diaphragm may be physically connected to the bone conduction acoustic assembly and/or the housing 220. Since, the bone conduction acoustic assembly (e.g., one or more vibration plates) vibrates to generate the bone conduction sound wave, the vibration of the bone conduction acoustic assembly (e.g., one or more vibration plates) may drive the vibration of the housing 220 and/or the diaphragm physically connected to the bone conduction acoustic assembly and/or the housing 220. The vibration of the diaphragm may cause vibration of the air in the housing 220. The vibration of the air in the housing 220 may be transmitted from the housing 220 to generate the air conduction sound wave. For more information about the bone conduction acoustic assembly and the air conduction acoustic assembly, please refer to the detailed descriptions elsewhere in the present disclosure, e.g., FIGS. 3-4, etc.

In some embodiments, a count of the acoustic assemblies 250 and housings 220 may be two, which may respectively correspond to the left and right ears of the user and adjacent regions thereof. In some embodiments, the count of the acoustic assemblies 250 and housings 220 may also be one, which may be distributed over the user's left or right ear and adjacent regions thereof when the user is wearing the acoustic output device 200. For more information about the acoustic assembly 250, please refer to the detailed descriptions elsewhere in the present disclosure, for example, FIGS. 3-6 and their related descriptions. It should be noted that the acoustic output device 200 may also be worn in other ways, for example, with the ear hook 210 covering or wrapping around the user's ear and the rear hook 240 spanning the top of the user's head. As another example, the acoustic output device 200 may not include the rear hook 240, and the ear hook 210 may be directly hung on the pinna of the user's ear, such that the acoustic output device 200 is located at or near the user's ear.

In some embodiments, the housing 220 may be provided with a contact surface 221. The contact surface 221 may be in contact with the user's skin. In some embodiments, the contact surface 221 may also be referred to as an upper surface of the housing 220, a skin contact region, etc. A surface of the housing 220 opposite to the upper surface of the housing 220 may also be referred to as a rear surface or back surface of the housing 220. The bone conduction sound wave generated by one or more bone conduction acoustic assemblies of the acoustic assembly 250 in the acoustic output device 130 may be transmitted externally through the contact surface 221 of the housing 220. In some embodiments, a material and thickness of the contact surface 221 may affect the transmission of the bone conduction sound wave to the user, thereby affecting the sound quality. For example, if the material of the contact surface 221 is relatively flexible, the transmission of the bone conduction sound wave in a low frequency range may be superior to the transmission of the bone conduction sound wave in a high frequency range. Conversely, if the material of the contact surface 221 is relatively stiff, the transmission of the bone conduction sound wave in the high frequency range may be superior to the transmission of the bone conduction sound wave in the low frequency range.

Figure 3:
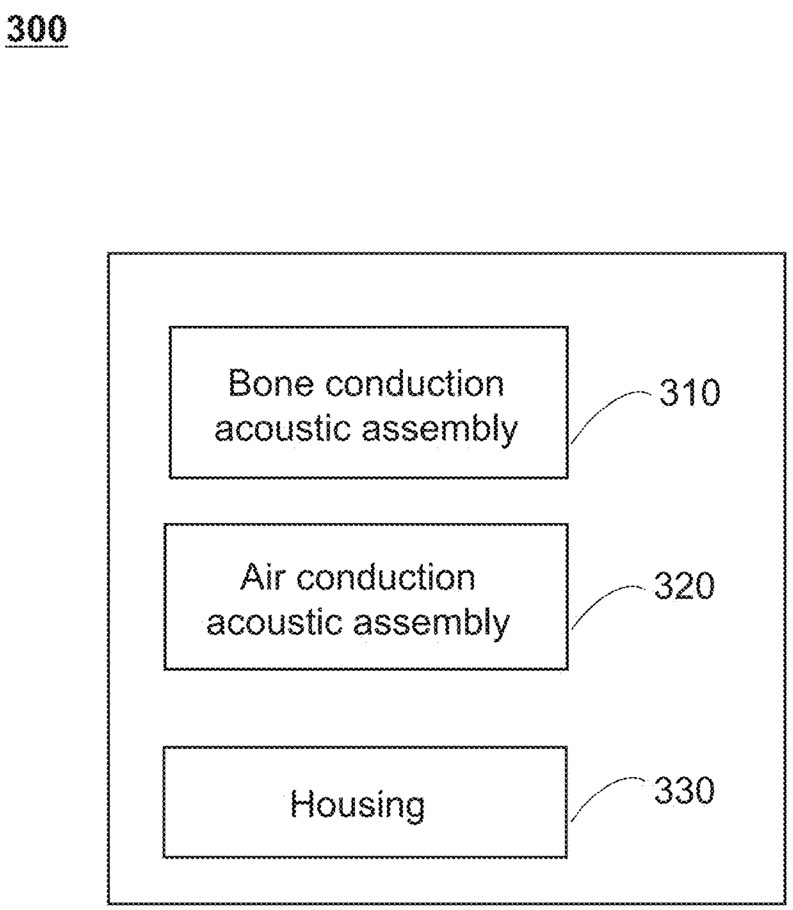
FIG. 3 is a block diagram illustrating an acoustic output device according to some embodiments of the present disclosure.

FIG. 3 is a block diagram illustrating an acoustic output device according to some embodiments of the present disclosure. As shown in FIG. 3, an acoustic output device 300 may include a bone conduction acoustic assembly 310, an air conduction acoustic assembly 320, and a housing 330 for accommodating at least a portion of elements of the bone conduction acoustic assembly 310 and the air conduction acoustic assembly 320.

The bone conduction acoustic assembly 310 may be used to generate a bone conduction sound wave. In some embodiments, the bone conduction acoustic assembly 310 may generate a bone conduction sound wave in a specific frequency range (e.g., a low frequency range, a middle frequency range, a high frequency range, a mid-low frequency range, a mid-high frequency range, etc.) in response to a control signal generated by a signal processing module. In some embodiments, the bone conduction sound wave may refer to a sound wave that is conducted in the form of mechanical vibration through a solid medium (e.g., bone). In some embodiments, the low frequency range (also referred to as a low frequency) may refer to a frequency range of 20 Hz-150 Hz, the middle frequency range (also referred to as a middle frequency) may refer to a frequency range of 150 Hz-5 kHz, the high frequency range (also referred to as a high frequency) may refer to a frequency range of 5 kHz-20 kHz, the mid-low frequency range (also referred to as a mid-low frequency) may refer to a frequency range of 150 Hz-500 Hz, and the mid-high frequency range (also referred to as a mid-high frequency) may refer to a frequency range of 500 Hz to 5 kHz. As another example, the low frequency range may refer to a frequency range of 20 Hz-300 Hz, the middle frequency range may refer to a frequency range of 300 Hz-3 kHz, the high frequency range may refer to a frequency range of 3 kHz-20 kHz, the mid-low frequency range may refer to a frequency range of 100 Hz-1000 Hz, and the mid-high frequency range may refer to a frequency range of 1000 Hz-10 kHz. It should be noted that the values of the frequency ranges are used for illustrative purposes only and are not limiting. The above definition of frequency range may vary according to different application scenarios and different classification criteria. For example, in some other application scenarios, the low frequency range may be a frequency range of 20 Hz-80 Hz, the middle frequency range may be a frequency range of 160 Hz-1280 Hz, the high frequency range may be a frequency range of 2560 Hz-20 kHz, the mid-low frequency range may be a frequency range of 80 Hz-160 Hz, and the mid-high frequency range may be a frequency range of 1280 Hz-2560 Hz. Optionally, the different frequency ranges may or may not have overlapping frequencies. For more information about the bone conduction acoustic assembly 310, please refer to elsewhere in the present disclosure, e.g., FIG. 4, FIG. 17, FIG. 18A, FIG. 18B, and their related descriptions.

The air conduction acoustic assembly 320 may be used to generate an air conduction sound wave. In some embodiments, the air conduction acoustic assembly 320 may generate the air conduction sound wave based on the vibration of the bone conduction acoustic assembly 310, the vibration of the housing 330 accommodating the bone conduction acoustic assembly 310 and the air conduction acoustic assembly 320, the vibration of the air within the housing 330, and/or a control signal. In some embodiments, the air conduction acoustic assembly 320 may generate the air conduction sound wave in the same or a different frequency range than the vibration of the bone conduction acoustic assembly 310. In some embodiments, the air conduction acoustic assembly 320 may include at least one diaphragm. The at least one diaphragm may be connected to the bone conduction acoustic assembly 310 or the housing 330, and the air conduction sound wave may be generated based on the vibration of the at least one diaphragm or the housing 330. In some embodiments, the air conduction sound wave may refer to a sound wave that is conducted by air vibration. For more information about the air conduction acoustic assembly 320, please refer to elsewhere in the present specification, e.g., FIG. 4, FIG. 20A and their related descriptions.

The housing 330 may be used to accommodate at least a portion of the elements in the bone conduction acoustic assembly 310 and the air conduction acoustic assembly 320. In some embodiments, the housing 330 may include a first chamber and a second chamber separated by the diaphragm in the air conduction acoustic assembly 320. In some embodiments, the housing 330 may include a first portion and a second portion. The first portion of the housing 330 and the diaphragm may form the first chamber. The bone conduction acoustic assembly 310 may be placed within the first chamber. The first portion of the housing 330 (e.g., one or more vibration plates) surrounding the first chamber may be physically connected to the bone conduction acoustic assembly 310. The first portion of the housing 330 may transfer a vibration from the bone conduction acoustic assembly 310 to the user's bones when the user wears the acoustic output device 300. The second portion of the housing 330 and the diaphragm may form the second chamber. The air conduction sound wave generated by the air conduction acoustic assembly 320 may be transmitted from the second chamber to the outside of the acoustic output device 300. In some embodiments, the first chamber and the second chamber may not communicate. In some embodiments, the first chamber and the second chamber may communicate, for example, the diaphragm may be provided with one or more communication holes. In some embodiments, the first chamber may be used to accommodate at least a portion of the bone conduction acoustic assembly 310, the housing 330 is provided with one or more sound outlets communicated with the second chamber, and the air conduction sound wave may be transmitted to the outside of the acoustic output device 300 via the sound outlet(s). In some embodiments, when the user wears the acoustic output device 300, the sound outlet(s) may face an external ear canal of the user's ear such that the air conduction sound wave may be transmitted to the user's cochlea via the sound outlet(s).

In some embodiments, the acoustic output device 300 may also include a signal processing module. The bone conduction acoustic assembly 310 may be electrically connected to the signal processing module to receive a control signal (e.g., an audio signal) and generate the bone conduction sound wave based on the control signal. For example, the bone conduction acoustic assembly 310 may include any element (e.g., a vibration motor, an electromagnetic vibration device, etc.) that converts an electrical signal into a mechanical vibration signal. Exemplary signal conversion manners may include, but are not limited to, an electromagnetic type (e.g., a moving coil type, a moving iron type, a magnetostrictive type), a piezoelectric type, an electrostatic type, etc. An internal structure of the bone conduction acoustic assembly 310 may be a single resonance system or a composite resonance system. In some embodiments, the bone conduction acoustic assembly 310 may generate a mechanical vibration in response to a bone conduction control signal. The mechanical vibration may generate the bone conduction sound wave.

Figure 4:
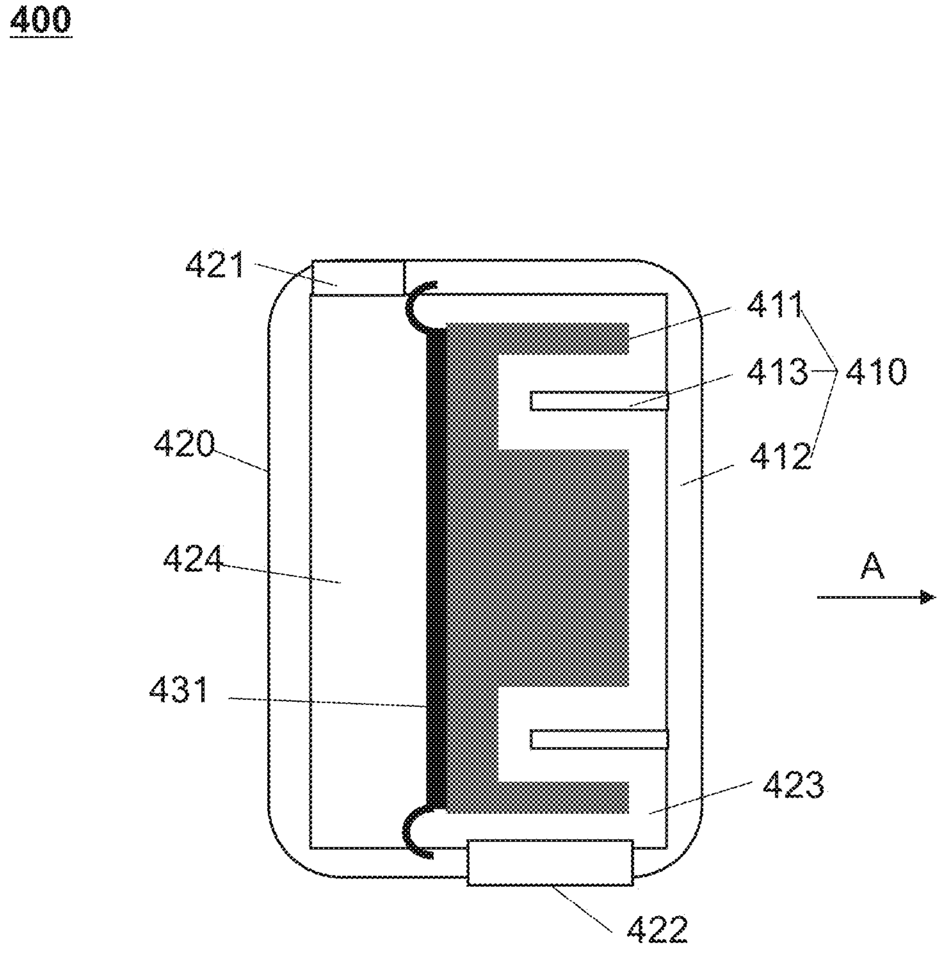
FIG. 4 is a schematic diagram illustrating an acoustic output device according to some embodiments of the present disclosure.

FIG. 4 is a schematic diagram illustrating an acoustic output device according to some embodiments of the present disclosure. As shown in FIG. 4, an acoustic output device 400 may include a bone conduction acoustic assembly 410, a housing 420, and an air conduction acoustic assembly. The bone conduction acoustic assembly 410 and the air conduction acoustic assembly may be located inside the housing 420. The bone conduction acoustic assembly 410 may generate a bone conduction sound wave transmitted to the user through the housing 420, and the air conduction acoustic assembly may generate an air conduction sound wave based on a vibration of the bone conduction acoustic assembly 410. The air conduction sound wave may be delivered to the user through one or more sound outlets (also referred to as sound guiding holes) in the housing 420.

In some embodiments, the bone conduction acoustic assembly 410 may include a magnetic circuit system 411, one or more vibration plates 412, and a voice coil 413. The magnetic circuit system 411 may include one or more magnetic elements and/or magnetic conduction elements configured to generate a magnetic field. In some embodiments, the magnetic circuit system 411 may include a magnetic gap. The magnetic circuit system 411 may generate a magnetic field in the magnetic gap, and the voice coil 413 may be located in the magnetic gap. At least one of the one or more vibration plates 412 may be physically connected to the housing 420. The housing 420 may contact the skin of the user (e.g., the skin on the user's head) and transfer the bone conduction sound wave to the cochlea of the user wearing the acoustic output device 400. In some embodiments, one of the vibration plates 412 may also be referred to as a top wall of the housing 420. As described herein, when the user wears the acoustic output device, a wall of the housing closest to the skin may be referred to as the top wall or a front wall (also referred to as a region in contact with the user's skin, a contact surface, etc.). A wall furthest from the skin (e.g., the wall opposite the top wall) is referred to as a bottom wall or a rear wall. A chamber in the housing corresponding to the top wall of the housing may be referred to as a front chamber (e.g., the first chamber), which is close to a skin region where the user comes in contact with the housing. A chamber corresponding to the bottom wall may be referred to as a rear chamber (e.g., the second chamber), which is away from the skin region where the user comes in contact with the housing. The voice coil 413 may be mechanically connected to the one or more vibration plates 412. In some embodiments, the voice coil 413 may also be electrically connected to a signal processing module. When an electric current (which may represent a control signal) is introduced into the voice coil 413, the voice coil 413 may vibrate in the magnetic field and drive the one or more vibration plates 412 to vibrate. The vibrations of the one or more vibration plates 412 may be transmitted through the housing 420 to the bones of the user to generate the bone conduction sound wave. In some embodiments, the vibrations of the one or more vibrating plates 412 may cause vibration of the housing 420 and/or the magnetic circuit system 411. The vibration of the housing 420 and/or the magnetic circuit system 411 may cause the vibration of the air in the housing 420.

The air conduction acoustic assembly may include a diaphragm 431. The diaphragm 431 may be physically connected to the bone conduction acoustic assembly 410 and/or the housing 420. For example, the diaphragm 431 may be connected to at least one of the magnetic circuit system 411, the voice coil 413, and/or the one or more vibration plates 412. When the bone conduction acoustic assembly 410 (e.g., the one or more vibration plates 412) vibrates to generate the bone conduction sound wave, the vibration of the bone conduction acoustic assembly 410 (e.g., the one or more vibration plates 412) may drive the vibration of the housing 420 and/or the diaphragm 431 physically connected to the bone conduction acoustic assembly 410 and/or the housing 420. The vibration of the diaphragm 431 may cause vibration of the air in the housing 420. The air vibration in the housing 420 may be transmitted from the housing 420 to generate an air conduction sound wave. The air conduction sound wave and the bone conduction sound wave may represent the same audio signal that is input into the bone conduction acoustic assembly 410, or the same audio signal received by the user. In the present disclosure, the air conduction sound wave and the bone conduction sound wave represent the same audio signal means that the air conduction sound wave and the bone conduction sound wave represent the same voice content, which may be represented by frequency components of the air conduction sound wave and the bone conduction sound wave. In some embodiments, the frequency components in the air conduction sound wave and the bone conduction sound wave may be different. For example, the bone conduction sound wave may include more low frequency components and the air conduction sound wave may include more high frequency components. In some embodiments, the diaphragm 431 may be physically connected to the magnetic circuit system 411. The diaphragm 431 and the magnetic circuit system 411 may be considered fixed. The vibration of the diaphragm 431 relatives to the housing 420 may result in a pressure change in the first chamber 423 and the second chamber 424, resulting in the air vibration in the first chamber 423 and the second chamber 424. In some embodiments, the diaphragm 431 may be physically connected to the magnetic circuit system 411. The housing 420 may be considered fixed. The vibrations of the diaphragm 431 and the magnetic circuit system 411 relatives to the housing 420 may cause a pressure change in the first chamber 423 and the second chamber 424, thereby causing the air vibration in the first chamber 423 and the second chamber 424.

In some embodiments, the diaphragm 431 may include a primary portion and an auxiliary portion. The primary portion may be physically connected to a bottom surface of the magnetic circuit system 411 away from the top wall of the housing 420. In some embodiments, the primary portion of the diaphragm 431 may include a plate (e.g., a circular or an annular plate) that may cover at least a portion of the bottom surface of the magnetic circuit system 411. In some embodiments, the primary portion of the diaphragm 431 may include a plate (e.g., a circular or an annular plate) that may cover at least a portion of the bottom surface of the magnetic circuit system 411 and a side wall connected to a side wall of the magnetic circuit system 411. In some embodiments, the auxiliary portion of the diaphragm 431 may be in a shape of a ring around the primary portion of the diaphragm 431. The auxiliary portion of the diaphragm 431 may be physically connected to the housing 420. For example, an inner side of the auxiliary portion of the diaphragm 431 may be in contact with or connected to an outer side of the primary portion of the diaphragm 431, and an outer side of the auxiliary portion of the diaphragm 431 may be physically connected to the housing 420. In some embodiments, the auxiliary portion of the diaphragm 431 may include at least one of a convex region or a recessed region. In some embodiments, the diaphragm 431 may be a film made of a material that is sensitive to vibration. In some embodiments, the material of the diaphragm 431 may include Polycarbonate (PC), Polyamides (PA), Acrylonitrile Butadiene Styrene (ABS), Polystyrene. PS), High Impact Polystyrene (HIPS), Polypropylene (PP), Polyethylene Terephthalate (PET), Polyvinyl Chloride (PVC), Polyurethane (PU), Polyethylene (PE), Phenol Formaldehyde (PF), Urea-Formaldehyde (UF), Melamine-Formaldehyde (MF), Polyarylate (PAR), Polyetherimide (PEI), Polyimide (PI), Polyethylene Naphthalate two formic acid glycol ester (PEN), Polyetheretherketone (PEEK), silicone, etc., or a combination thereof.

Figure 5:
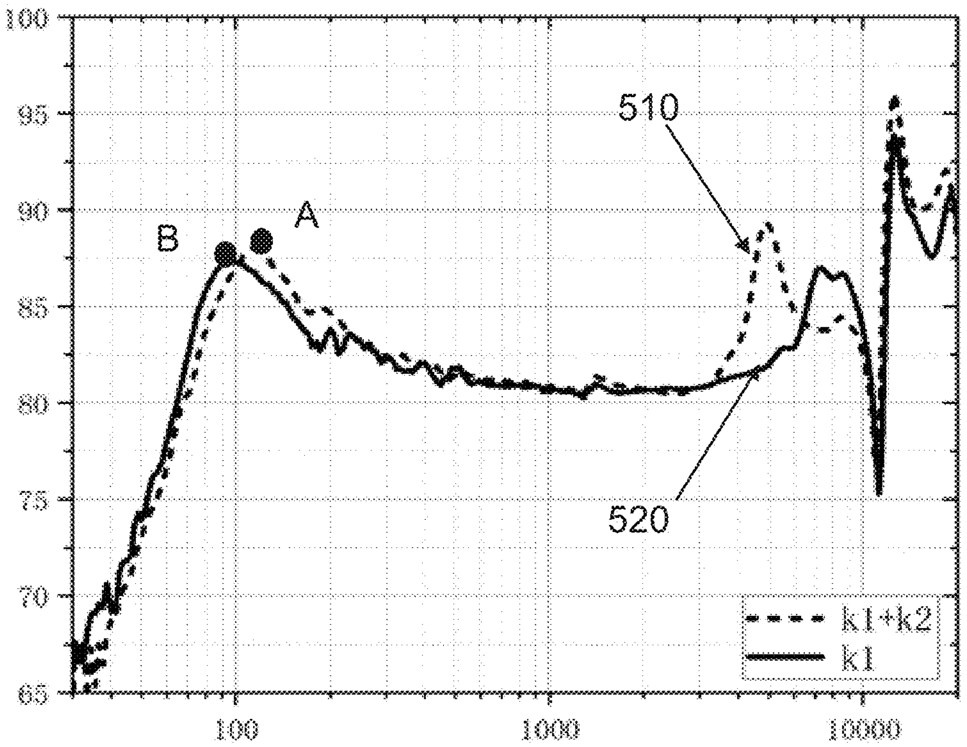
FIG. 5 is a schematic diagram illustrating a comparison of frequency response curves before and after setting a diaphragm in an acoustic output device according to some embodiments of the present disclosure.

In some embodiments, the acoustic output device 400 may generate the bone conduction sound wave under the action of the bone conduction acoustic assembly 410, and the bone conduction sound wave may have a frequency response curve that may have at least one resonance peak. The bone conduction sound wave generated by the acoustic output device 400 in contact with the skin contact region has a first frequency response curve (shown as "k1+k2" in FIG. 5) when the diaphragm 413 is connected to the bone conduction acoustic assembly 410 and the housing 420. The bone conduction sound wave generated by the acoustic output device 400 in contact with the skin contact region has a second frequency response curve (shown as "k1" in FIG. 5) when the diaphragm 413 is disconnected from either of the bone conduction acoustic assembly 410 or the housing 420. In some embodiments, peak resonance frequencies of resonance peaks corresponding to the first frequency response curve and the second frequency response curve may satisfy Equation (1):

$$|f1-f2|/f1 \leq 50\%, \tag{1}$$

where f1 denotes a peak resonance frequency of a resonance peak of the bone conduction sound wave generated when the diaphragm 413 is connected to the bone conduction acoustic assembly 410 and the housing 420, and f2 denotes a peak resonance frequency of a resonance peak of the bone conduction sound wave generated when the diaphragm 413 is disconnected from either of the bone conduction acoustic assembly 410 or the housing 420. It should be noted that a value of the relationship $|f1-f2|/f1$ between the peak resonance frequency f1 and the peak resonance frequency f2 in the above equation (1) may also be less than or equal to other values, e.g., 60%, 40%, 30%, 20%, etc. In some embodiments, a difference between a peak resonance intensity corresponding to the peak resonance frequency f1 and a peak resonance intensity corresponding to the peak resonance frequency f2 may be less than or equal to 5 dB. In some embodiments, the difference between the peak resonance intensity corresponding to the peak resonance frequency f1 and the peak resonance intensity corresponding to the peak resonance frequency f2 may also be less than or equal to any other value, e.g., 3 dB, 4 dB, 6 dB, etc. It can also be understood that $|f1-f2|/f1$ may be used to measure the magnitude of the effect of the diaphragm 413 on the vibration generated by the bone conduction acoustic assembly 410 to the skin contact region of the user. The smaller the value of $|f1-f2|/f1$ is, the smaller the effect of the diaphragm 413 on the vibration received by the skin contact region of the user by the bone conduction acoustic assembly 410 is. It may also be understood that setting the diaphragm 413 in the acoustic output device 400 substantially does not bring a strong sense of vibration, thus ensuring a better experience for the user when wearing the acoustic output device 400. Therefore, on the basis of not affecting the original resonance system of the acoustic output device 400 as much as possible, the introduction of the diaphragm 413 enables the acoustic output device 400 to simultaneously output the bone conduction sound wave and the air conduction sound wave having the same phase or similar phases, thereby improving the acoustic performance of the acoustic output device 400 and making the acoustic output device 400 more energy efficient. By way of exemplary illustration, an offset in a low frequency range or a mid-low frequency range (e.g., $f1 \leq 500$ Hz) in the frequency response curve may meet a certain condition so that the low frequency and the mid-low frequency of the bone conduction sound wave are not affected as much as possible. In some embodiments, the offset in the low frequency range or the mid-low frequency range (e.g., $f1 \leq 500$ Hz) of the frequency response curve may be less than or equal to 50 Hz, i.e., $|f1-f2| \leq 50$ Hz, so that the diaphragm 413 does not interfere as much as possible with the bone conduction acoustic assembly 410 to generate a vibration in the skin contact region of the user. In some embodiments, the offset in the low frequency range or the mid-low frequency range (e.g., $f1 \leq 500$ Hz) in the frequency response curve may be greater than or equal to 5 Hz, i.e., $|f1-f2| \geq 5$ Hz, so that the diaphragm 413 has a certain structural strength and elasticity to reduce the fatigue deformation of the diaphragm 413 during use, thereby extending the service life of the diaphragm 413. It should be noted that in some embodiments, the skin contact region may include at least a portion of a housing region where the housing 420 is in contact with the skin of the user when the user is wearing the acoustic output device 400. For example, FIG. 5 is a schematic diagram illustrating a comparison of frequency response curves before and after setting a diaphragm in an acoustic output device according to some embodiments of the present disclosure. As shown in FIG. 5, the horizontal axis may represent frequency and its unit is Hz, and the vertical axis may represent intensity, and its unit is dB. The first frequency response curve 510 (shown as "k1+k2" in FIG. 5) described above has a resonance peak (point "A" in FIG. 5) in the low or mid-low frequency range (e.g., 10 Hz-500 Hz) with a peak resonance frequency f1 of about 112 Hz and a peak resonance intensity of about 88 dB. The second frequency response curve 520 (shown as "k1" in FIG. 5) has a resonance peak (point "B" in FIG. 5) in the low or mid-low frequency range (e.g., 10 Hz-500 Hz) with a peak resonance frequency f2 of about 95 Hz and a peak resonance intensity of about 87 dB. It can be seen that a difference (or absolute value) between the peak resonance frequency f1 and the peak resonance frequency f2 is about 17 Hz, i.e., an offset in the low or mid-low frequency range (e.g., $f1 \leq 500$ Hz) of the frequency response curve is about 17 Hz. A difference between the peak resonance intensity corresponding to the peak resonance frequency f1 and the peak resonance intensity corresponding to the peak resonance frequency f2 is about 1 dB. In some embodiments, within the elasticity range of the diaphragm, the greater the elasticity of the diaphragm is, the greater the offset in the frequency response curve in the low frequency range or the mid-low frequency range may be. By adjusting the elasticity of the diaphragm, the magnitude of the offset in the frequency response curve in a particular frequency range (e.g., the low frequency range or mid-low frequency range) may be adjusted. For example, the elasticity of the diaphragm is reduced (using a material with a smaller elastic coefficient)

to reduce the offset in the low or mid-low frequency range of the frequency response curve. Referring to FIG. 4 again, in some embodiments, the housing 420 may include a first portion and a second portion. The first portion of the housing 420 and the diaphragm 431 may form the first chamber 423. The first portion surrounding the first chamber 423 may be physically connected to the bone conduction acoustic assembly 410 (e.g., the one or more vibration plates 412), and the first portion of the housing 420 or the one or more vibration plates 412 provided on the first portion of the housing 420 may transfer a vibration from the bone conduction acoustic assembly 410 to the user's bones when the user is wearing the acoustic output device 400. The second portion of the housing 420 and the diaphragm 431 may form the second chamber 424. An air conduction sound wave generated by the air conduction acoustic assembly may be transmitted from the second chamber 424 to the outside of the acoustic output device 400.

In some embodiments, the housing 420 may include at least one sound outlet 421. The at least one sound outlet 421 may be used to transmit the air conduction sound wave from the second chamber 424 to the outside of the acoustic output device 400. In some embodiments, the at least one sound outlet 421 may be provided on a side wall of the second portion of the housing 420, and the at least one sound outlet 421 may be communicated with the second chamber 424. In some embodiments, a number of the at least one sound outlet 421 may be one or more. Due to the interaction between the magnetic field and the voice coil 413, the magnetic circuit system 411 may also receive a corresponding reaction force to vibrate and drive the diaphragm 431 to vibrate. The vibration of the diaphragm 431 may cause air in the second chamber 424 to vibrate. The air vibration in the second chamber 424 may generate the air conduction sound wave in the second chamber 424, and the air conduction sound wave may be transmitted from the second chamber 424 to the outside of the acoustic output device 400 through the at least one sound outlet 421.

In some embodiments, when the interaction action between the voice coil 413 and the magnetic circuit system 411 (i.e., the vibration of the voice coil 413 under the magnetic field provided by the magnetic circuit system 411) causes the housing 420 to move towards a front side of the acoustic output device 400 (i.e., along a direction indicated by arrow A or towards the user's skin) and the diaphragm 431 (it may be considered that the housing 420 moves in a direction indicated by arrow A, and the magnetic circuit system 411 and diaphragm 431 are immobile), the first chamber 423 in housing 420 becomes larger, the second chamber 424 becomes smaller, and a pressure in the second chamber 424 increases. When the housing 420 moves towards the user's skin, the pressure of the one or more of the vibration plates 412 acting on the user's skin may increase, and the bone conduction sound wave generated by the bone conduction acoustic assembly 410 may be defined as being in "positive phase." Similarly, the air conduction sound wave generated by the air conduction acoustic assembly may also be in "positive phase" due to the increased pressure in the second chamber 424. In some embodiments, the air conduction sound wave and the bone conduction sound wave may be in the same phase, i.e., a phase difference between the air conduction sound wave and the bone conduction sound wave may be equal to zero. In some embodiments, the phase difference between the air conduction sound wave and the bone conduction sound wave may be less than a threshold, e.g., $\pi$, $2\pi/3$, $1\pi/2$, etc. As used in the present disclosure, the phase difference between the air conduction sound wave and the bone conduction sound wave may refer to an absolute value of the difference between phases of the air conduction sound wave and the bone conduction sound wave. In some embodiments, difference frequency ranges of the air conduction sound wave and the bone conduction sound wave may correspond to different phase differences and different thresholds. For example, the phase difference between the air conduction sound wave and the bone conduction sound wave in a frequency range less than 300 Hz may be less than Tr. As another example, the phase difference between the air conduction sound wave and the bone conduction sound wave in a specific frequency range less than 1000 Hz (e.g., 300 Hz-1000 Hz) may be less than $2\pi/3$. As yet another example, the phase difference between the air conduction sound wave and the bone conduction sound wave in a specific frequency range less than 3000 Hz (e.g., 1000 Hz-3000 Hz) may be less than $1\pi/2$. Thus, the synchronization between the bone conduction sound wave and the air conduction sound wave may be increased so that the bone conduction sound wave and the air conduction sound wave may be superimposed, thereby improving the hearing effect.

In some embodiments, an actual area of an outlet end of the sound outlet 421 may be greater than or equal to 8 $mm^2$ so that the user can hear more of the air conduction sound wave output via the sound outlet 421. In other embodiments, the actual area of the outlet end of the sound outlet 421 may also be greater than or equal to any other value, e.g., 10 $mm^2$, 9 $mm^2$, 7 $mm^2$, 6 $mm^2$, etc. In some embodiments, an actual area of an inlet end of the sound outlet 421 may also be greater than or equal to the actual area of the outlet end thereof. In some embodiments, a damping structure (also referred to as an acoustic resistance net) (e.g., a tuning net, etc.) may be provided at the sound outlet 421 to improve the acoustic effect of the air conduction acoustic assembly. In some embodiments, an output feature of the air conduction sound wave may be adjusted by adjusting a number, a position, a size, and/or a shape of the sound outlet 421. It should be noted that an actual area of an outlet end in the embodiments of the present disclosure may be defined as a size of an area of an end surface where the outlet end is located, and an actual area of an inlet end in the embodiments of the present disclosure may be defined as a size of an area of an end surface where the inlet end is located. The area of the end surface where the outlet end is located may be understood as the area where the vibration can pass through the end surface of the outlet end with air as the medium. The area of the end where the inlet end is located may be understood as the area where vibration can pass through the end surface of the inlet end with air as the medium.

In some embodiments, the output feature of the bone conduction sound wave may be adjusted by adjusting a stiffness (e.g., a structural size, a material elastic modulus, etc.) of the vibration plate 412 and/or housing 420. In some embodiments, the output feature of the air conduction sound wave may be adjusted by adjusting a shape, an elastic coefficient, and a damping of the diaphragm 431.

Referring to FIG. 4 again, in some embodiments, at least one pressure relief hole 422 communicated with the first chamber 423 may be provided on the housing 420. For example, the pressure relief hole 422 may be provided in a side wall of a first housing of the housing 420. The first chamber 423 may be connected to the outside of the acoustic output device 400 through the pressure relief hole 422. In some embodiments, the pressure relief hole 422 and the sound outlet 421 may be provided on different side walls of the housing 420. In some embodiments, the pressure relief hole 422 and the sound outlet 421 may be provided on different side walls of the housing 420 that are not adjacent to each other, for example, side walls that are substantially parallel to each other. In some embodiments, the pressure relief hole 422 may be a communication hole that may facilitate pressure equalization between the first chamber 423 of the housing 420 and the outside of the acoustic output device 400. In some embodiments, the vibration of the magnetic circuit system 411 relative to the housing 420 may increase or decrease the pressure in the first chamber 423. The pressure relief hole 422 may regulate the pressure in the first chamber 423 by facilitating communication between the first chamber 423 and the outside, thereby maintaining mutual movement between the housing 420 and the magnetic circuit system 411 (and/or the diaphragm 431), and ensuring the normal vibration of the housing 420. In some embodiments, the pressure relief hole 422 may help to modulate the frequency response (e.g., the frequency response in the low frequency range) of the air conduction acoustic assembly to achieve further reduction in sound leakage. It can be understood that the vibration of the magnetic circuit system 411 relative to the housing 420 may cause the air vibration in the first chamber 423. The air conduction sound wave generated by the air vibration in the first chamber 423 may be transmitted to the outside of the acoustic output device 400 through the pressure relief hole 422, thereby generating sound leakage. In some embodiments, the size, structure, acoustic resistance, shape, and other parameters of the pressure relief hole 422 may be designed to adjust the frequency response of the air conduction acoustic assembly to reduce or suppress sound leakage. In some embodiments, an acoustic resistance net (not shown) may be provided at the pressure relief hole 422 to reduce an intensity of the resonance peak as described above, thereby reducing the frequency responses at the structure formed by the first chamber 423 and at the structure formed by the pressure relief hole 422 to achieve a further reduction in sound leakage. In some embodiments, the number of pressure relief holes 422 may be one or more, and a pressure relief hole 422 may be provided at any position corresponding to the side wall of the first chamber 423, which is not limited here.

In some embodiments, the number of pressure relief holes may be multiple. By way of exemplary illustration only, the at least one pressure relief hole may include a first pressure relief hole and a second pressure relief hole. The first pressure relief hole may be provided away from the sound outlet 421 compared to the second pressure relief hole. An effective area of an outlet end of the first pressure relief hole may be greater than an effective area of an outlet end of the second pressure relief hole. The effective area here, as well as an effective area of a particular channel (e.g., a sound guiding channel, etc.) or opening (e.g., a sound outlet, a tuning hole, a communication hole, etc.) introduced below, may be defined as a product of its actual area and a porosity of the covered acoustic resistance net, i.e., an area through which air can penetrate. For example, when an outlet end of a pressure relief hole is covered with an acoustic resistance net, the effective area of the outlet end of the pressure relief hole is the product of the actual area of the outlet end of the pressure relief hole and the porosity of the covered acoustic resistance net. As another example, when the outlet end of the pressure relief hole is not covered with the acoustic resistance net, the effective area of the outlet end of the pressure relief hole is the actual area of the outlet end of the pressure relief hole. Similarly, the effective area of the outlet end of the communication hole such as the sound guiding channel and the tuning hole mentioned later may be defined as the product of the actual area and the corresponding porosity respectively, which is not repeated here.

In some embodiments, the sound outlet 421 and the first pressure relief hole may be disposed on opposite sides of the bone conduction acoustic assembly 410, respectively. In some embodiments, the housing 420 of the acoustic output device 400 may include a first side wall, a second side wall, a third side wall, and a fourth side wall. The first side wall and the second side wall may be disposed on opposite sides of the bone conduction acoustic assembly 410. The third side wall and the fourth side wall are connected to the first side wall and said second side wall and spaced apart from each other. The sound outlet 421 and the first pressure relief hole may be disposed on the first side wall and the second side wall, respectively, and the second pressure relief hole may be disposed on the third side wall or the fourth side wall. In some embodiments, the at least one pressure relief hole may also include a third pressure relief hole. The effective area of the outlet end of the second pressure relief hole is larger than an effective area of an outlet end of the third pressure relief hole. The second pressure relief hole and the third pressure relief hole are provided on the third side wall and the fourth side wall, respectively. In some embodiments, the actual area of the outlet end of the first pressure relief hole is larger than the actual area of the outlet end of the second pressure relief hole, and the actual area of the outlet end of the second pressure relief hole is larger than an actual area of the outlet end of the third pressure relief hole.

In some embodiments, the diaphragm 431 may not be connected to the bone conduction acoustic assembly 410, and the peripheral side of the diaphragm 431 is directly physically connected to an inner wall of the housing 420, thereby separating the chamber within the housing 420 into a first chamber 423 and a second chamber 424. In some embodiments, a number of diaphragms 431 may be multiple, e.g., two or three, and the multiple diaphragms may be physically connected to the magnetic circuit system 411 of the bone conduction acoustic assembly 410, thereby separating the chamber inside the housing 420 into the first chamber 423 and the second chamber 424. For the situation when the diaphragms 431 are two, please refer to FIG. 20B and FIG. 20C, which is not repeated herein.

Figure 6:
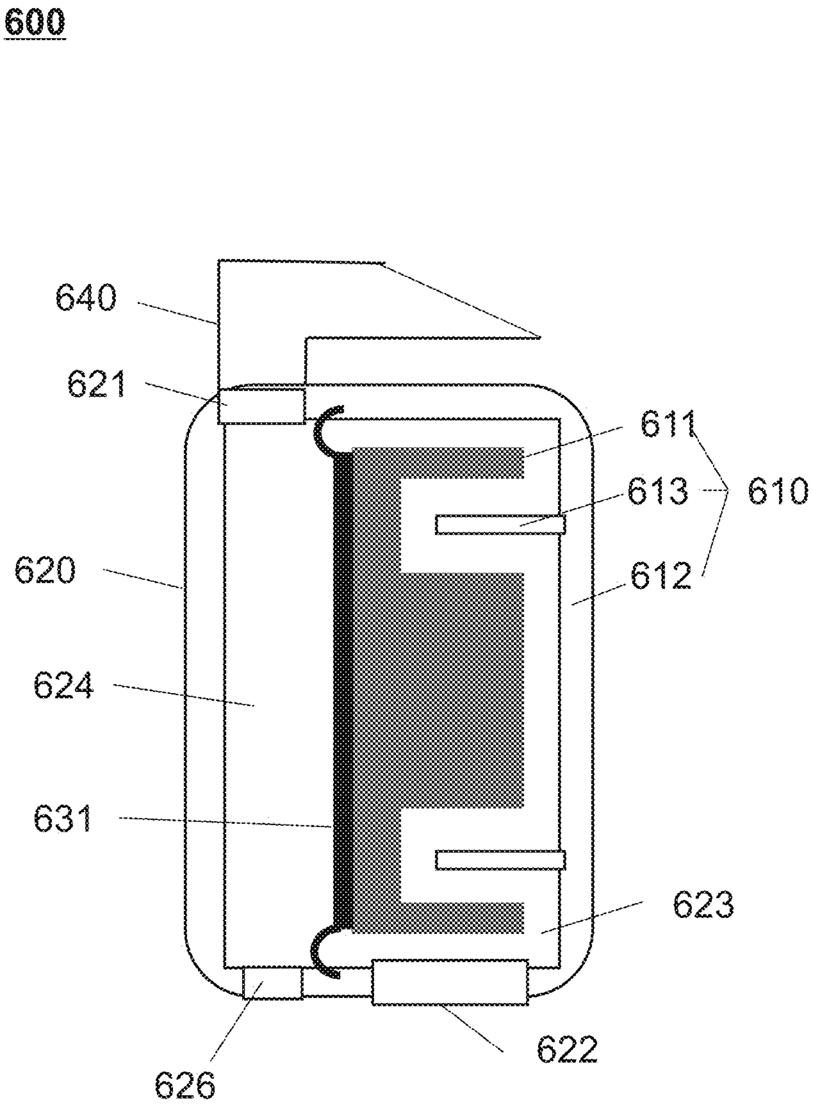
FIG. 6 is a schematic diagram illustrating an acoustic output device according to some other embodiments of the present disclosure.

FIG. 6 is a schematic diagram illustrating an acoustic output device according to some other embodiments of the present disclosure. An acoustic output device 600 may be the same as or similar to the acoustic output device 400 in FIG. 4. For example, the acoustic output device 600 may include a bone conduction acoustic assembly 610, a housing 620, and an air conduction acoustic assembly. As another example, the bone conduction acoustic assembly 610 may include a magnetic circuit system 611, one or more vibration plates 612, and a voice coil 613. The air conduction acoustic assembly may include a diaphragm 631. In some embodiments, a sound outlet 621 may be provided on the housing 620 and communicated with a second chamber 624, and a pressure relief hole 622 may be provided on the housing 620 and communicated with a first chamber 623. For more information about the components in the acoustic output device 600, please refer to descriptions in elsewhere in the present disclosure, e.g., FIG. 4.

As shown in FIG. 6, different from the acoustic output device 400, the acoustic output device 600 may further include a sound conduction component 640 connected to the housing 620. The sound conduction component 640 is provided with a sound guiding channel that is coupled to and communicated with the sound outlet 621. In some embodiments, the sound guiding channel may be used to guide the air conduction sound wave to the outside of the acoustic output device 600. In some embodiments, the sound conduction component 640 may also be used to change the propagation path and/or direction of the aforementioned air conduction sound wave, thereby changing the directivity of the air conduction sound wave. In some embodiments, the sound conduction component 640 may also be used to shorten a distance between the sound outlet 621 and the human ear, thereby increasing the intensity of the air conduction sound wave. When the user wears the acoustic output device 600, an end of the sound guiding channel of the sound conduction component 640 away from the sound outlet 621 may face the user's ear. In addition, the sound conduction component 640 may make an actual output position of the air conduction sound wave from the acoustic output device 600 more backward from a bottom wall of the housing 620 (i.e., a rear end surface (e.g., an end surface of the housing 620 corresponding to the second chamber 624) opposite the skin contact region on the housing 620), so as to improve the inverse phase cancellation of the possible sound leakage at the bottom wall to the sound at the sound outlet 621. In this way, the user may more easily hear the air conduction sound wave when the user wears the acoustic output device 600.

In some embodiments, to ensure the sound quality, a frequency response curve of the acoustic output device 600 should be relatively flat over a wide frequency range, that is, a resonance peak needs to be at a higher frequency as much as possible. The frequency response curve of the air conduction sound wave output to the outside of the acoustic output device 600 through the sound outlet 621 has a resonance peak. A peak resonance frequency of the resonance peak may be greater than or equal to 1 kHz. Preferably, the peak resonance frequency may be greater than or equal to 2 kHz, thus enabling the acoustic output device 600 to have a good speech output effect. More preferably, the peak resonance frequency may be greater than or equal to 3.5 kHz, thus enabling the acoustic output device 600 to have a good music output effect. Further preferably, the peak resonance frequency may also be greater than or equal to 4.5 kHz.

In order to increase the peak resonance frequency of the acoustic output device 600, in some embodiments, the sound guiding channel is communicated with the second chamber 624 through the sound outlet 621, which can form a Helmholtz resonator structure. The resonance frequency f of the Helmholtz resonator structure and structural parameters of the second chamber 624 and the sound guiding channel may satisfy Equation (2):

$$f \propto [S/(VL+1.7VR)]1/2, \tag{2}$$

where V denotes a volume of the second chamber 624, S denotes a cross-sectional area of the sound guiding channel, R denotes an equivalent radius of the sound guiding channel, and L denotes the length of the sound guiding channel. The equivalent radius refers to a radius of a circle that is the same as the area of the sound guiding channel when the shape of the sound guiding channel is approximately circular or non-circular. Based on Equation (2), it can be seen that for a certain volume of the second chamber 624, increasing the cross-sectional area of the sound guiding channel and/or decreasing the length of the sound guiding channel can increase the resonance frequency, which in turn allows the air conduction sound wave to move to high frequency.

In some embodiments, the length of the sound guiding channel may be less than or equal to 7 mm. In some embodiments, the length of the sound guiding channel may be less than or equal to 6 mm. Preferably, the length of the sound guiding channel may be between 2 mm and 5 mm.

In some embodiments, along a vibration direction of the bone conduction acoustic assembly 610, a distance between the outlet end of the sound guiding channel and an inner wall (inner surface of the top wall) of the housing 620 away from the skin contact region may be greater than or equal to 3 mm, so that the inverse phase cancellation of the air conduction sound wave at the outlet end of the sound guiding channel by the sound leakage generated by the bottom wall of the housing 620 (i.e., the end surface of the housing 620 corresponding to the second chamber 624) can be avoided.

In some embodiments, the cross-sectional area of the sound guiding channel may be greater than or equal to 4.8 $mm^2$. Preferably, the cross-sectional area of the sound guiding channel may be greater than or equal to 8 $mm^2$. In some embodiments, the cross-sectional area of the sound guiding channel may be gradually increased along an extension direction (i.e., in a transmission direction (i.e., a direction away from the sound outlet 621) of the air conduction sound wave) such that the sound guiding channel may be provided in a trumpet shape to facilitate the guiding of the air conduction sound wave. In some embodiments, the cross-sectional area of the inlet end of the sound guiding channel may be greater than or equal to 10 $mm^2$. In some embodiments, the cross-sectional area of the outlet end of the sound guiding channel may be greater than or equal to 15 $mm^2$. In some embodiments, the length of the sound guiding channel may be 2.5 mm, and the cross-sectional areas of the inlet end and the outlet end of the sound guiding channel may be 15 $mm^2$ and 25.3 $mm^2$, respectively. In some embodiments, a ratio of the volume of the sound guiding channel to the volume of the second chamber 624 may be between 0.05 and 0.9, wherein the volume of the second chamber 624 may be less than or equal to 400 $mm^3$. Preferably, the volume of the second chamber 624 may be between 200 $mm^3$ and 400 $mm^3$. Further, the volume of the second chamber 624 may be 350 $mm^3$. For more information about the sound conduction component, please refer to FIGS. 7A-7E.

Figure 7A:
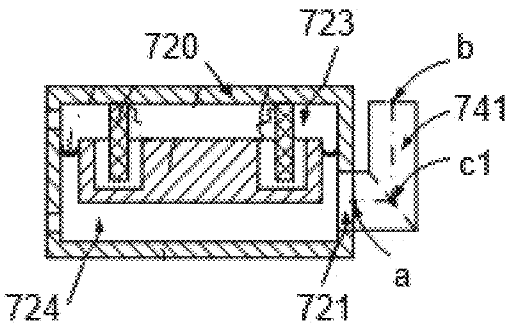
FIG. 7A is a structural diagram illustrating an exemplary sound conduction component according to some embodiments of the present disclosure.
Figure 7B:
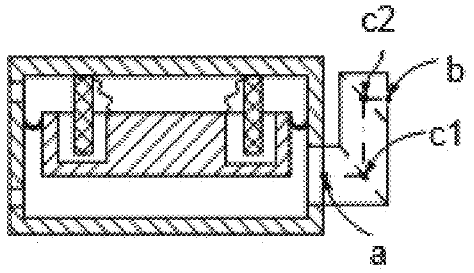
FIG. 7B is a structural diagram illustrating an exemplary sound conduction component according to some embodiments of the present disclosure.
Figure 7C:
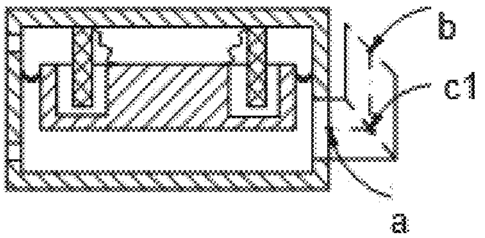
FIG. 7C is a structural diagram illustrating an exemplary sound conduction component according to some embodiments of the present disclosure.
Figure 7D:
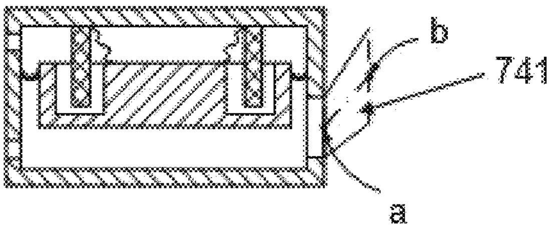
FIG. 7D is a structural diagram illustrating an exemplary sound conduction component according to some embodiments of the present disclosure.
Figure 7E:
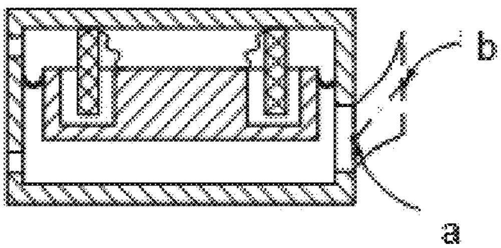
FIG. 7E is a structural diagram illustrating an exemplary sound conduction component according to some embodiments of the present disclosure.

FIG. 7A is a structural diagram illustrating an exemplary sound conduction component according to some embodiments of the present disclosure. FIG. 7B is a structural diagram illustrating an exemplary sound conduction component according to some embodiments of the present disclosure. FIG. 7C is a structural diagram illustrating an exemplary sound conduction component according to some embodiments of the present disclosure. FIG. 7D is a structural diagram illustrating an exemplary sound conduction component according to some embodiments of the present disclosure. FIG. 7E is a structural diagram illustrating an exemplary sound conduction component according to some embodiments of the present disclosure. In conjunction with FIGS. 7A to 7E, various structural variations of the sound conduction component are illustrated, respectively, the main difference between them lies in the specific structure of the sound guiding channel 741. In some embodiments, as shown in FIGS. 7A to 7C, the sound guiding channel 741 may have a bending structure. In some embodiments, as shown in FIGS. 7D and 7E, the sound guiding channel 741 may have a straight-through structure. Referring to FIGS. 7A to 7E, the air conduction sound waves (e.g., the frequency response, the transmission path) may vary with the structural differences of different sound guiding channel 741. It should be noted that the bended sound guiding channel 741 may include multiple straight lines as shown in FIGS. 7A to 7C (e.g., a right-angle bend). In some embodiments, the bended sound guiding channel may be bent along a curve line, e.g., an arcuate line, etc.

In some embodiments, as shown in FIG. 7A, a sound output direction of the sound guiding channel 741 may point to the user's face and is capable of increasing a distance from the outlet end of the sound guiding channel 741 to the rear end surface of the housing 720, thereby optimizing the directivity and intensity of the air conduction sound wave described above. Specifically, the outlet end of the sound guiding channel 741 is at a top end (end surface where b is located in FIG. 7) of the sound guiding channel 741 shown in FIG. 7A. When the user wears the acoustic output device, the top end of the sound guiding channel 741 points toward the user's face. In some embodiments, as shown in FIG. 7B, the sound output direction of the sound guiding channel 741 may point to the user's ear, so that the aforementioned air conduction sound wave can be easily collected by the ear and enter the ear canal, thereby optimizing the intensity of the aforementioned air conduction sound wave. Specifically, the outlet end of the sound guiding channel 741 is at a side wall of the sound guiding channel 741 away from the housing 720 as shown in FIG. 7B, and the outlet end of the sound guiding channel 741 may point to the user's ear when the user is wearing the acoustic output device. In some embodiments, as shown in FIG. 7C, the sound outlet direction of the sound guiding channel 741 may also point to the ear canal of the user, thereby optimizing the intensity of the aforementioned air conduction sound wave. In some embodiments, the outlet end of the sound guiding channel 741 may be set in an oblique outlet manner. The oblique outlet manner of the outlet end of the sound guiding channel in FIG. 7C may increase the cross-sectional area of the sound guiding channel 741 relative to the outlet end of the sound guiding channel in FIG. 7A, thereby facilitating the output of the aforementioned air conduction sound wave. Here, the oblique outlet refers that the outlet end of the sound guiding channel 741 has a certain angle (the angle is greater than 0) relative to a width direction of the sound guiding channel 741 (a horizontal direction of the sound guiding channel shown in FIG. 7C). When the user wears the acoustic output device shown in FIG. 7C, the outlet end of the sound guiding channel 741 may point to the ear canal of the user.

In some embodiments, as shown in FIG. 7D, a wall surface of the sound guiding channel 741 may be a flat surface, so that the sound guiding channel 741 can be easily removed from the mold during a manufacturing process. In some embodiments, as shown in FIG. 7E, a wall surface of the sound guiding channel 741 may be curved, thereby facilitating the acoustic impedance matching between the sound guiding channel 741 and the air outside the acoustic output device, which in turn facilitates the output of the aforementioned air conduction sound wave.

It should be noted that a cross-sectional area of a certain point of the sound guiding channel 741 may refer to the smallest area that can be intercepted when the sound guiding channel 741 is cut through this point. In some embodiments, a straight-through sound guiding channel may refer that the whole view of the other end can be observed from any one of its inlet end and the outlet end of the sound guiding channel. For example, with reference to the straight-through sound guiding channel shown in FIG. 7D or FIG. 7E, the length of the sound guiding channel 741 may be calculated by first determining a geometric center (e.g., point a) at the inlet end of the sound guiding channel 741 and a geometric center (e.g., point b) at the outlet end thereof; then joining the aforementioned geometric centers to form a line segment a-b, the length of the line segment a-b may be considered as the length of the sound guiding channel 741. In some embodiments, for the bended sound guiding channel, the whole view of the other end cannot be observed from any one of the inlet end and the outlet end of the sound guiding channel, or only a portion of the other end can be observed. For example, with reference to the bended sound guiding channel 741 shown in FIGS. 7A to 7C, the bended sound guiding channel may be divided into two or more straight-through sound guiding sub-channels, and a sum of lengths of the straight-through sound guiding sub-channels is taken as the length of the bended sound guiding channel. Specifically, in FIGS. 7A to 7C, a geometric center (e.g., points c1, c2) of a surface on which an intermediate bend is located is further determined, and the aforementioned geometric centers are joined to form a line segment a-c1-b (or a-c1-c2-b), the length of which can be considered as the length of the sound guiding channel 741.

Referring to FIG. 6, in some embodiments, the outlet end of the sound guiding channel may be covered with an acoustic resistance net. The acoustic resistance net may be used to adjust the acoustic resistance of the air conduction sound wave output to the outside of the acoustic output device 600 through the sound outlet 621, so as to weaken the peak resonance frequency of the resonance peak of the air conduction sound wave in the mid-high frequency range or in the high frequency range, thereby make the frequency response curve smoother. In some embodiments, the acoustic resistance net covering the outlet end of the sound guiding channel may, to a certain extent, separate the second chamber 624 from the outside of the acoustic output device 600, thereby increasing the waterproof and dustproof performance of the acoustic output device 600. In some embodiments, the acoustic resistance of the acoustic resistance net covering the outlet of the sound guiding channel may be less than or equal to 400 MKS rayls. In some embodiments, the acoustic resistance of the acoustic resistance net covering the outlet end of the sound guiding channel may be less than or equal to 260 MKS rayls. In some embodiments, the acoustic resistance of the acoustic resistance net covering the outlet end of the sound guiding channel may be less than or equal to 150 MKS rayls. In some embodiments, a porosity of the acoustic resistance net may be greater than or equal to 7%. In some embodiments, the porosity of the acoustic resistance net may be greater than or equal to 13%. In some embodiments, the porosity of the acoustic resistance net may be greater than or equal to 18%. In some embodiments, the porosity of the acoustic resistance net may be greater than or equal to 10 μm. In some embodiments, the porosity of the acoustic resistance net may be greater than or equal to 18 μm. In some embodiments, the porosity of the acoustic resistance net may be greater than or equal to 25 μm.

Figure 8:
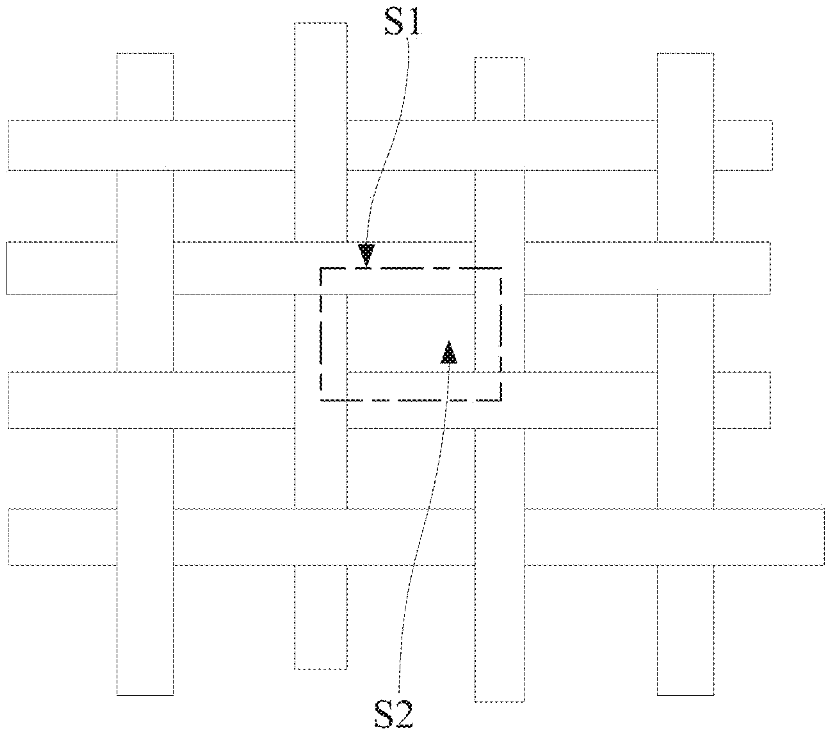
FIG. 8 is a schematic diagram illustrating a top view of an acoustic resistance net according to some embodiments of the present disclosure.

FIG. 8 is a schematic diagram illustrating a top view of an acoustic resistance net according to some embodiments of the present disclosure. As shown in FIG. 8, in some embodiments, the acoustic resistance net may be woven from gauze wires. Parameters (e.g., a wire diameter, a sparsity, etc.) of the gauze wires may affect the acoustic resistance of the acoustic resistance net. In some embodiments, every four intersecting gauze wires among the plurality of gauze wires arranged at intervals longitudinally and horizontally may enclose and form a hole. An area of a region enclosed by center lines of every four gauze wires may be defined as S1, an area of a region (i.e., a pore) actually enclosed by inner edges of every four gauze wires may be defined as S2, and a porosity may be defined as S2/S1. In some embodiments, a pore size may be expressed as a distance between any two adjacent gauze wires arranged longitudinally or horizontally, e.g., a side length of the pore, etc.

Further, an effective area of a particular hole or opening introduced in the present disclosure may be defined as a product of its actual area and a porosity of the corresponding covered acoustic resistance net. For example, when the outlet end of the sound guiding channel 741 is covered with an acoustic resistance net, the effective area of the outlet end of the sound guiding channel 741 is a product of the actual area of the outlet end of the sound guiding channel 741 and the porosity of the acoustic resistance net; and when the outlet end of the sound guiding channel 741 is not covered with an acoustic resistance net, the effective area of the outlet end of the sound guiding channel 741 is the actual area of the outlet end of the sound guiding channel 741. Similarly, an effective area of an outlet end of a hole such as a pressure relief hole, tuning hole, etc., mentioned later may also be defined as a product of an actual area and the corresponding porosity, which is not repeated here.

In addition to hearing the bone conduction sound wave, the user mainly hears the air conduction sound wave that is output to the outside of the acoustic output device 600 via the sound outlet 621 and the sound guiding channel, rather than the air conduction sound wave that is output to the outside of the acoustic output device 600 via the pressure relief hole 622. In order to make the user hear the air conduction sound wave output through the sound guiding channel in the acoustic output device 600, in some embodiments, the effective area of the outlet end of the sound guiding channel may be larger than the effective area of the outlet end of the pressure relief hole 622.

In some embodiments, a size of the pressure relief hole 622 may affect the smoothness of the exhaust of the first chamber 623 and the difficulty of the vibration of the diaphragm 613, which in turn affects the acoustic performance of the air conduction sound wave output to the outside of the acoustic output device 600 via the sound outlet 621. Therefore, when the effective area of the outlet end of the sound guiding channel is constant (e.g., the actual area of the outlet end of the sound guiding channel and/or the porosity of the acoustic resistance net are constant), adjusting the effective area of the outlet end of the pressure relief hole 622 (e.g., the actual area of the outlet end of the pressure relief hole 622 and/or the acoustic resistance of the acoustic resistance net covered thereon) may change the air conduction sound wave output to the outside of the acoustic output device 600 via the sound outlet 621. In some embodiments, as the actual area of the outlet end of the pressure relief hole 622 increases, the exhaust of the first chamber 623 becomes smoother and the intensity of the peak resonance in a low frequency range or mid-low frequency range increases. In some embodiments, the exhaust of the first chamber 623 is affected with the addition of an acoustic resistance net covering the outlet end of the pressure relief hole 622, such that the air conduction sound wave output to the outside of the acoustic output device 600 via the sound outlet 621 is reduced at a mid-low frequency (e.g., 100 Hz-200 Hz) and the frequency response curve at the mid-low frequency is relatively flat. In some embodiments, the sound leakage at the pressure relief hole may diminish with an increase in the actual area of the outlet end of the pressure relief hole and an increase in the acoustic resistance of the acoustic resistance net.

Figure 9:
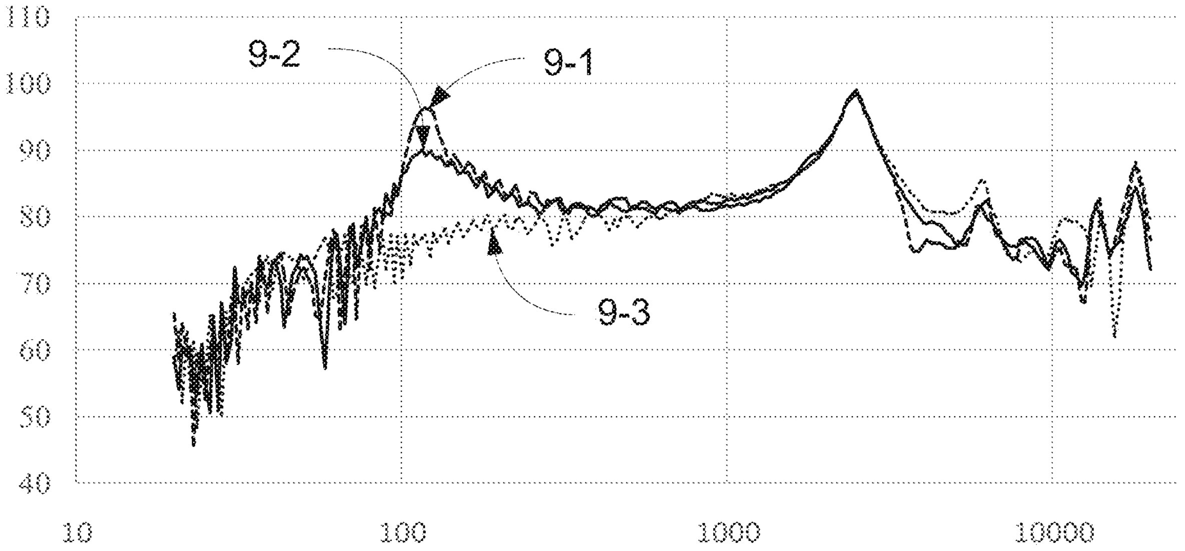
FIG. 9 is a schematic diagram illustrating frequency response curves of air conduction sound waves at sound conduction components of acoustic output devices having different configurations according to some embodiments of the present disclosure.

For example, FIG. 9 is a schematic diagram illustrating frequency response curves of air conduction sound waves at sound conduction components of acoustic output devices having different configurations according to some embodiments of the present disclosure. As shown in FIG. 9, frequency response curve 9-1 represents a frequency response curve at a sound conduction component of an acoustic output device that includes a pressure relief hole with an actual area of 31.57 $mm^2$ and is not covered with an acoustic resistance net. Frequency response curve 9-2 represents a frequency response curve at a sound conduction component of an acoustic output device that includes a pressure relief hole with an actual area of 2.76 $mm^2$ and is not covered with an acoustic resistance net. Frequency response curve 9-3 represents a frequency response curve at a sound conduction component of an acoustic output device that includes a pressure relief hole with an actual area of 2.76 $mm^2$, and is covered with an acoustic resistance net, wherein an acoustic resistance of the acoustic resistance net is 1000 MKS rayls and a porosity of the acoustic resistance net is 3%.

As shown in FIG. 9, the actual area of the pressure relief hole corresponding to the frequency response curve 9-1 is the largest, and the peak resonance intensity (e.g., 98 dB) in the low or mid-low frequency range (e.g., 100 Hz-200 Hz) corresponding to the frequency response curve 9-1 is also the largest compared to the frequency response curve 9-2 and the frequency response curve 9-3. With the actual area of the outlet end of the pressure relief hole 622 increases, the exhaust of the first chamber 623 becomes smoother and the peak resonance intensity of the low frequency range or mid-low frequency range increases. The acoustic resistance of the acoustic resistance net corresponding to the frequency response curve 9-3 is the largest, and the frequency response curve 9-3 has the smallest peak resonance intensity in the low frequency range or mid-low frequency range compared to the frequency response curve 9-1 and the frequency response curve 9-2. The frequency response curve 9-3 is flatter in the low frequency range or mid-low frequency range relative to the frequency response curve 9-1 and the frequency response curve 9-2. When the acoustic resistance net is added at the outlet end of the pressure relief hole 622, the exhaust of the first chamber 623 is affected so that the air conduction sound wave output to the outside of the acoustic output device 600 via the sound outlet 621 is reduced at the mid-low frequency (e.g., 100 Hz-200 Hz) and the frequency response curve at the mid-low frequency is relatively flat.

Figure 10:
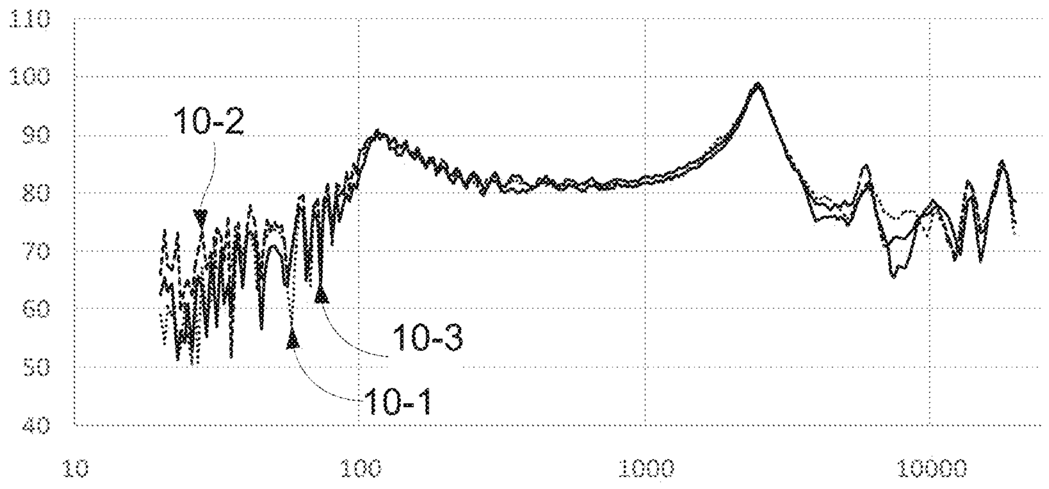
FIG. 10 is a schematic diagram illustrating frequency response curves of air conduction sound waves output to the outside of acoustic output devices via sound outlets according to some embodiments of the present disclosure.

For example, FIG. 10 is a schematic diagram illustrating frequency response curves of air conduction sound waves output to the outside of acoustic output devices via sound outlets according to some embodiments of the present disclosure. As shown in FIG. 10, frequency response curve 10-1 represents a frequency response curve at a sound outlet of an acoustic output device that includes a pressure relief hole with an actual area of 2.76 $mm^2$ and is not covered with an acoustic resistance net. Frequency response curve 10-2 represents a frequency response curve at a sound outlet of an acoustic output device that includes a pressure relief hole with an actual area of 31.57 $mm^2$, and is covered with an acoustic resistance net with an acoustic resistance of 145 MKS rayls and a porosity of 14%. Frequency response curve 10-3 represents a frequency response curve at a sound outlet of an acoustic output device that includes a pressure relief hole with an actual area of 71.48 $mm^2$, and is covered with an acoustic resistance net with an acoustic resistance of 290 MKS rayls and a porosity of 7%. Referring to FIG. 10, the actual area of the pressure relief hole corresponding to the frequency response curve 10-3 is the largest, and the acoustic resistance of the corresponding acoustic resistance net is also the largest, so that the effective area of the outlet end of the pressure relief hole may be approximately the consistent, and the degrees of smoothness of the exhaust at the pressure relief hole with different actual areas communicated with the first chamber are approximately the same. Therefore, the frequency response curves of the air conduction sound waves output from the acoustic output devices with the pressure relief holes of different actual areas to the outside of the acoustic output devices through the sound outlets have approximately the same flatness in the whole frequency range.

Figure 11:
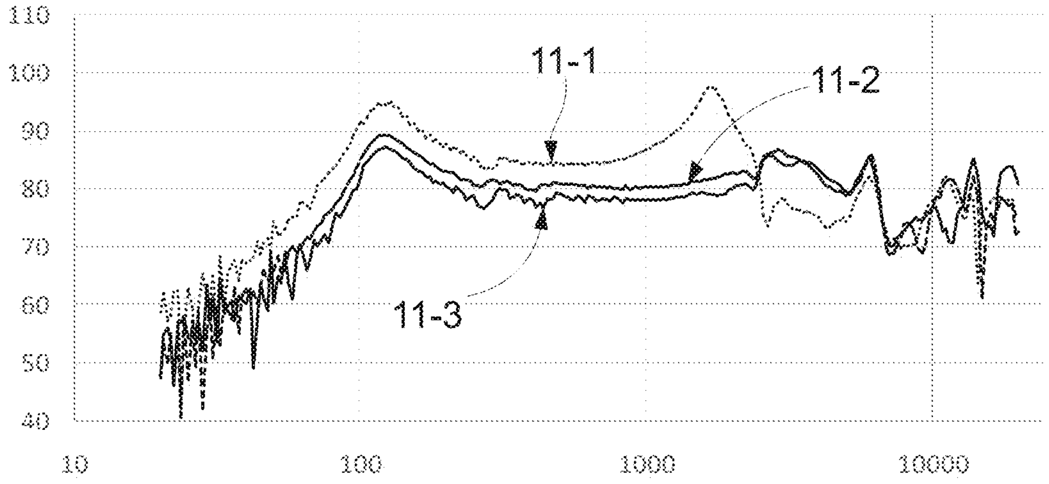
FIG. 11 is a schematic diagram illustrating frequency response curves of air conduction sound waves output to the outside of acoustic output devices via pressure relief holes according to some embodiments of the present disclosure.

As another example, FIG. 11 is a schematic diagram illustrating frequency response curves of air conduction sound waves output to the outside of acoustic output devices via pressure relief holes according to some embodiments of the present disclosure. As shown in FIG. 11, frequency response curve 11-1 represents a frequency response curve at a pressure relief hole of an acoustic output device that includes a pressure relief hole with an actual area of 2.76 $mm^2$ and is not covered with an acoustic resistance net. Frequency response curve 11-2 represents a frequency response curve at a pressure relief hole of an acoustic output device that includes a pressure relief hole with an actual area of 31.57 $mm^2$, and is covered with an acoustic resistance net with an acoustic resistance of 145 MKS rayls and a porosity of 14%. Frequency response curve 11-3 represents a frequency response curve at a pressure relief hole of an acoustic output device that includes a pressure relief hole with an actual area of 71.48 $mm^2$, and is covered with an acoustic resistance net with an acoustic resistance of 290 MKS rayls and a porosity of 7%. In some embodiments, although the frequency response curves of air conduction sound waves output from the acoustic output devices with different pressure relief holes to the outside of the acoustic output devices through the sound outlets are approximately consistent, the frequency response curves of air conduction sound waves output to the outside of the acoustic output devices through different pressure relief holes are different, and it can be understood that the sound leakages at different pressure relief holes are not the same. Referring to FIG. 11, the frequency response curves corresponding to the actual areas of the pressure relief holes from large to small are frequency response curve 11-3, frequency response curve 11-2, and frequency response curve 11-1. Correspondingly, frequency response curve 11-3, frequency response curve 11-2, and frequency response curve 11-1 shift downward as a whole. As can be seen from FIG. 11, with the actual area of the outlet end of the pressure relief hole increases and the acoustic resistance of the acoustic resistance net increases, the overall frequency response curve of the air conduction sound wave output through the pressure relief hole to the outside of the acoustic output device shifts downward. It can also be understood that the intensity of sound leakage at the pressure relief hole may diminish with the increase of the actual area of the outlet end of the pressure relief hole and the increase of the acoustic resistance of the acoustic resistance net.

For example, the size of the pressure relief hole may be relatively large so that the resonance peak (Helmholtz resonance) of the first chamber of the housing may correspond to a higher frequency. In this way, the sound leakage at the mid-low frequency propagating from the pressure relief hole may be suppressed. In some embodiments, the larger the size of the pressure relief hole is, the smaller the acoustic impedance may be, and the smaller the sound pressure value of the air conduction sound wave generated at the pressure relief hole is, which may reduce the sound leakage at the pressure relief hole. In some embodiments, under a condition that the frequency response curve of the air conduction sound wave at the sound conduction component remains substantially unchanged, the size (i.e., the actual area) of the pressure relief hole may be increased, and/or the acoustic resistance of the acoustic resistance net covering the pressure relief hole may be increased, so as to make the sound leakage at the pressure relief hole as small as possible. In some embodiments, under a condition that the effective area of the outlet end of the pressure relief hole is less than or equal to 2.76 $mm^2$, the sound leakage at the pressure relief hole may be reduced by increasing the actual area of the outlet end of the pressure relief hole and the porosity of the acoustic resistance net.

It should be noted that since the size of the housing 620 is limited, a single pressure relief hole 622 cannot be too large. Based on this, as at least one or at least two, for example, three pressure relief holes 622 may be provided.

Based on the detailed description above, the effective area of the outlet end of the sound guiding channel may be greater than the effective area of the outlet end of each pressure relief hole 622 to facilitate the user to hear the air conduction sound wave output to the outside of the acoustic output device 600 via the sound outlet 621. Based on the definition of effective area, the actual area of the outlet end of the sound guiding channel may be greater than the actual area of the outlet end of each pressure relief hole 622. Further, the effective area of the outlet end of the sound guiding channel may be greater than or equal to the sum of the effective areas of the outlet ends of all of the pressure relief holes 622. Preferably, a ratio of the sum of the effective areas of the outlet ends of all the pressure relief holes 622 to the effective area of the outlet end of the sound guiding channel may be greater than or equal to 0.08. In some embodiments, the ratio of the sum of the effective areas of the outlet ends of all the pressure relief holes 622 to the effective area of the outlet end of the sound guiding channel may be greater than or equal to 0.15. In some embodiments, the ratio of the sum of the effective areas of the outlet ends of all the pressure relief holes 622 to the effective area of the outlet end of the sound guiding channel may be greater than or equal to 0.25. In some embodiments, the ratio of the sum of the effective areas of the outlet ends of all the pressure relief holes 622 to the effective area of the outlet end of the sound guiding channel may be greater than or equal to 0.3. By way of exemplary illustration, the effective areas of the outlet ends of all the pressure relief holes 622 may be greater than or equal to 2.5 $mm^2$ to ensure smooth exhaust of the first chamber 623, thereby improving the acoustic performance of the air conduction sound wave output to the outside of the acoustic output device 600 via the sound outlet 621 and reducing the sound leakage at the pressure relief hole 622.

In some embodiments, the actual area of the outlet end of the sound guiding channel may be greater than or equal to 4.8 $mm^2$. Preferably, the actual area of the outlet end of the sound guiding channel may be greater than or equal to 8 $mm^2$. In some embodiments, the sum of the actual areas of the outlet ends of all the pressure relief holes 622 may be greater than or equal to 2.6 $mm^2$. In some embodiments, the actual areas of the outlet ends of all the pressure relief holes 622 may be greater than or equal to 10 $mm^2$. When the number of pressure relief holes 622 is one, the sum of the actual areas of the outlet ends of all the pressure relief holes 622 is also the actual area of the outlet end of the one pressure relief hole 114. In some embodiments, the actual area of the outlet end of the sound guiding channel may be 25.3 $mm^2$; three pressure relief holes 622 may be provided, for example, the pressure relief holes 622 may include a first pressure relief hole, a second pressure relief hole, and a third pressure relief hole. The actual areas of the outlet ends of the pressure relief holes may be 11.4 $mm^2$, 8.4 $mm^2$, and 5.8 $mm^2$, respectively.

Referring to FIG. 6, in some embodiments, the housing 620 may be provided with at least one tuning hole 626, and the at least one tuning hole 626 may be used to reduce standing waves generated by the acoustic output device 600 during working. Specifically, the air conduction sound wave generated by the air conduction acoustic assembly (also referred to as the original air conduction sound wave) may collide with the bottom surface of the housing 620 and be reflected by the bottom surface of the housing 620 during transmission. The reflected air conduction sound wave and the original air conduction sound wave may form a standing wave, resulting in distortion of the sound output at the sound outlet 621. In some embodiments, by arranging the at least one tuning hole 626 on the housing 620, a portion of the air conduction sound wave may be output directly from the at least one tuning hole 626, thereby preventing the partially reflected air conduction sound wave from forming the standing wave with the original air conduction sound wave. In some embodiments, the at least one tuning hole 626 may be located on a side wall that is not adjacent to the side wall of the housing where the sound outlet 621 is located. In some embodiments, the at least one tuning hole 626 may be located on one or more side walls adjacent to the side wall on which the sound outlet 621 is located. For example, the housing 620 may include at least four side walls that are physically connected in sequence. The sound outlet 621 may be disposed on a first side wall, and the pressure relief hole 622 may be disposed on a second side wall that is not adjacent to the first side wall. The first side wall and the second side wall may be substantially parallel. The at least one tuning hole 626 may be provided on the second side wall, a third side wall, a fourth side wall, etc. The third and fourth side walls may be adjacent to the first side wall. In some embodiments, the size (e.g., area) of a tuning hole 626 may be 1 $mm^2$-50 $mm^2$. In some embodiments, the size of a tuning hole 626 may be 5 $mm^2$-30 $mm^2$. In some embodiments, the size of a tuning hole 626 may be 10 $mm^2$-20 $mm^2$.

In some embodiments, a tuning hole 626 may also be located on a side wall opposite the side wall of the housing where the sound outlet 621 is located, wherein the tuning hole 626 may increase resonance frequencies of the air in the second chamber 624 and/or the first chamber 623. In some embodiments, the resonance frequencies of the air in the second chamber 624 and the first chamber 623 may be the same. In some embodiments, the resonance frequencies of the air in the second chamber 624 and/or the first chamber 623 may be equal to or greater than 4000 Hz, or equal to or greater than 5000 Hz, etc. In some embodiments, the resonance frequency of the air in the second chamber 624 may be in a range of 5500 Hz-6000 Hz, or in a range of 4000 Hz-6000 Hz, etc. In some embodiments, the resonance frequency of the air in the first chamber 623 may be in a range of 4500 Hz-5000 Hz, or in a range of 4000 Hz-5000 Hz, etc.

In some embodiments, a tuning hole 626 may be a communication hole. At least one of the one or more tuning holes 626 may be covered by an acoustic resistance material (e.g., a tuning cotton). In some embodiments, the acoustic resistance material may include an acoustic resistance in a range of 5 MKS rays-500 MKS rays, or in a range of 10 MKS rays-260 MKS rays, or in a range of 20 MKS rays-200 MKS rays, etc.

In some embodiments, in order to increase the volume of sound output from the sound guiding channel and reduce the volume of sound leakage at a tuning hole 626, a damping structure (e.g., a damping net) may be provided at the tuning hole 626. The damping structure at the tuning hole 626 may be configured to improve the acoustic resistance and regulate (e.g., reduce) the amplitude of the sound wave leaking from the tuning hole 626. When the amplitude of the sound wave leaking from the tuning hole 626 and the amplitude of the sound wave leaking from the pressure relief hole 622 are the same or approximately the same, the sound wave leaking from the tuning hole 626 and the sound wave leaking from the pressure relief hole 622 may cancel each other out, at which point the sound leakage may be reduced and the sound output of the sound guiding channel may be increased. It should be noted that in some embodiments, the number of tuning holes 626 and the number of pressure relief holes 622 may be the same or different.

In some embodiments, the number of tuning holes 626 may be one, for example, the at least one tuning hole 626 may be a first tuning hole, and the sound outlet 621 and the first tuning hole are provided on the first side wall and the second side wall of the housing 620, respectively. In some embodiments, the number of tuning holes 626 may be two, for example, the at least one tuning hole 626 may also include a second tuning hole, and the second tuning hole may be provided on the third side wall or the fourth side wall of the housing 620.

In some embodiments, the diaphragm 631 may not be connected to the bone conduction acoustic assembly 610, and the peripheral side of the diaphragm 631 is directly physically connected to the inner wall of the housing 620, thereby separating chamber within the housing 620 into the first chamber 623 and the second chamber 624. In some embodiments, a number of diaphragms 631 may be multiple, e.g., two or three, and the multiple diaphragms may be physically connected to the magnetic circuit system 611 of the bone conduction acoustic assembly 610, thereby separating the chamber in the housing 620 into the first chamber 623 and the second chamber 624. For more information about the case when the diaphragms 631 are two, please refer to FIG. 20B and FIG. 20C, which is not repeated here.

Figure 12A:
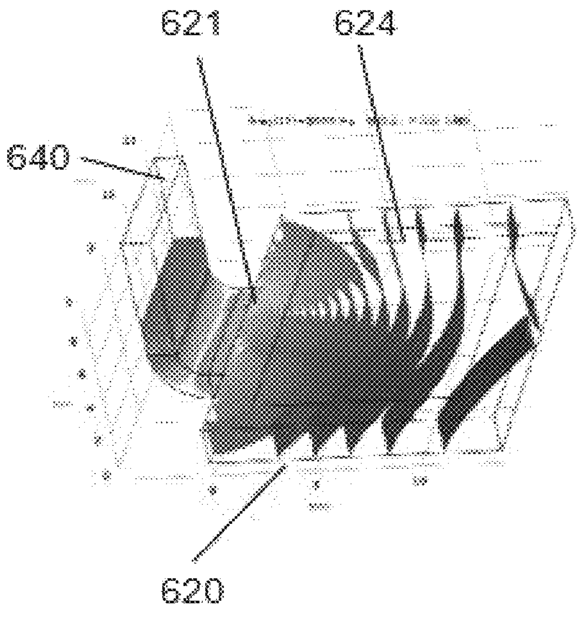
FIG. 12A is a schematic diagram illustrating a sound pressure distribution of a second chamber when an acoustic output device is not provided with a tuning hole according to some embodiments of the present disclosure.
Figure 12B:
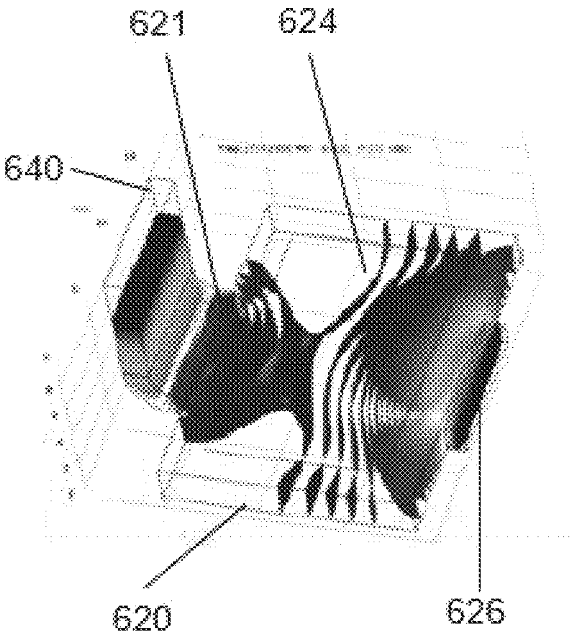
FIG. 12B is a schematic diagram illustrating a sound pressure distribution of a second chamber when an acoustic output device is provided with a tuning hole according to some embodiments of the present disclosure.

FIG. 12A is a schematic diagram illustrating a sound pressure distribution of a second chamber when an acoustic output device is not provided with a tuning hole according to some embodiments of the present disclosure. FIG. 12B is a schematic diagram illustrating a sound pressure distribution of a second chamber when an acoustic output device is provided with a tuning hole according to some embodiments of the present disclosure. In some embodiments, the sound guiding channel may be communicated with the second chamber via the sound outlet, thereby constituting a typical Helmholtz resonator structure with one or more resonance peaks. In some embodiments, the distribution of sound pressure in the second chamber during resonance of the Helmholtz resonator structure may be studied. In conjunction with FIG. 12A and FIG. 6, a high-pressure region (darker colored region in FIG. 12A) away from the sound outlet 621 and a low-pressure region (lighter colored region in FIG. 12A) near the sound outlet 621 may be formed in the second chamber 624. As used herein, the high-pressure region refers to a region with higher sound pressure in the second chamber and the low-pressure region refers to a region with lower sound pressure in the second chamber. In some embodiments, when the Helmholtz resonator structure resonates, a standing wave may be considered to occur in the second chamber 624. For example, the larger the size of the second chamber 624 is, (i.e., the longer the distance between the low-pressure region and the high-pressure region is), the longer a wavelength of the standing wave is and the lower the resonance frequency of the Helmholtz resonator structure is. In some embodiments, in conjunction with FIG. 12B, by destroying the high-pressure region, the sound originally reflected in the high-pressure region cannot be reflected, so that the standing wave cannot be formed. In this case, when the Helmholtz resonator structure resonates, the high-pressure region in the second chamber 624 moves towards the low-pressure region, so that the wavelength of the standing wave becomes shorter, thereby increasing the resonance frequency of the Helmholtz resonator structure. In some embodiments, the means of destroying the high-pressure region may include, but is not limited to, providing a hole (i.e., a tuning hole 626) in the high-pressure region that is communicated with the second chamber 624, for example, the means of destroying the high-pressure region may be providing a pipeline communicated with the outside of the acoustic output device 600, etc.

Figure 13:
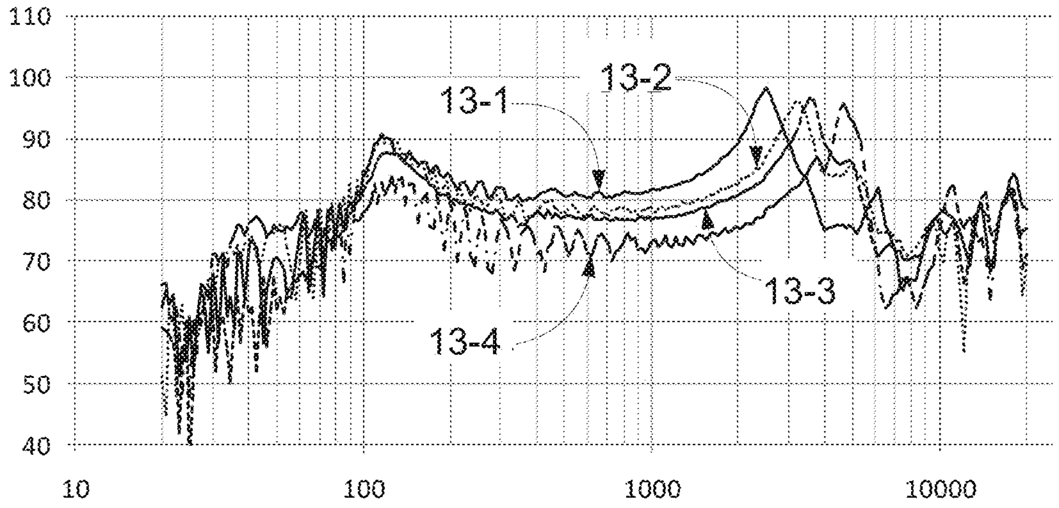
FIG. 13 is a schematic diagram illustrating frequency response curves of air conduction sound waves at sound conduction components according to some embodiments of the present disclosure.

FIG. 13 is a schematic diagram illustrating frequency response curves of air conduction sound waves at sound conduction components according to some embodiments of the present disclosure. As shown in FIG. 13, frequency response curve 13-1 represents a frequency response curve at a sound conduction component of an acoustic output device when a tuning hole is in a closed state. Frequency response curve 13-2 represents a frequency response curve at a sound conduction component of an acoustic output device when an actual area of a tuning hole is 1.7 $mm^2$. Frequency response curve 13-3 represents a frequency response curve at a sound conduction component of an acoustic output device when an actual area of a tuning hole is 2.8 $mm^2$. Frequency response curve 13-4 represents a frequency response curve at a sound conduction component of an acoustic output device when an actual area of a tuning hole is 28.44 $mm^2$. In conjunction with FIG. 6, the tuning hole 626 may be provided in the high-pressure region within the second chamber 624, such that the tuning hole 626 may effectively destroy the high-pressure region. By way of exemplary illustration only, the tuning hole 626 may be provided on the side wall of the housing 620 opposite the side wall of the housing 620 where the sound outlet 621 and the sound guiding channel are located. Referring to FIG. 13, the frequency response curves corresponding to the actual area of the tuning hole 626 from large to small are frequency response curve 13-4, frequency response curve 13-3, frequency response curve 13-2, frequency response curve 13-1. As the actual area of the outlet end of the tuning hole increases, the frequency response curve of the air conduction sound wave at the sound conduction component shifts downward as a whole. That is to say, in the full frequency range, the intensity of the sound conduction sound wave output from the outlet end of the sound conduction component decreases with the increase of the actual area of the outlet end of the tuning hole. In some embodiments, the frequency response curve of the air conduction sound wave output to the outside of the acoustic output device 600 through the sound outlet 621 may have a resonance peak. In the case where the tuning hole 626 is not covered with an acoustic resistance net, adjusting the actual area of the outlet end of the tuning hole 626 may control a damage degree of the tuning hole 626 to the above-mentioned high-pressure region, thereby adjusting the peak resonance frequency of the resonance peak.

In some embodiments, the larger the actual area of the outlet end of the tuning hole 626 is, the more obvious the destructive effect of the tuning hole 626 on the above-mentioned high-pressure region is, and the higher the peak resonance frequency of the resonance peak in the frequency response curve is. In some embodiments, the peak resonance frequency of the resonance peak when the tuning hole 626 is in an open state is shifted to high frequency compared to the peak resonance frequency of the resonance peak when the tuning hole 626 is in a closed state, and an offset may be greater than or equal to 500 Hz. Preferably, the aforementioned offset is greater than or equal to 1 kHz. In some embodiments, the peak resonance frequency of the resonance peak when the tuning hole 626 is in the open state may be greater than or equal to 2 kHz, so that the acoustic output device 600 can have a better speech output. Preferably, the peak resonance frequency may be greater than or equal to 3.5 kHz. More preferably, the peak resonance frequency may be greater than or equal to 4.5 kHz. It should be noted that here the tuning hole 626 is in the open state may refer to the case where the housing 620 is provided with a tuning hole and the tuning hole is working normally. Correspondingly, the tuning hole 626 in the closed state may refer to the case where the housing 620 is not equipped with a tuning hole or the housing 620 is equipped with a tuning hole but the tuning hole is closed and cannot work normally.

It should be noted that the size of the housing 620 is limited, a single tuning hole 626 cannot be too large. Based on this, at least one tuning hole 626 may be provided, for example, the aforementioned tuning holes 626 includes a first tuning hole and a second tuning hole. In some embodiments, the tuning hole 626 may also be located in any region between the high and low-pressure regions within the second chamber 624, which is not limited here.

In some embodiments, referring to FIGS. 6 and 10, when the tuning hole 626 is added to the second chamber 624, a portion of the sound is leaked out from the tuning hole 626 (i.e., the sound leakage is formed at the tuning hole 626), resulting in an overall downward shift in the frequency response curve of the air conduction sound wave output to the outside of the acoustic output device 600 via the sound outlet 621. Thus, in some embodiments, the outlet end of the tuning hole 626 may be covered with an acoustic resistance net such that the tuning hole 626 prevent sound from leaking out from the tuning hole 626 as much as possible while destroying the high-pressure region within the second chamber 624.

Figure 14:
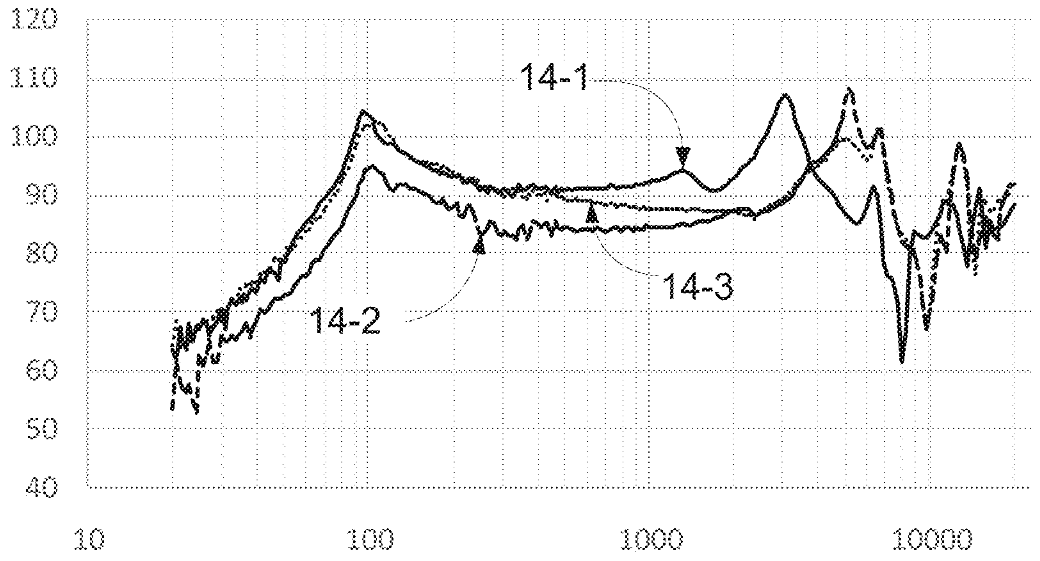
FIG. 14 is a schematic diagram illustrating frequency response curves of air conduction sound waves at sound conduction components according to some embodiments of the present disclosure.

FIG. 14 is a schematic diagram illustrating frequency response curves of air conduction sound waves at sound conduction components according to some embodiments of the present disclosure. As shown in FIG. 14, frequency response curve 14-1 represents a frequency response curve at a sound conduction component of an acoustic output device without a tuning hole. Frequency response curve 14-2 represents a frequency response curve at a sound conduction component of an acoustic output device without an acoustic resistance net at a tuning hole. Frequency response curve 14-3 represents a frequency response curve at a sound conduction component of an acoustic output device when an acoustic resistance of an acoustic resistance net covering the tuning hole is 145 MKS rayls. Referring to FIG. 14 and FIG. 6, the addition of the acoustic resistance net at the outlet end of the tuning hole 626 allows the second chamber 624 to have no significant reflected sound waves (i.e., no standing waves) at the tuning hole 626, so that the high pressure inside the second chamber 624 can be shifted inward. In some embodiments, the addition of the acoustic resistance net at the outlet end of the tuning hole 626 may also prevent the sound from leaking out from the tuning hole 626 to a certain extent, so that more sound can be output to the outside of the acoustic output device 600 via the sound outlet 621. As can be seen from FIG. 14, the peak resonance intensity in the mid-low frequency range of frequency response curve 14-3 is enhanced compared to the peak resonance intensity in the mid-low frequency range of frequency response curve 14-2.

In some embodiments, the addition of the acoustic resistance net at the outlet end of the tuning hole 626 may cause a significant increase in the peak resonance intensity in a low frequency range (e.g., 90 Hz-200 Hz) of the frequency response curve, and an increase in the volume of the air conduction sound wave. The peak resonance intensity in the high frequency range (e.g., 500 Hz-1000 Hz) is reduced to a certain extent, resulting in a flatter frequency response curve in the high frequency range and a more balanced sound quality in the high frequency range. In some embodiments, adjusting the effective area of the outlet end of the tuning hole 626 (e.g., the actual area of the outlet end of the tuning hole 626 and/or the acoustic resistance of the acoustic resistance net covered thereon) may cause the air conduction sound wave output to the outside of the acoustic output device 600 via the sound outlet 621 to vary.

Based on the above description, in some embodiments, an effective area of the outlet end of the first tuning hole may be greater than an effective area of the outlet end of the second tuning hole. In some embodiments, an actual area of the outlet end of the first tuning hole may be greater than an actual area of the outlet end of the second tuning hole. In some embodiments, the actual area of the outlet end of the first tuning hole may be greater than or equal to 3.8 $mm^2$, and/or the actual area of the outlet end of the second tuning hole may be greater than or equal to 2.8 $mm^2$. In some embodiments, a sum of effective areas of the outlet ends of all the tuning holes may be greater than or equal to 1.5 $mm^2$. In some embodiments, the outlet ends of the first tuning hole and the second tuning hole may be respectively covered with an acoustic resistance net whose porosity is greater than or equal to 13%. In some embodiments, the outlet ends of the first tuning hole and the second tuning hole may be respectively covered with an acoustic resistance net whose porosity is less than or equal to 16%.

In some embodiments, in conjunction with FIG. 6, the phases of the air conduction sound waves output to the outside of the acoustic output device 600 through the pressure relief hole 622 and the sound outlet 621, respectively, may be reversed, so that the pressure relief hole 622 may be provided away from the sound outlet 621 to avoid cancellation interference of the air conduction sound waves output to the outside of the acoustic output device 600 through the pressure relief hole 622 and the sound outlet 621, respectively. For example, the pressure relief hole 622 and the sound outlet 621 may be located on opposite side walls of the housing 620, respectively. In some embodiments, for the tuning hole 626 and the sound outlet 621, a region where the sound outlet 621 is located may be considered as a low-pressure region within the second chamber 624, and a region within the second chamber 624 furthest from the region where the sound outlet 621 is located may be considered as a high-pressure region within the second chamber 624. In some embodiments, the tuning hole 626 may preferably be provided in the high-pressure region within the second chamber 624 to destroy the original high-pressure region and move it toward the low-pressure region.

In some embodiments, due to the pressure relief hole 622 is communicated with the first chamber 623, and the tuning hole 626 is communicated with the second chamber 624, the phases of the air conduction sound waves output to the outside of the acoustic output device 600 via the pressure relief hole 622 and the tuning hole 626, respectively, may be reversed so that the sound leakage from the pressure relief hole 622 and the tuning hole 626 may be reduced by cancellation interference. In some embodiments, at least a portion of the pressure relief holes 622 and at least a portion of the tuning holes 626 may be provided adjacent to each other (e.g., at least a portion of the pressure relief holes 622 and at least a portion of the tuning holes 626 may be provided on adjacent side walls of the housing 620), such that the air conduction sound waves output to the outside of the acoustic output device 600 via the pressure relief holes 622 and the tuning holes 626 may have destructive interference. In some embodiments, in order to better cause the destructive interference between the sound leakages of the pressure relief hole 622 and the tuning hole 626, a distance between adjacent pressure relief hole 622 and tuning hole 626 may be as small as possible. For example, in some embodiments, a distance between the adjacent pressure relief hole 622 and the tuning hole 626 may be less than or equal to 2 mm. Specifically, a minimum distance between contours of the outlet ends of the adjacent pressure relief hole 622 and the tuning hole 626 may be less than or equal to 2 mm.

Figure 15:
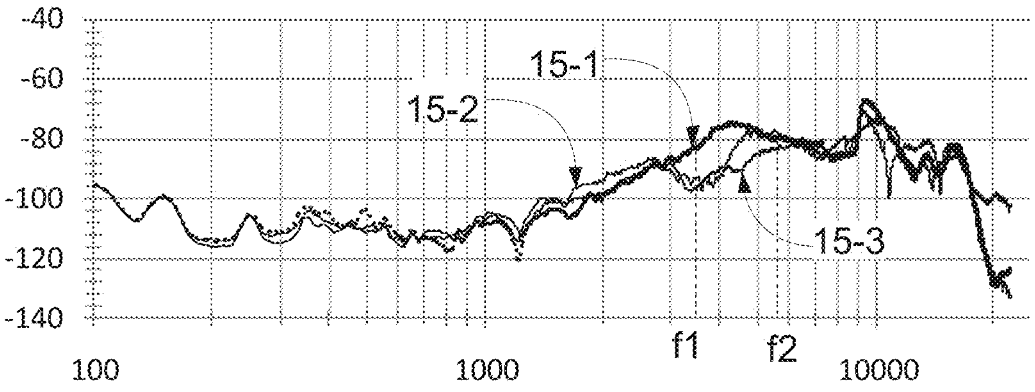
FIG. 15 is a schematic diagram illustrating frequency response curves of sound leakage of acoustic output devices according to some embodiments of the present disclosure.

FIG. 15 is a schematic diagram illustrating frequency response curves of sound leakage of acoustic output devices according to some embodiments of the present disclosure. As shown in FIG. 15, frequency response curve 15-1 represents a leakage response curve with a first peak resonance frequency f1 of 3500 Hz and a second peak resonance frequency f2 of 5600 Hz. Frequency response curve 15-2 represents a leakage response curve with a first peak resonance frequency f1 of 4500 Hz and a second peak resonance frequency f2 of 5600 Hz. Frequency response curve 15-3 represents a leakage response curve with a first peak resonance frequency f1 of 5000 Hz and a second peak resonance frequency f2 of 5600 Hz. Referring to FIG. 15, the frequency response curve of the air conduction sound wave output to the outside of the acoustic output device 600 via the pressure relief hole 622 may have a first resonance peak corresponding to the first peak resonance frequency f1. The frequency response curve of the air conduction sound wave output to the outside of the acoustic output device 600 via the tuning hole 926 has a second resonance peak corresponding to the second peak resonance frequency f2. The peak resonance frequency f1 of the first resonance peak and the peak resonance frequency f2 of the second resonance peak may be greater than or equal to 2 kHz, respectively, and $|f1-f2|/f1 \leq 60\%$. In some embodiments, with the difference between the peak resonance frequency f1 of the first resonance peak and the peak resonance frequency f2 of the second resonance peak gradually decreases, a frequency bandwidth in which the sound leakage can be reduced may be wider (i.e., the frequency response curve becomes relatively flatter), resulting in less sound leakage from the acoustic output device 600. It can also be understood that the effect of the destructive reference of the air conduction sound waves output to the outside of the acoustic output device 600 via the pressure relief hole 622 and the tuning hole 626, respectively, is better. Preferably, the peak resonance frequency f1 of the first resonance peak and the peak resonance frequency f2 of the second resonance peak may respectively be greater than or equal to 3.5 k, and $|f1-f2|\leq 2$ kHz. Based on this, it is possible to make the air conduction sound waves respectively output to the outside of the acoustic output device 600 via the pressure relief hole 622 and tuning hole 626 have destructive interference as much as possible in the high frequency range (e.g., 2 kHz-4 kHz).

In some embodiments, the wavelength of the standing wave in the first chamber 623 is relatively long due to structures such as a coil support is provided in the first chamber 623. The tuning hole 626 and the sound outlet 621 may jointly destroy the high-pressure region, thereby making the wavelength of the standing wave in the second chamber 624 relatively short. Thus, the peak resonance frequency of the first resonance peak may be less than the peak resonance frequency of the second resonance peak. In some embodiments, the air conduction sound waves respectively output to the outside of the acoustic output device 600 via the pressure relief hole 622 and tuning hole 626 may better interfere by shifting the peak resonance frequency of the first resonance peak toward high frequency so as to be closer to the peak resonance frequency of the second resonance peak. In some embodiments, based on the Helmholtz resonator, in the adjacent pressure relief hole 622 and tuning hole 626, the effective area of the outlet end of the pressure relief hole 622 may be larger than the effective area of the outlet end of the tuning hole 626. In some embodiments, in the adjacent pressure relief hole 622 and tuning hole 626, a ratio of the effective area of the outlet end of the pressure relief hole 622 to the effective area of the outlet end of the tuning hole 626 may be less than or equal to 2. By way of exemplary illustration, in the adjacent pressure relief hole 622 and tuning hole 626, the actual area of the outlet end of the pressure relief hole 622 may be larger than the actual area of the outlet end of the tuning hole 626. In some embodiments, the outlet ends of the adjacent pressure relief hole 622 and tuning hole 626 may be covered with a first acoustic resistance net and a second acoustic resistance net, respectively. A porosity of the first acoustic resistance net may be greater than a porosity of the second acoustic resistance net.

In some embodiments, the sound leakage from the tuning hole 626 may also be reduced by adjusting the actual area, the effective area, or the acoustic resistance of the sound guiding channel of the sound conduction component 640 (illustrated in FIG. 6). In some embodiments, the effective area of the outlet end of the sound guiding channel may be greater than the effective area of the outlet end of each tuning hole communicated with the second chamber on the housing to facilitate the user hearing the air conduction sound wave output to the outside of the acoustic output device via the sound outlet. In some embodiments, the actual area of the outlet end of the sound guiding channel may be greater than the actual area of the outlet end of each tuning hole. In some embodiments, the effective area of the outlet end of the sound guiding channel may be greater than a sum of the effective areas of the outlet ends of all the tuning holes. In some embodiments, a ratio of the sum of the effective areas of the outlet ends of all the tuning holes to the effective area of the outlet end of the sound guiding channel may be greater than or equal to 0.08. In some embodiments, the ratio of the sum of the effective areas of the outlet ends of all the tuning holes to the effective area of the outlet end of the sound guiding channel may be greater than or equal to 0.1. In some embodiments, the ratio of the sum of the effective areas of the outlet ends of all the tuning holes to the effective area of the outlet end of the sound guiding channel may be greater than or equal to 0.15. In some embodiments, the sum of the effective areas of the outlet ends of all the tuning holes may be greater than or equal to 1.5 $mm^2$. When the number of tuning holes is one, the sum of the effective areas of the outlet ends of all the tuning holes is the effective area of the outlet end of the one tuning hole. In this way, the peak resonance frequency of the resonance peak of the air conduction sound wave output to the outside of the acoustic output device through the sound outlet may be shifted toward high frequency, and the leakage at the tuning hole may also be reduced.

Figure 16A:
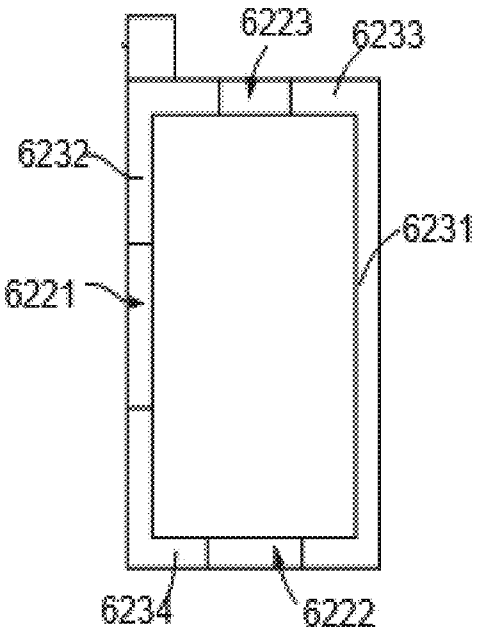
FIG. 16A is a cross-sectional diagram illustrating an acoustic output device according to some embodiments of the present disclosure.
Figure 16B:
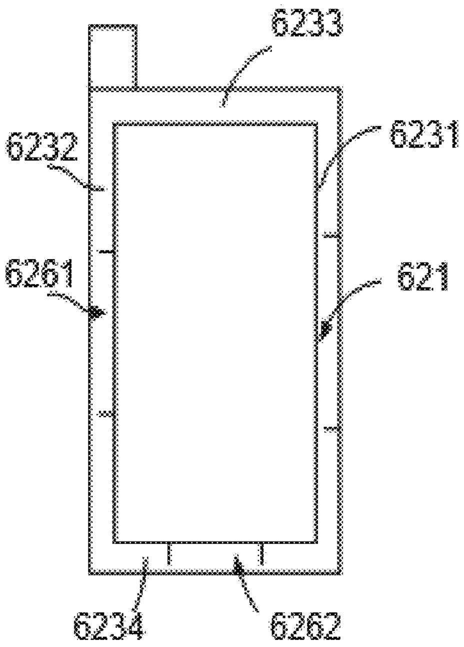
FIG. 16B is a cross-sectional diagram illustrating an acoustic output device according to some embodiments of the present disclosure.
Figure 16C:
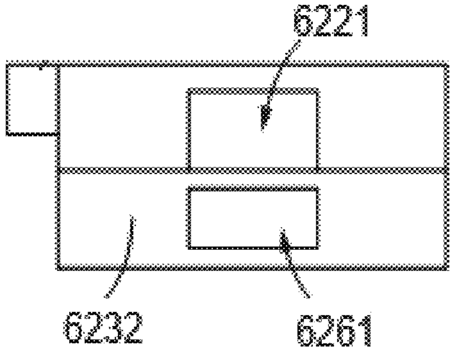
FIG. 16C is a left view diagram illustrating an acoustic output device according to some embodiments of the present disclosure.
Figure 16D:
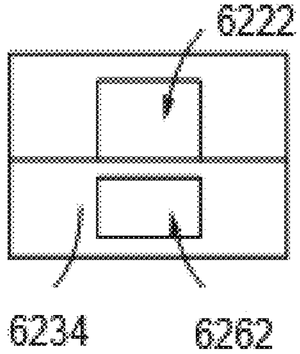
FIG. 16D is a top view diagram illustrating an acoustic output device according to some embodiments of the present disclosure.

FIG. 16A is a cross-sectional diagram illustrating an acoustic output device according to some embodiments of the present disclosure. FIG. 16B is a cross-sectional diagram illustrating an acoustic output device according to some embodiments of the present disclosure. FIG. 16C is a left view diagram illustrating an acoustic output device according to some embodiments of the present disclosure. FIG. 16D is a top view diagram illustrating an acoustic output device according to some embodiments of the present disclosure. In order to more intuitively reflect that different types of holes can be provided on the same side wall (e.g., a pressure relief hole and a tuning hole may be located on the first side wall at the same time), FIG. 16A may be seen as a cross-sectional diagram of the first chamber, and FIG. 16B may be seen as a cross-sectional diagram of the second chamber.

As illustrated in FIGS. 16A-16D, a housing (e.g., the housing 620) may include a first side wall 6231 and a second side wall 6232 disposed on opposite sides of a bone conduction acoustic assembly (e.g., the bone conduction acoustic assembly 610), and a third side wall 6233 and a fourth side wall 6234 connecting the first side wall 6231 and the second side wall 6232 and disposed at intervals from each other. In some embodiments, the third side wall 6233 and fourth side wall 6234 may be curved so that the housing (e.g., the housing 620) has an overall runway shape. In some embodiments, the first side wall 6231 may be closer to the user's ear than the second side wall 6232, and the third side wall 6233 may be closer to a fixing component (e.g., an ear hook, etc.) of the acoustic output device 600 than the fourth side wall 6234. In some embodiments, a sound outlet (e.g., the sound outlet 621) may be provided on the first side wall 6231, so that the user can hear an air conduction sound wave output to the outside of the acoustic output device (e.g., the acoustic output device 600) via the sound outlet (e.g., the sound outlet 621) and the sound guiding channel. In some embodiments, a first pressure relief hole 6221 and a first tuning hole 6261 may be respectively provided on the second side wall 6232, and be further away from the sound outlet (e.g., the sound outlet 621). In some embodiments, a second pressure relief hole 6222 and a second tuning hole 6262 may be provided on one of the third side wall 6233 and the fourth side wall 6234, respectively, and a third pressure relief hole 6223 may be provided on the other of the third side wall 6233 and the fourth side wall 6234.

As shown in FIG. 16A, pressure relief holes (e.g., the pressure relief hole 622) may include a first pressure relief hole 6221 and a second pressure relief hole 6222. Compared with the second pressure relief hole 6222, the first pressure relief hole 6221 may be provided farther from the sound outlet 621 (shown in FIG. 16B). In this case, an effective area of an outlet end of the first pressure relief hole 6221 may be larger than an effective area of an outlet end of the second pressure relief hole 6222. In this way, the size of the housing (e.g., the housing 620) and the exhaust demand of the first chamber (e.g., the first chamber 623) may be balanced, and the first pressure relief hole 6221, which has a relatively large exhaust volume, may be as far away from the sound outlet (e.g., the sound outlet 621) as possible, thereby reducing the impact of the sound leakage at the pressure relief hole 622 on the air conduction sound wave at the sound outlet (e.g., the sound outlet 621). Further, the pressure relief holes 622 may also include a third pressure relief hole 6223, and the first pressure relief hole 6221 may also be located away from the sound outlet (e.g., the sound outlet 621) compared to the third pressure relief hole 6223. The effective area of the outlet end of the second pressure relief hole 6222 may be greater than an effective area of an outlet end of the third pressure relief hole 6223. By way of exemplary illustration, the sound outlet (e.g., the sound outlet 621) and the first pressure relief hole 6221 may be located on opposite sides of the bone conduction acoustic assembly 610, while the second pressure relief hole 6222 and the third pressure relief hole 6223 may be provided opposite each other and may be located between the sound outlet 621 and the first pressure relief hole 6221.

In some embodiments, outlet ends of at least some of the pressure relief holes (e.g., the pressure relief hole 622) may be covered with an acoustic resistance net to facilitate adjustment of the effective areas of the outlet ends of the pressure relief holes (e.g., the pressure relief hole 622). In this embodiment, the outlet end of each pressure relief hole (e.g., the pressure relief hole 622) covering with an acoustic resistance net of the same acoustic resistance may be taken as an example for exemplary description. Based on this, the actual area of the outlet end of the pressure relief hole (e.g., the pressure relief hole 622) may be adjusted to obtain the corresponding effective area. For example, in some embodiments, the actual area of the outlet end of the first pressure relief hole 6221 may be larger than the actual area of the outlet end of the second pressure relief hole 6222, and the actual area of the outlet end of the second pressure relief hole 6222 may be larger than the actual area of the outlet end of the third pressure relief hole 6223.

As shown in FIG. 16B, tuning holes (e.g., the tuning hole 626) may include a first tuning hole 6261 and a second tuning hole 6262. The first tuning hole 6261 may be provided away from the sound outlet (e.g., the sound outlet 621) compared to the second tuning hole 6262. In some embodiments, an effective area of an outlet end of the first tuning hole 6261 may be larger than an effective area of an outlet end of the second tuning hole 6262 so as to facilitate destroying of the high-pressure region in the second chamber 624. In this way, the size of the housing 620 may be balanced with the need for the tuning hole 626 to destroy the high-pressure region of the second chamber 624, and make the resonance frequency of the air conduction sound wave at the sound outlet (e.g., the sound outlet 621) as high as possible, while allowing the first tuning hole 6261 with relatively large destructive capacity to be as far away from the sound outlet (e.g., the sound outlet 621) as possible. By way of exemplary illustration only, in some embodiments, the sound outlet (e.g., the sound outlet 621) and the first tuning hole 6261 may be located on opposite sides of the bone conduction acoustic assembly 610, and the second tuning hole 6262 may be located between the sound outlet (e.g., the sound outlet 621) and the first tuning hole 6261.

In some embodiments, outlet ends of at least some of the tuning holes (e.g., the tuning holes 626) may be covered with an acoustic resistance net to facilitate adjustment of the effective areas of the outlet ends of the tuning holes (e.g., the tuning hole 626). In this embodiment, the outlet end of each tuning hole (e.g., the tuning hole 626) is covered with an acoustic resistance net of the same acoustic resistance. Based on this, the actual area of the outlet end of each tuning hole (e.g., the tuning hole 626) may be adjusted to obtain the corresponding effective area. For example, in some embodiments, the actual area of the outlet end of the first tuning hole 6261 may be larger than the actual area of the outlet end of the second tuning hole 6262. Specifically, the actual area of the outlet end of the first tuning hole 6261 may be greater than or equal to 3.8 $mm^2$; and/or the actual area of the outlet end of the second tuning hole 6262 may be greater than or equal to 2.8 $mm^2$.

In some embodiments, in conjunction with FIG. 16C and FIG. 16D, the first pressure relief hole 6221 and the first tuning hole 6261 may be provided adjacent to each other, and the second pressure relief hole 6222 and the second tuning hole 6262 may also be provided adjacent to each other. In this way, the air conduction sound waves respectively output to the outside of the acoustic output device through the first pressure relief hole 6221 and the first tuning hole 6261 may be interfered and canceled with each other, and the air conduction sound waves respectively output to the outside of the acoustic output device 600 through the second pressure relief hole 6222 and the second tuning hole 6262 may be interfered and canceled with each other.

In some embodiments, the effective area of the outlet end of the first pressure relief hole 6221 may be larger than the effective area of the outlet end of the first tuning hole 6261 so that the peak resonance frequency of the air conduction sound wave output to the outside of the acoustic output device via the first pressure relief hole 6221 is shifted as high as possible to be as close as possible to the peak resonance frequency of the air conduction sound wave output to the outside of the acoustic output device via the first tuning hole 6261. The peak resonance frequency of the air conduction sound waves respectively output to the outside of the acoustic output device via the first pressure relief hole 6221 and the first tuning hole 6261 can be better interfered and canceled with each other. Similarly, the effective area of the outlet end of the second pressure relief hole 6222 may be larger than the effective area of the outlet end of the second tuning hole 6262, which is not repeated here.

In some embodiments, similar to the tuning hole (e.g., the tuning hole 626) destroying the high-pressure region in the second chamber (e.g., the second chamber 624), the second pressure relief hole 6222 and the third pressure relief hole 6223 may destroy the high-pressure region in the first chamber (e.g., the first chamber 623), causing the wavelength of the standing wave in the first chamber (e.g., the first chamber 623) to be reduced, thereby making the peak resonance frequency of the air conduction sound wave output to the outside of the acoustic output device via the first pressure relief hole 6221 be shifted toward high frequency so as to be better interfered and cancelled with the air conduction sound wave output to the outside of the acoustic output device via the first tuning hole 6261. Preferably, the above offset may be greater than or equal to 1 kHz. Similarly, the peak resonance frequency of the air conduction sound wave output to the outside of the acoustic output device via the second pressure relief hole 6222 may also be shifted to high frequency. In short, the frequency response curve of the air conduction sound wave output to the outside of the acoustic output device 600 through the pressure relief hole 622 provided adjacent to the tuning hole (e.g., the tuning hole 626) has a resonance peak. The peak resonance frequency of the resonance peak when the pressure relief hole (e.g., the pressure relief hole 622) other than the pressure relief hole (e.g., the pressure relief hole 622) adjacent to the tuning hole (e.g., the tuning hole 626) is in an open state is shifted to high frequency compared to the peak resonance frequency of the resonance peak when the other pressure relief hole 622 is in the closed state. The peak resonance frequency of the resonance peak when the other pressure relief hole 622 is in the closed state may be greater than or equal to 2 kHz. It should be noted that the pressure relief hole 622 is in the open state may refer to the case in which the pressure relief hole 620 is provided and the pressure relief hole is working normally. Correspondingly, the pressure relief hole 622 is in the closed state may refer to the case in which there is no pressure relief hole on the housing 620 or when the housing 620 has a pressure relief hole but it is closed and does not work normally.

It should be noted that the foregoing regarding the number, size, shape, and/or position of one or more additional acoustic structures (e.g., the sound outlet, the sound guiding channel, the pressure relief hole, the tuning hole, etc.) are not limited herein by the present disclosure. In some embodiments, the number, size, shape, and/or position of the one or more additional acoustic structures may be optimized based on the sound leakage of the acoustic output device. In some embodiments, the optimization may be performed according to the frequency response curve of the acoustic output device provided in the present disclosure. Further, in the present disclosure, the spatial arrangement of one or more components of the air conduction acoustic assembly and the bone conduction acoustic assembly may be not limited. For example, the spatial arrangement of the bone conduction acoustic assembly and the air conduction acoustic assembly may vary according to practical requirements. By way of exemplary illustration, a position, an orientation (e.g., an orientation of the front side of the housing), etc., of the diaphragm in the air conduction acoustic assembly in the housing may be varied according to practical requirements, which is not limited here.

Figure 17:
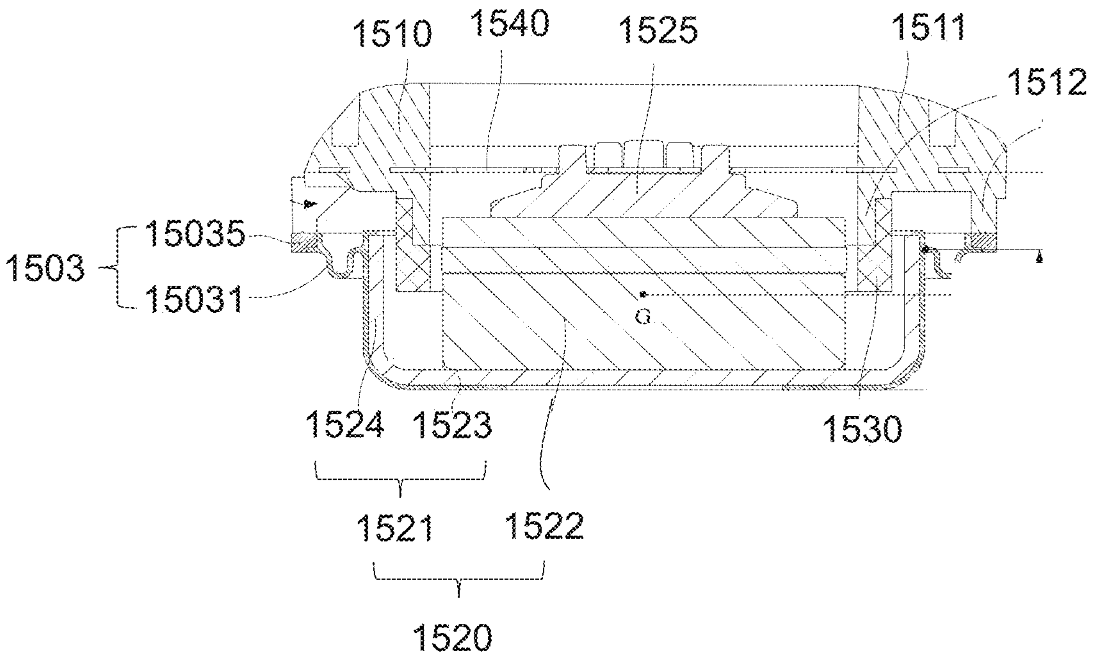
FIG. 17 is a schematic diagram illustrating a cross-sectional structure of a bone conduction acoustic assembly according to some embodiments of the present disclosure.
Figure 18A:
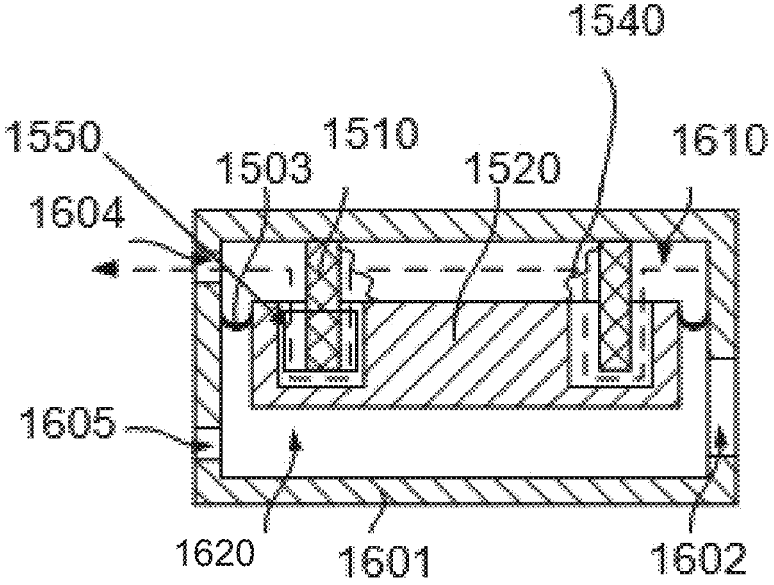
FIG. 18A is a schematic diagram illustrating a structure of an acoustic output device according to some other embodiments of the present disclosure.
Figure 18B:
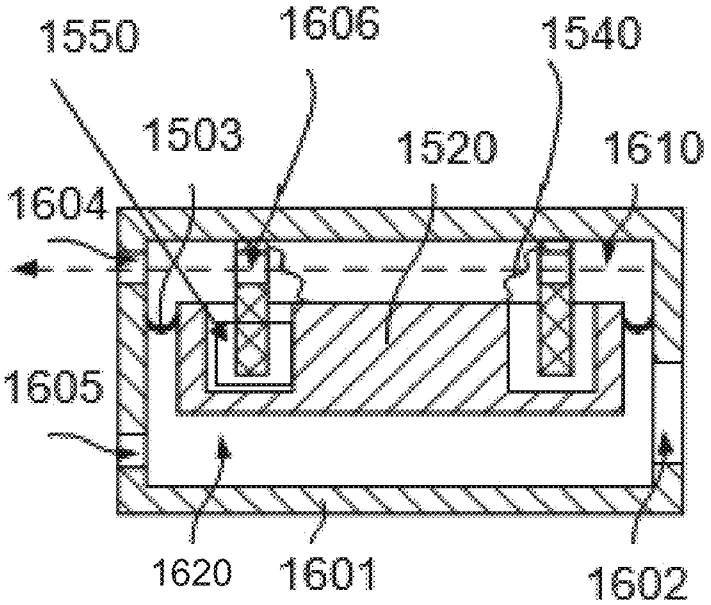
FIG. 18B is a schematic diagram illustrating a structure of an acoustic output device according to some other embodiments of the present disclosure.

FIG. 17 is a schematic diagram illustrating a cross-sectional structure of a bone conduction acoustic assembly according to some embodiments of the present disclosure. FIG. 18A is a schematic diagram illustrating a structure of an acoustic output device according to some other embodiments of the present disclosure. FIG. 18B is a schematic diagram illustrating a structure of an acoustic output device according to some other embodiments of the present disclosure. As shown in FIG. 17, FIG. 18A, and FIG. 18B, a bone conduction acoustic assembly in an acoustic output device may include a coil support 1510, a magnetic circuit assembly 1520, a coil assembly, and an elastic element 1540. In some embodiments, the elastic element 1540 may include one or more of a spring sheet, a spring, a rubber sheet, a silicone sheet, etc. Central regions of the coil support 1510 and the elastic element 1540 may be physically connected to the magnetic circuit assembly 1520 to suspend the magnetic circuit assembly 1520 within the housing 1601. In some embodiments, the acoustic output device may include a diaphragm 1503. The diaphragm 1503 may be physically connected to the housing 1601 and/or the magnetic circuit assembly 1520, and divide the interior of the housing 1601 into a first chamber 1610 and a second chamber 1620. In some embodiments, the coil assembly may be connected to the coil support 1510. The magnetic circuit assembly 1520 may form a magnetic gap 1550, and the coil assembly 1530 may be provided within the first chamber 1610 and extend into the magnetic gap 1550. In some embodiments, the coil assembly may be provided with a communication hole 1606 communicating an inside and an outside of the coil assembly. In some embodiments, the coil assembly may include a coil 1530 and the coil support 1510. The coil support 1510 may be used to connect the coil 1530 to the housing 1601 and cause the coil 1530 to extend into the magnetic gap 1550. The communication hole 1606 may be provided on the coil support 1510.

In some embodiments, the magnetic circuit assembly 1520 may include a magnetic conductor (e.g., a magnetic conduction cover 1521) and a magnet 1522, which cooperate with each other to form a magnetic field. The magnetic conduction cover 1521 may include a bottom plate 1523 and a side plate 1524. The bottom plate 1523 and the side plate 1524 may be integrally connected. In some embodiments, the magnet 1522 may be provided within the side plate 1524 and fixed to the bottom plate 1523. A side of the magnet 1522 away from the bottom plate 1523 may be connected to the central region of the elastic element 1540 via a connector 1525, so that the coil 1530 can extend into the magnetic gap 1550 between the magnet 1522 and the magnetic conduction cover 1521. It should be noted that the magnet 1522 may be a magnet group formed by multiple sub-magnets. In addition, a side of the magnet 1522 away from the bottom plate 1523 may be provided with a magnetic conduction plate (not labeled in the figure).

In some embodiments, a peripheral region of the elastic element 1540 is connected to the housing 1601, thereby suspending the magnetic circuit assembly 1520 within the housing 1601. The communication hole 1606 may be located at a side of the spring sheet 1540 away from the skin contact region.

In some embodiments, the coil support 1510 may include a main part 1511 and a first support part 1512. One end of the first support part 1512 is connected to the main part 1511. The coil 1530 is connected to the other end of the first support part 1512 away from the main part 1511, and the communication hole 1606 may be located at a connection position between the main part 1511 and the first support part 1512. In some embodiments, the main part 1511 may be connected to the peripheral region of the spring sheet 1540. The main part 1511 and the spring sheet 1540 may form an integral structure, for example, form the integral structure based on a metal insert injection molding process.

In some embodiments, the coil support 1510 may also include a second support part 1513 connected to the main part 1511. The second support part 1513 surrounds the first support part 1512 and extends laterally toward the main part 1511 in the same direction as the first support part 1512. The second support part 1513 and the main part 1511 may be connected to the housing 1601 together to increase a connection strength between the coil support 1510 and the housing 1601. It should be noted that the first support part 1512 and/or the second support part 1513 may be a continuous and complete structure in a peripheral direction of the coil support 1510 to increase the structural strength of the coil support 1510, or may be a partially discontinuous structure to avoid other structural members.

Based on the above descriptions and referring to FIG. 18A, when the bone conduction assembly vibrates, it drives the air in the first chamber 1610 to vibrate and causes the pressure in the first chamber 1610 to change, thereby causing the air in the first chamber 1610 to be discharged through the pressure relief hole 1604. The discharge of the air in the first chamber 1610 requires bypassing the coil assembly, the path of which may be shown as the dashed arrow in FIG. 18A. Therefore, the wavelength of the standing wave in the first chamber 1610 may be relatively long, which is not conducive to shifting the peak resonance frequency of the air conduction sound wave output to the outside of the acoustic output device via the pressure relief hole 1604 to high frequency. In some embodiments, the communication hole 1606 opened on the coil assembly allows the air in the first chamber 1610 to pass directly through the coil assembly during discharge. In conjunction with FIG. 18B, the opening of the communication hole 1606 in the coil assembly increases the efficiency of the exhaust of the first chamber 1610. In some embodiments, the opening of the communication hole 1606 in the coil assembly also reduces the wavelength of the standing wave in the first chamber 1610, thereby shifting the peak resonance frequency of the air conduction sound wave output to the outside of the acoustic output device via the pressure relief hole 1604 to high frequency.

Figure 19:
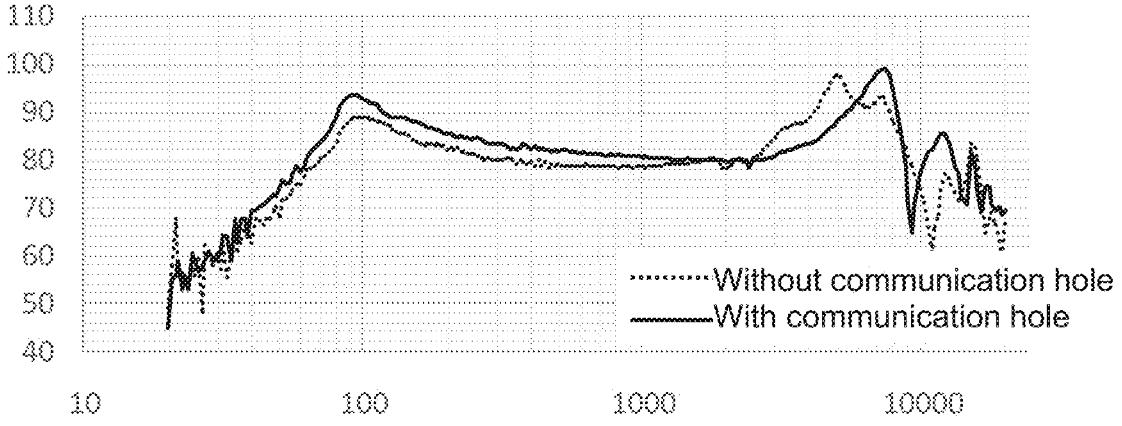
FIG. 19 is a comparative schematic diagram of frequency response curves of air conduction sound waves at a pressure relief hole before and after providing a communication hole in an acoustic output device according to some embodiments of the present disclosure.

FIG. 19 is a comparative schematic diagram of frequency response curves of air conduction sound waves at a pressure relief hole before and after providing a communication hole in an acoustic output device according to some embodiments of the present disclosure. As shown in FIG. 19, the dashed line indicates a frequency response curve of an air conduction sound wave at a pressure relief hole (e.g., the communication hole 1606) when no communication hole is provided. The solid line indicates a frequency response curve of an air conduction sound wave at the pressure relief hole (e.g., the communication hole 1606) when a communication hole is provided. As illustrated in FIG. 19, FIG. 18A, and FIG. 18B, the frequency response curve of the air conduction sound wave output to the outside of the acoustic output device via the pressure relief hole 1604 communicated with the first chamber 1610 at the housing 1601 may have a resonance peak. A peak resonance frequency of the resonance peak when the communication hole 1606 is in the open state (i.e., the curve represented by the solid line in FIG. 19) is shifted toward high frequency than the peak resonance frequency of the resonance peak when the communication hole 1215 is the closed state (i.e., the curve represented by the dashed line in FIG. 19), and the offset may be greater than or equal to 500 Hz. In some embodiments, the peak resonance frequency of the resonance peak when the communication hole 1606 is in the open state may be greater than or equal to 2 kHz. It should be noted that here the communication hole 1215 is in the open state refer the case in which the acoustic output device has a communication hole and the communication hole is working normally. Correspondingly, the communication hole 1215 is in the closed state refer the case in which the acoustic output device is not provided with a communication hole or the acoustic output device is provided with the communication hole 1215 but the communication hole 1215 is closed and does not work normally.

In some embodiments, as shown in FIG. 17, FIG. 18A, and FIG. 18B, the coil assembly is provided within the first chamber 1610 and extends into the magnetic gap 1550 of the magnetic circuit assembly 1520. The coil assembly may be provided in a circular shape and provided with the communication hole 1606 communicating the inside and outside of the coil assembly, thereby shortening the path for air to discharge from the first chamber 1610. Preferably, the communication hole 1606 may be located on a portion of the coil assembly located outside the magnetic gap 1550 of the magnetic circuit assembly 1520.

In some embodiments, as shown in FIG. 17, FIG. 18A, and FIG. 18B, the coil assembly may include a coil support 1510 and a coil 1530 connected to the coil support 1510. The coil support 1510 may be used to fix the coil 1530 to the housing 1610 and extend the coil 1530 into the magnetic gap 1550 of the magnetic circuit system 1520. The communication hole 1606 may be provided on the coil support 1510. Further, the communication hole 1606 may be located on a side of the elastic element 1540 away from the skin contact region to shorten the path for air to discharge from the first chamber 1610.

Referring to FIG. 17, in some embodiments, the communication hole may also be located at a connection position between the first support part 1511 and the second support part 1512. In this embodiment, a number of communication holes may be one or more, and the one or more communication holes may be disposed at intervals along an annulus of the coil assembly. In some embodiments, each of the communication holes 1606 may have a cross-sectional area greater than or equal to 2 $mm^2$. By way of illustration only, a cross-sectional area of a communication hole closest to the first pressure relief hole may be greater than or equal to 3 $mm^2$, and cross-sectional areas of the two communication holes closest to the second pressure relief hole and the third pressure relief hole, respectively, may be greater than or equal to 2.5 $mm^2$.

Figure 20A:
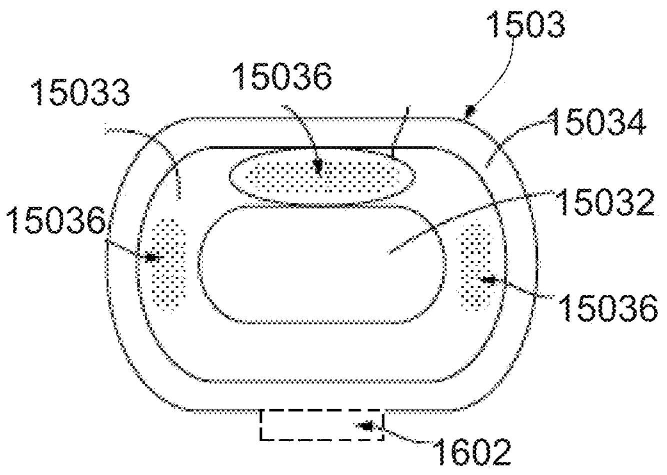
FIG. 20A is a schematic diagram illustrating a structure of a diaphragm according to some embodiments of the present disclosure.

Referring to FIG. 17, in some embodiments, a portion of the diaphragm 1503 may be connected to the magnetic circuit system 1520, and another portion may be connected to the other end of the second support part 1513 away from the main part 1511, thereby being connected with the housing 1601. In some embodiments, the diaphragm 1503 may include a diaphragm body 15031 and a reinforcing ring 15035. FIG. 20A is a schematic diagram illustrating a structure of a diaphragm according to some embodiments of the present disclosure. In combination with FIG. 17 and FIG. 20A, the diaphragm body 15031 may include a first connection portion 15032, a pleated portion 15033, and a second connection portion 15034 that are integrally connected. The first connection portion 15032 may surround the bone conduction acoustic assembly and be connected to the bone conduction acoustic assembly. The second connection portion 15034 may be provided around the periphery of the first connection portion 15032 and disposed at intervals from the first connection portion 15032 in a vertical direction of a vibration direction of the bone conduction acoustic assembly. The pleated portion 15033 is disposed within an interval region between the first connection portion 15032 and the second connection portion 15034 and connects the first connection portion 15032 to the second connection portion 15034. In some embodiments, the reinforcing ring 15035 may be connected to the second connection portion 15034 to enable the second connection portion 15034 to be connected to the housing 1610 through the reinforcing ring 15035 to increase the structural strength of the edges of the diaphragm 1503, thereby increasing the strength of the connection position between the diaphragm 1503 and the housing 1601.

In some embodiments, the acoustic output device may include a communication channel 1560 communicating the first chamber 1610 with the second chamber 1620. The communication channel 1560 may destroy the high-pressure regions in the first chamber 1610 and the second chamber 1620, thereby increasing the peak resonance frequency of the resonance peak and improving the sound quality and leakage of the acoustic output device.

Referring to FIG. 20A, the communication channel 1560 may include a hole array 15036 disposed on the diaphragm 1503, e.g., the hole array 15036 may be disposed on the pleated portion 15033. In some embodiments, at least a portion of the holes in the hole array 15036 and the sound outlet 1602 may be disposed on opposite sides of the bone conduction acoustic assembly. In other alternative embodiments, the hole array 15036 may also be disposed on an opposite side of the sound outlet 1602. In some embodiments, an actual area of each hole in the hole array 15036 may be between 0.01 $mm^2$ and 0.04 $mm^2$.

In some embodiments, the hole array 15036 may also cooperate with the tuning hole 1605 such that the air conduction sound wave output to the outside of the acoustic output device via the sound outlet 1602 is shifted toward high frequency.

Figure 20B:
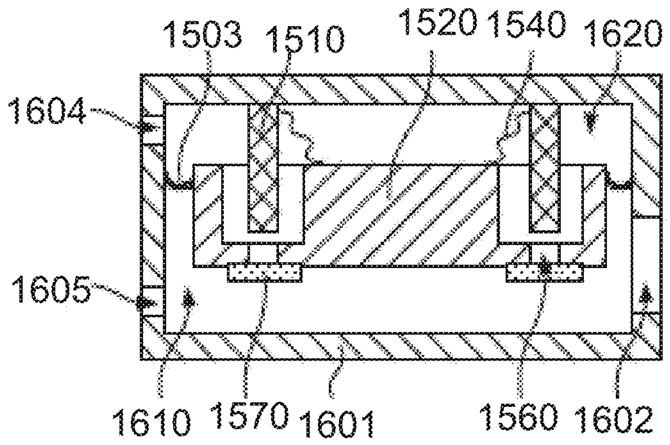
FIG. 20B is a schematic diagram illustrating a structure of an acoustic output device according to some embodiments of the present disclosure.

FIG. 20B is a schematic diagram illustrating a structure of an acoustic output device according to some embodiments of the present disclosure. In some embodiments, the communication channel may also include a hole 1560 disposed in the magnetic circuit assembly 1520 of the bone conduction acoustic assembly, and the hole 1560 may run through the magnetic circuit system 1520 (e.g., through a bottom wall of the magnetic conduction cover 1521), such that the first chamber 1610 and the second chamber 1620 of the acoustic output device are communicated. In some embodiments, an actual area of the hole 1560 may be less than or equal to 9 $mm^2$. In some embodiments, the actual area of the hole 1560 may be less than or equal to 7 $mm^2$. In some embodiments, the actual area of the hole 1560 may be less than or equal to 5 $mm^2$.

Figure 20C:
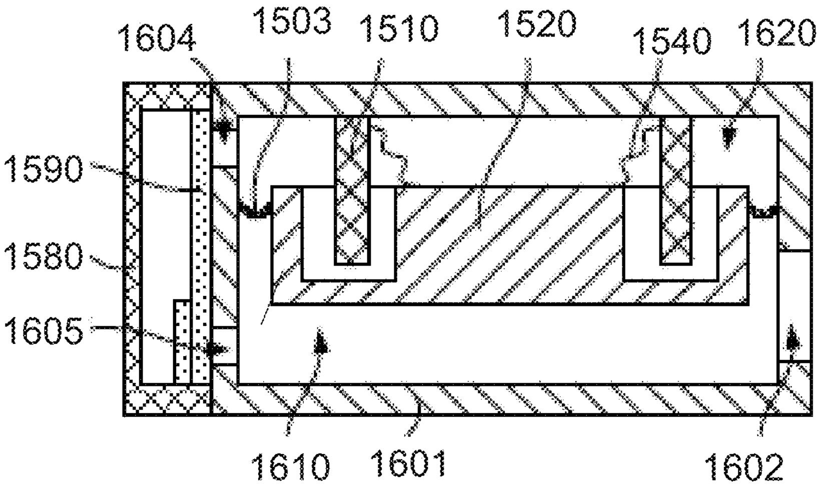
FIG. 20C is a schematic diagram illustrating a structure of an acoustic output device according to some embodiments of the present disclosure.

FIG. 20C is a schematic diagram illustrating a structure of an acoustic output device according to some embodiments of the present disclosure. The acoustic output device shown in FIG. 20C is substantially similar in structure to the acoustic output device shown in FIG. 20B. The difference between the two may be that in some embodiments, the communication channel may be a communication tube 1580 provided at the outside of the housing 1601. The communication tube 1580 may be communicated with the pressure relief hole 1604 communicated with the first chamber 1610 and the tuning hole 1605 communicated with the second chamber 1620, so that the first chamber 1610 and the second chamber 1620 are communicated. In some embodiments, the communication tube 1580 may be in a tubular structure. Two ends of the tubular structure may be communicated with the pressure relief hole 1604 and the tuning hole 1605, respectively. In some embodiments, the communication tube 1580 may also be any other three-dimensional structure that is independent from the housing 1601 or integral with the housing 1601. The three-dimensional structure has a cavity inside. The three-dimensional structure is communicated with the pressure relief hole 1604 and the tuning hole 1605, so that the first chamber 1610 and the second chamber 1620 are communicated. In some embodiments, the communication tube 1580 is further provided with at least one acoustic resistance net 1590 inside the communication tube 1580. The acoustic resistance net 1590 may be located at a side wall of the housing 1601 having both the pressure relief hole 1603 and the tuning hole 1605 or at positions where the pressure relief hole 1603 and the tuning hole 1605 are located. The principle of the communication channel of the acoustic output device shown in FIG. 20B or FIG. 20C is approximately the same as the principle of the communication channel in FIG. 20A, which is not repeated here. It should be noted that the position of the communication tube 1580 is not limited to the side of the housing 1601 shown in FIG. 20C, but may be adapted according to the positions of the pressure relief hole 1604 and the tuning hole 1605.

Figure 21:
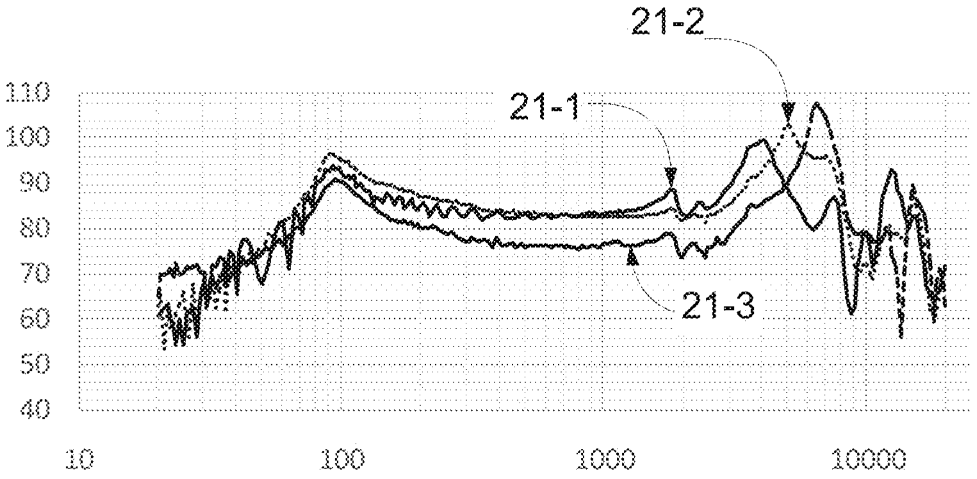
FIG. 21 is a schematic diagram illustrating frequency response curves of air conduction sound waves at sound conduction components according to some embodiments of the present disclosure.
Figure 22:
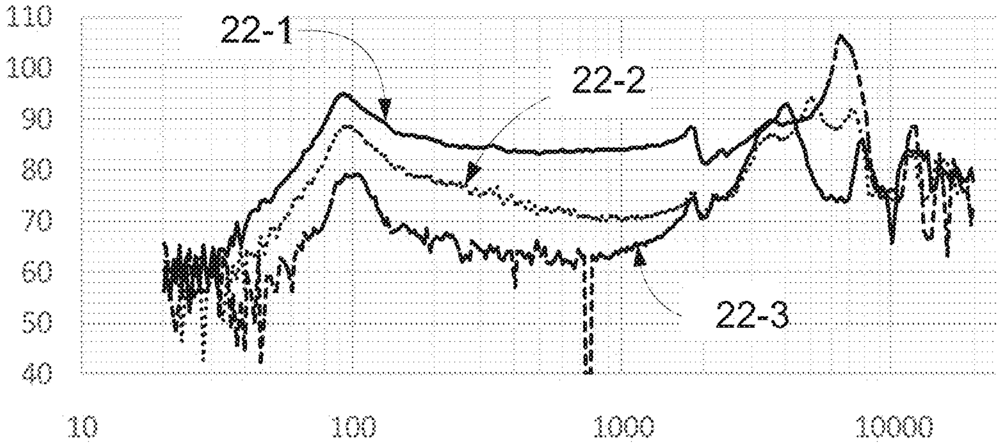
FIG. 22 is a schematic diagram illustrating frequency response curves of air conduction sound waves at sound conduction components according to some other embodiments of the present disclosure.

A frequency response curve of the air conduction sound wave output to the outside of the acoustic output device via the sound outlet may have a resonance peak, and a peak resonance frequency of the resonance peak may be greater than or equal to 2 kHz. In some embodiments, the peak resonance frequency of the resonance peak when the communication channel is in an open state is shifted to high frequency compared to the peak resonance frequency of the resonance peak when the communication channel is in a closed state, and an offset may be greater than or equal to 500 Hz. Preferably, the offset may be greater than or equal to 1 kHz. In some embodiments, as the peak resonance frequency of the resonance peak is shifted toward high frequency, the sound leakage in the mid-low frequency range of the acoustic output device is gradually reduced. For example, FIG. 21 is a schematic diagram illustrating frequency response curves of air conduction sound waves at sound conduction components according to some embodiments of the present disclosure. FIG. 22 is a schematic diagram illustrating frequency response curves of air conduction sound waves at sound conduction components according to some other embodiments of the present disclosure. As shown in FIG. 21, frequency response curve 21-1 represents a frequency response curve at a sound conduction component of an acoustic output device without a communication channel and a tuning hole. Frequency response curve 21-2 represents a frequency response curve at a sound conduction component of an acoustic output device with a communication channel and without a tuning hole. Frequency response curve 21-3 represents a frequency response curve at a sound conduction component of an acoustic output device with a communication channel and a tuning hole. As shown in FIG. 22, frequency response curve 22-1 represents the frequency response curve at a sound conduction component of an acoustic output device without a communication channel and a tuning hole. Frequency response curve 22-2 represents a frequency response curve at a sound conduction component of an acoustic output device with a communication channel and without a tuning hole. Frequency response curve 22-3 represents a frequency response curve at a sound conduction component of an acoustic output device with a communication channel and a tuning hole.

Referring to FIG. 21 and FIG. 22, the frequency response curve of the air conduction sound wave output to the outside of the acoustic output device via the sound outlet may have a resonance peak, and a peak resonance frequency of the resonance peak may be greater than or equal to 2 kHz. In some embodiments, the peak resonance frequency of the resonance peak when the communication channel is in an open state (e.g., frequency response curve 21-2, frequency response curve 21-3) is shifted to high frequency compared to the peak resonance frequency of the resonance peak when the communication channel is in a closed state (e.g., frequency response curve 21-1), and the offset may be greater than or equal to 500 Hz. Preferably, the offset may be greater than or equal to 1 kHz. In some embodiments, as the peak resonance frequency of the resonance peak is shifted toward high frequency, the sound leakage in the mid-low frequency range of the acoustic output device is gradually reduced. It should be noted that here the communication channel is in the open state may refer to a situation where the acoustic output device has a communication channel and the communication channel is working normally. Correspondingly, the communication channel is in the closed state may refer to a situation where the acoustic output device is not equipped with a communication channel or where the acoustic output device is equipped with a communication channel but the communication channel is closed and does not work normally.

Figure 23:
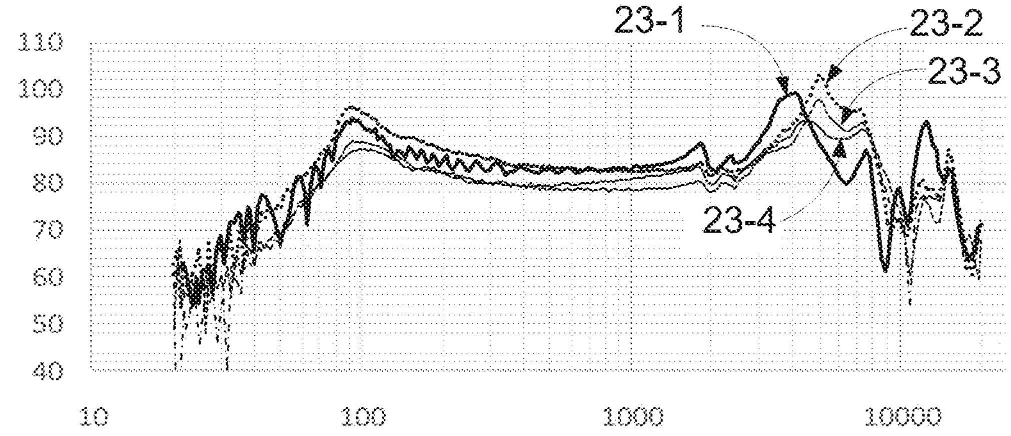
FIG. 23 is a schematic diagram illustrating frequency response curves of air conduction sound waves at sound conduction components according to some other embodiments of the present disclosure.

Referring to FIG. 20B, in some embodiments, the communication channel 1560 may be provided with an acoustic resistance net 1570 on a communication path defined by the communication channel 1560. In conjunction with FIG. 20B and FIG. 23, by providing the acoustic resistance net 1570 on the communication path defined by the communication channel 1560, a high-frequency peak in the air conduction sound wave output to the outside of the acoustic output device via the sound outlet 1602 may be further weakened, resulting in a flatter frequency response curve and more balanced high-frequency sound quality. For example, FIG. 23 is a schematic diagram illustrating frequency response curves of air conduction sound waves at sound conduction components according to some other embodiments of the present disclosure. As shown in FIG. 23, frequency response curve 23-1 represents a frequency response curve at a sound conduction component of an acoustic output device without a communication channel. Frequency response curve 23-2 represents a frequency response curve at a sound conduction component of an acoustic output device with a communication channel and without an acoustic resistance net at the communication channel. Frequency response curve 23-3 represents a frequency response curve at a sound conduction component of an acoustic output device with a communication channel, wherein the communication channel is covered with an acoustic resistance net with an acoustic resistance of 45 MKS rayls and a porosity of 18%. Frequency response curve 23-4 represents a frequency response curve at a sound conduction component of an acoustic output device with a communication channel, wherein the communication channel is covered with an acoustic resistance net with an acoustic resistance of 260 MKS rayls and a porosity of 13%. The frequency response curve 23-4 is flatter than the frequency response curve 23-3. In some embodiments, the porosity of the acoustic resistance net provided on the communication path defined by the communication channel may be less than or equal to 18%, and/or the pore size may be less than or equal to 51 μm.

Figure 24:
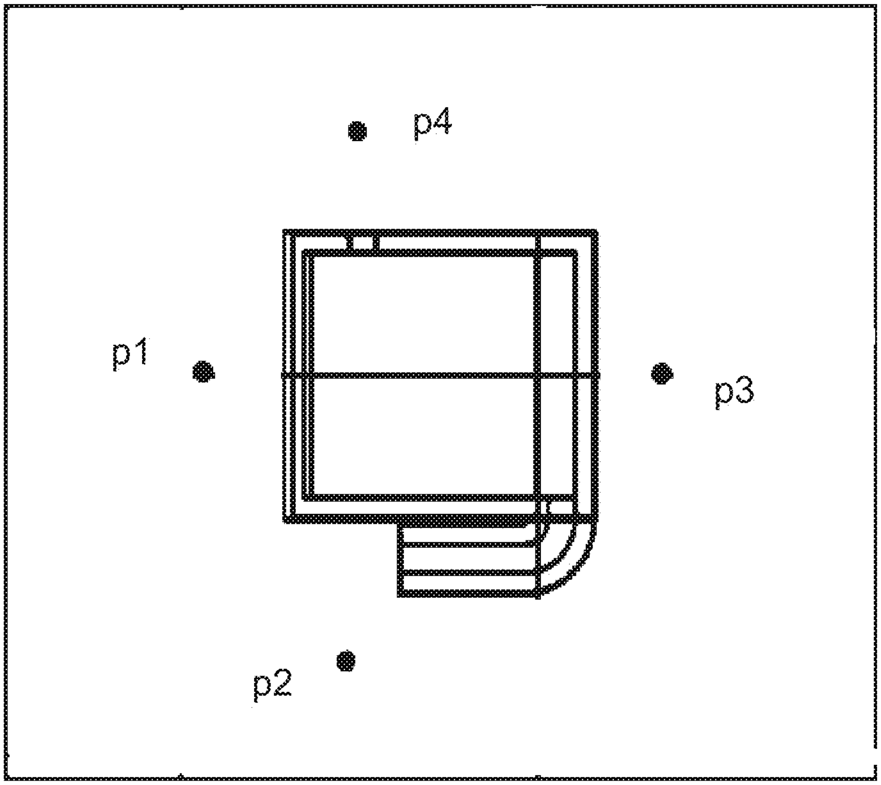
FIG. 24 is a schematic diagram illustrating different positions relative to an acoustic output device according to some embodiments of the present disclosure.

In order to further describe the effects of the sound guiding channel, the pressure relief hole, and the tuning channel in the acoustic output device, only the scenario when the user wears the acoustic output device shown in FIG. 24 is illustrated exemplarily. FIG. 24 is a schematic diagram illustrating different positions relative to an acoustic output device according to some embodiments of the present disclosure. Referring to FIG. 24, points P1, P2, P3, and P4 may indicate four positions relative to the acoustic output device. When the user is wearing the acoustic output device, P1 is located close to the user's skin, and P1 may also be referred to as a front side of the acoustic output device; P3 is located away from the user's skin, and P3 may also be referred to as a rear side of the acoustic output device, P2 is located at a position near the aforementioned sound guiding channel, and P4 is located at a position near the aforementioned pressure relief hole.

FIGS. 25-29 are schematic diagrams illustrating leakage frequency response curves of an acoustic output device at different positions in FIG. 22 according to some embodiments of the present disclosure. A leakage frequency response curve of an acoustic output device may be a curve that represents the change in sound leakage of the acoustic output device and the frequency of a sound signal. The horizontal axis may represent the frequency of the sound signal input to the acoustic output device. The vertical axis may be a volume of the sound leakage of the acoustic output device at a position (e.g., P1, P2, P3, P4). As shown in FIGS. 25-29, the leakage frequency response curves L1-L4 represent the variation of the sound leakage of the acoustic output device at positions P1-P4 in FIG. 24 with the frequency of the sound signal, respectively.

Figure 25:
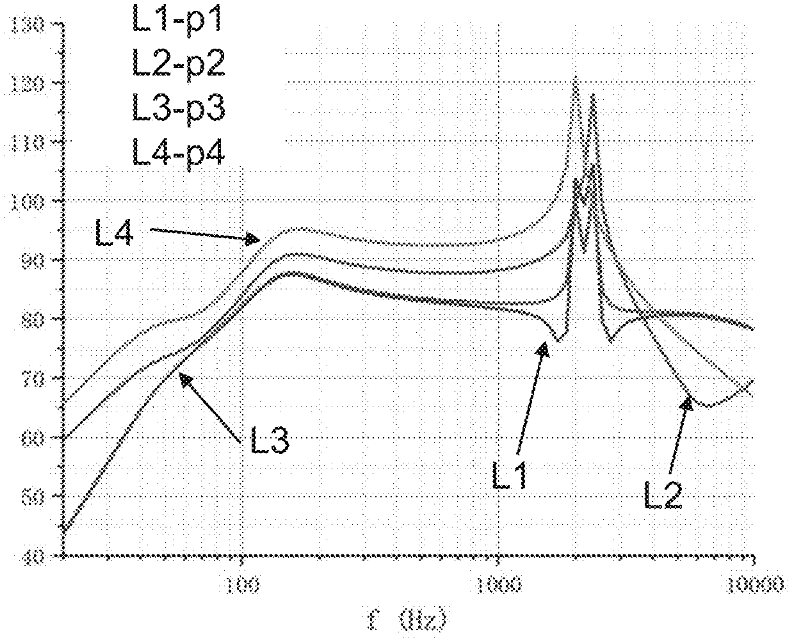
FIG. 25 is a schematic diagram illustrating leakage frequency response curves of an acoustic output device at different positions in FIG. 22 according to some embodiments of the present disclosure.

As shown in FIG. 25, leakage frequency response curves of a first acoustic output device including a sound guiding channel and a pressure relief hole at positions P1-P4 of FIG. 24 are L1-L4, respectively, wherein the sound guiding channel and the pressure relief hole are provided on two opposite side walls of the housing of the acoustic output device. The first acoustic output device may be the same as or similar to the acoustic output device 600 in FIG. 6.

Figure 26:
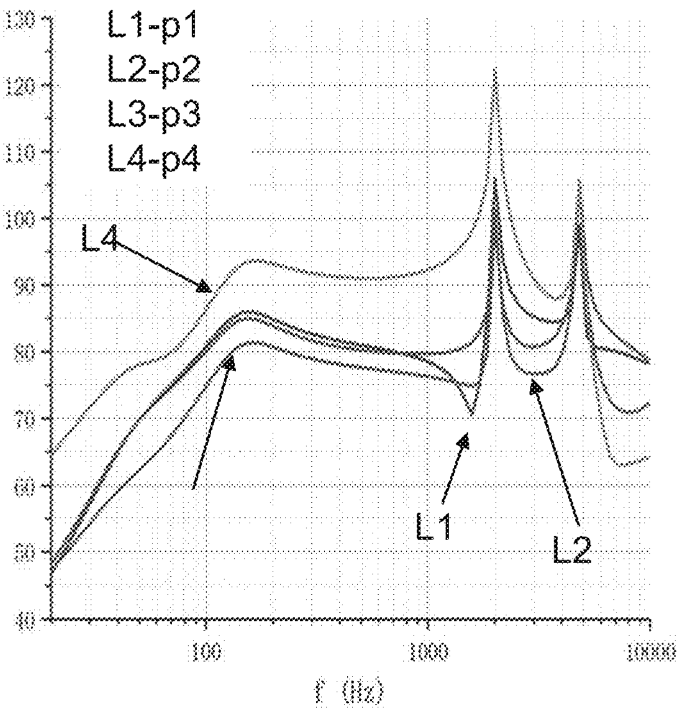
FIG. 26 is a schematic diagram illustrating leakage frequency response curves of an acoustic output device at different positions in FIG. 22 according to some embodiments of the present disclosure.

As shown in FIG. 26, leakage frequency response curves of a second acoustic output device including a sound guiding channel and a pressure relief hole at positions P1-P4 of FIG. 24 are L1-L4, respectively, wherein the sound guiding channel and the pressure relief hole are provided on two opposite side walls of the housing of the acoustic output device. The second acoustic output device further includes at least one pressure regulation hole, which is provided on a side wall where the pressure relief hole is located. The second acoustic output device may be the same as or similar to the acoustic output device 600 in FIG. 6.

Figure 27:
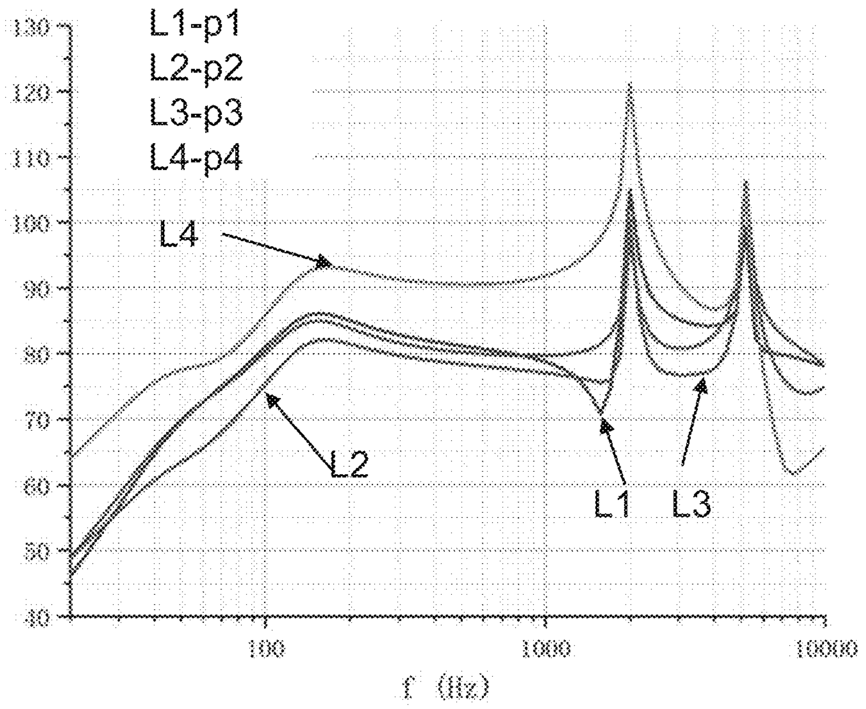
FIG. 27 is a schematic diagram illustrating leakage frequency response curves of an acoustic output device at different positions in FIG. 22 according to some embodiments of the present disclosure.

As shown in FIG. 27, leakage frequency response curves of a third acoustic output device including a sound guiding channel and a pressure relief hole at positions P1-P4 of FIG. 24 are L1-L4, respectively, wherein the sound guiding channel and the pressure relief hole are provided on two opposite side walls of the housing of the acoustic output device. The third acoustic output device further includes at least one tuning hole, which is provided at a side wall where the pressure relief hole is located. The third acoustic output device may be the same as or similar to the acoustic output device 600 in FIG. 6. Different from the second acoustic output device, the volume of the second chamber of the third acoustic output device is smaller than the volume of the second chamber of the second acoustic output device.

Figure 28:
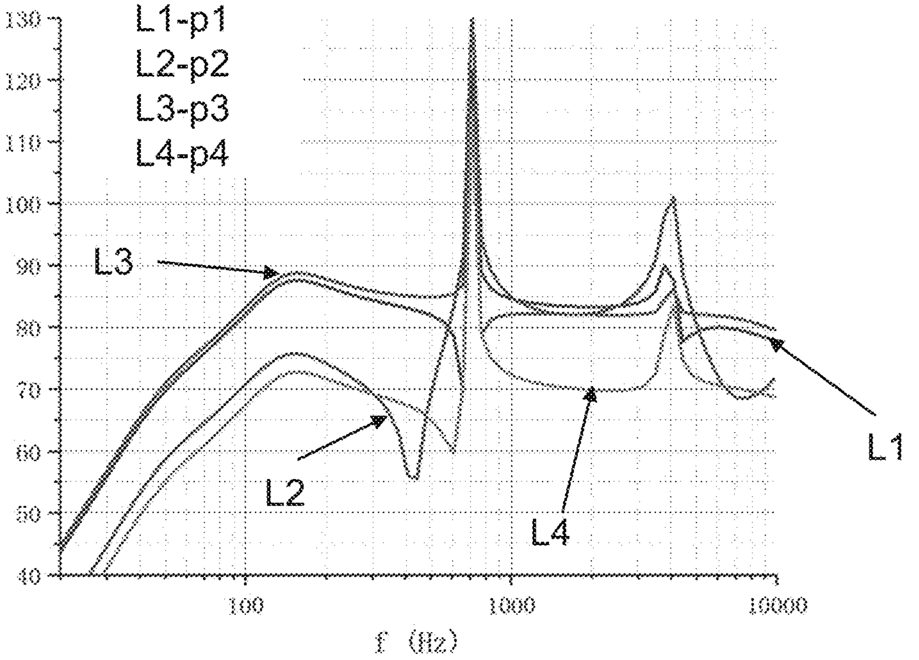
FIG. 28 is a schematic diagram illustrating leakage frequency response curves of an acoustic output device at different positions in FIG. 22 according to some embodiments of the present disclosure.

As shown in FIG. 28, leakage frequency response curves of a fourth acoustic output device including a sound guiding channel and a pressure relief hole at positions P1-P4 of FIG. 24 are L1-L4, respectively, wherein the sound guiding channel and the pressure relief hole are provided on two opposite side walls of the housing of the acoustic output device. The fourth acoustic output device further includes at least one tuning hole, which is provided at a side wall where the pressure relief hole is located. The fourth acoustic output device may be the same as or similar to the acoustic output device 600 as described in FIG. 6. Different from the second acoustic output device, the sound guiding channel and the pressure relief hole may be communicated through the tuning hole. It can also be understood that the pressure relief hole and the acoustic tuning hole are not through-holes.

Figure 29:
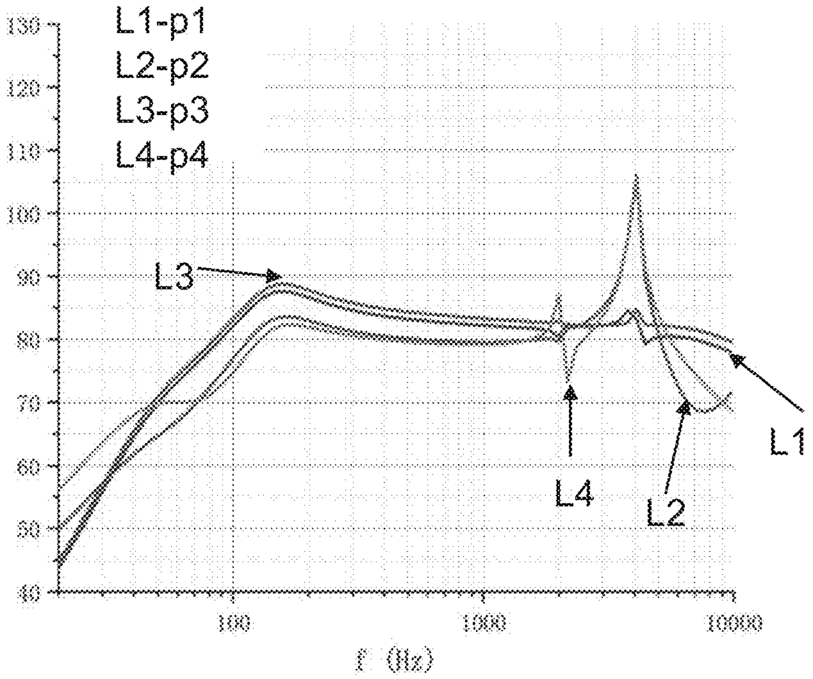
FIG. 29 is a schematic diagram illustrating leakage frequency response curves of an acoustic output device at different positions in FIG. 22 according to some embodiments of the present disclosure.

As shown in FIG. 29, leakage frequency response curves of a fifth acoustic output device including a sound guiding channel and a first pressure relief hole at positions P1-P4 of FIG. 24 are L1-L4, respectively, wherein the sound guiding channel and the first pressure relief hole are provided at two opposite side walls of the housing of the acoustic output device. The fourth acoustic output device further includes at least one tuning hole, which is provided at a side wall where the first pressure relief hole is located. The fourth acoustic output device may be the same as or similar to the acoustic output device 600 as described in FIG. 6. The sound guiding channel and the first pressure relief hole are communicated through the tuning hole. It can also be understood that the first pressure relief hole and the tuning hole are not through-holes. Different from the fourth acoustic output device, the fifth acoustic output device also includes a second pressure relief hole, which is provided at the side wall where the first pressure relief hole is located. The second pressure relief hole is a through-hole.

Figure 30:
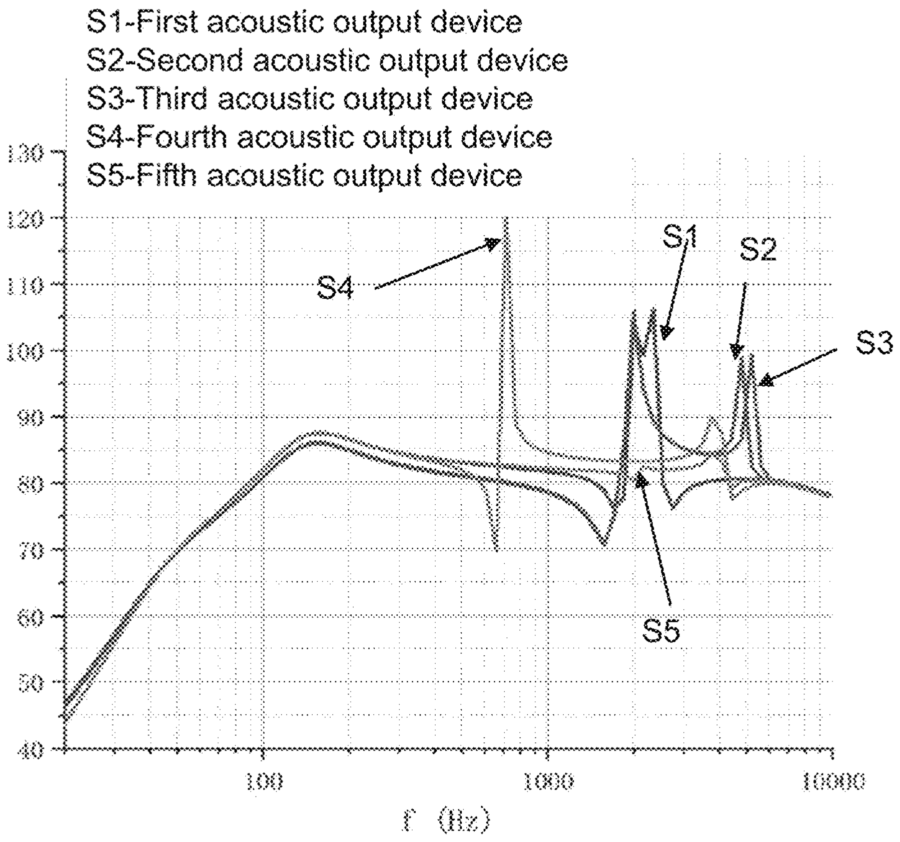
FIG. 30 is a schematic diagram illustrating leakage frequency response curves of different acoustic output devices at the same position in FIG. 22 according to some embodiments of the present disclosure.
Figure 31:
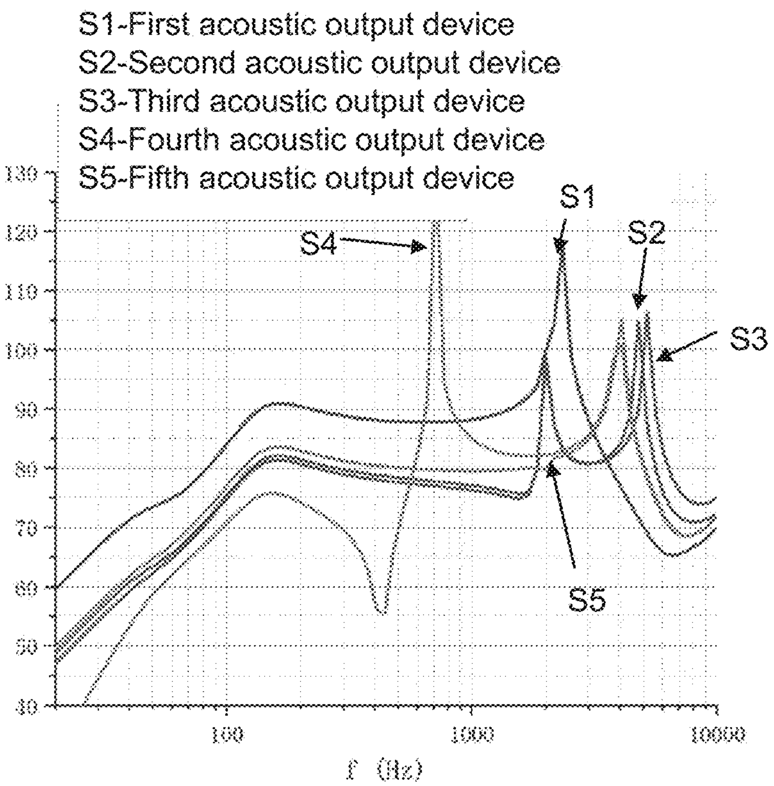
FIG. 31 is a schematic diagram illustrating leakage frequency response curves of different acoustic output devices at the same position in FIG. 22 according to some embodiments of the present disclosure.
Figure 32:
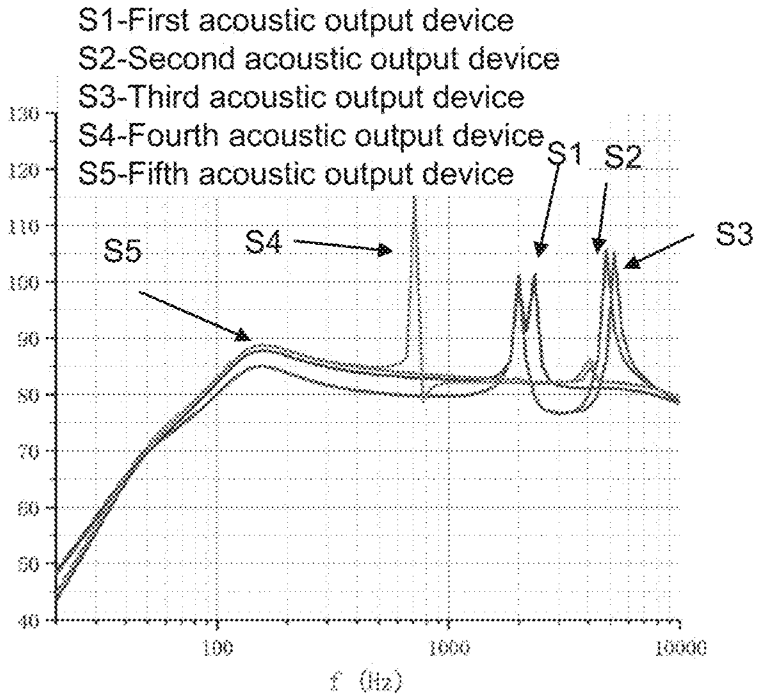
FIG. 32 is a schematic diagram illustrating leakage frequency response curves of different acoustic output devices at the same position in FIG. 22 according to some embodiments of the present disclosure.
Figure 33:
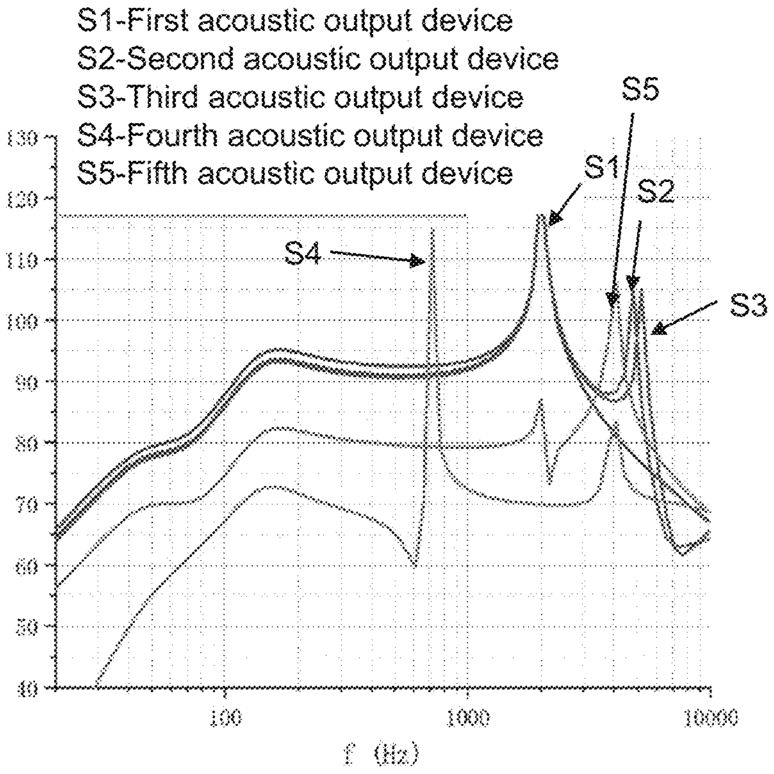
FIG. 33 is a schematic diagram illustrating leakage frequency response curves of different acoustic output devices at the same position in FIG. 22 according to some embodiments of the present disclosure.

FIGS. 30-33 are schematic diagrams illustrating leakage frequency response curves of different acoustic output devices at the same position in FIG. 22 according to some embodiments of the present disclosure. The leakage frequency response curves S1-S5 shown in FIGS. 30-33 respectively represent the variation of the sound leakage of different acoustic output devices at each of positions P1-P4 of FIG. 24 with the frequency of the sound signal. As shown in FIG. 30, the leakage frequency response curves of the first acoustic output device, the second acoustic output device, the third acoustic output device, the fourth acoustic output device, and the fifth acoustic output device in FIGS. 25-29 at position P1 are S1-S5, respectively. As shown in FIG. 31, the leakage frequency response curves of the first acoustic output device, the second acoustic output device, the third acoustic output device, the fourth acoustic output device, and the fifth acoustic output device in FIGS. 25-29 at position P2 are S1-S5, respectively. As shown in FIG. 32, the leakage frequency response curves of the first acoustic output device, the second acoustic output device, the third acoustic output device, the fourth acoustic output device, and the fifth acoustic output device in FIGS. 25-29 at position P3 are S1-S5, respectively. As shown in FIG. 33, the leakage frequency response curves of the first acoustic output device, the second acoustic output device, the third acoustic output device, the fourth acoustic output device, and the fifth acoustic output device in FIGS. 25-29 at position P4 are S1-S5, respectively.

Referring to FIG. 25, in the leakage frequency response curves L1-L4 of the first acoustic output device excluding the tuning hole at different positions P1-P4, in particular, the leakage frequency response curve L1 corresponding to the front side position P1 and the leakage frequency response curve L3 corresponding to the rear side position P3 include a first peak at a frequency of about 2000 Hz and a second peak at a frequency of about 2200 Hz, respectively. The first peak at the frequency of about 2000 Hz may be caused by the first chamber of the first acoustic output device, and the second peak at the frequency of about 2200 Hz may be caused by the second chamber of the first acoustic output device. Referring to FIG. 26, in the leakage frequency response curves L1-L4 of the second acoustic output device including the tuning hole at different positions P1-P4, in particular, the leakage frequency response curve L1 corresponding to the front side position P1 and the leakage frequency response curve L3 corresponding to the rear side position P3 include a first peak at a frequency of about 2000 Hz and a second peak at a frequency of about 4800 Hz, respectively. Comparing the leakage frequency response curves L1-L4 of the first acoustic output device and the second acoustic output device, the tuning hole may cause the second peak caused by the second chamber to be shifted toward high frequency. Thus, the tuning hole may increase the resonance frequency of the air in the second chamber (i.e., the frequencies corresponding to the peaks of the leakage frequency response curves L1-L4). As shown in FIGS. 30-33, by comparing the leakage frequency response curve S1 of the first acoustic output device with the leakage frequency response curve S2 of each of the second acoustic output devices in FIGS. 30-33, the sound leakage of the second acoustic output device at position P2 (i.e., the position around the sound guiding channel) may be taken as the sound leakage of the tuning hole, but the sound leakage of the second acoustic output device at other positions (e.g., P1, P3, and P4) does not change significantly.

Referring to FIG. 27, the leakage frequency response curves L1-L4 of the third acoustic output device at different positions P1-P4 include a first peak and a second peak. The volume of the second chamber of the third acoustic output device is smaller than the volume of the second chamber of the second acoustic output device. Comparing the leakage frequency response curves L1-L4 of the second acoustic output device and the third acoustic output, it can be inferred that the second peak resulting from the second chamber shown in FIG. 26 is shifted toward high frequency relative to the smaller volume of the second chamber shown in FIG. 27. As shown in FIGS. 30-33, by comparing the leakage frequency response curve S2 of the second acoustic output device with the leakage frequency response curve S3 of the third acoustic output device at each of positions P1, P2, P3, and P4, the sound leakage of the third acoustic output device at each of positions P1, P2, P3, and P4 does not vary with the volume of the second chamber.

As shown in FIG. 28, the leakage frequency response curves L1-L4 of the fourth acoustic output device including the sound guiding channel, the pressure relief hole, and the tuning hole communicated with each other may include a first peak with a frequency of about 700 Hz and a second peak with a frequency of more than 1000 Hz. Comparing the leakage frequency response curves L1-L4 of the fourth acoustic output device and the fifth acoustic output device, it can be inferred that the first peak in FIG. 28 is shifted toward low frequency, which is caused by a larger chamber volume due to the communication of the first and second chambers. As shown in FIGS. 30-33, by comparing the leakage frequency response curve S4 of the fourth acoustic output device and the leakage frequency response curve S5 of the fifth acoustic output device, the sound leakage of the fourth acoustic output device at positions P2 and P4 (i.e., the positions of the sound guiding channel and the pressure relief hole) decreases significantly, especially in the mid-low frequency.

Referring to FIG. 29, the leakage frequency response curves L1-L4 of the fifth acoustic output device including the sound guiding channel, the first pressure relief hole, the second pressure relief hole, and the communicated pressure regulation hole may include a first peak and a second peak. Comparing the leakage frequency response curves L1-L4 of the second acoustic output device and the fifth acoustic output, it can be inferred that the second peak in FIG. 29 is shifted toward high frequency. As shown in FIGS. 30-33, comparing the leakage frequency response curve S2 of the second acoustic output device and the leakage frequency response curve S5 of the fifth acoustic output device, the sound leakage of the fifth acoustic output device does not change significantly at position P2 (i.e., around the sound guiding channel) and decreases significantly at position P4 (i.e., around the second pressure relief hole) relative to the second acoustic output device.

The basic concepts have been described above, apparently, in detail, as will be described above, and do not constitute limitations of the disclosure. Although there is no clear explanation here, those skilled in the art may make various modifications, improvements, and modifications of the present disclosure. This type of modification, improvement, and corrections are recommended in the present disclosure, so the modification, improvement, and the amendment remain in the spirit and scope of the exemplary embodiment of the present disclosure.

At the same time, the present disclosure uses specific words to describe the embodiments of the present disclosure. As "one embodiment," "an embodiment," and/or "some embodiments" mean a certain feature, structure, or characteristic of at least one embodiment of the present disclosure. Therefore, it is emphasized and should be appreciated that two or more references to "an embodiment" or "one embodiment" or "an alternative embodiment" in various parts of the present disclosure are not necessarily all referring to the same embodiment. Further, certain features, structures, or features of one or more embodiments of the present disclosure may be combined.

Further, it can be understood by those skilled in the art that aspects of the present disclosure can be illustrated and described by a number of patentable categories or situations, including any new and useful combination of processes, machines, products, or substances, or any new and useful improvement thereof. Accordingly, aspects of the present disclosure may be performed entirely by hardware, may be performed entirely by software (including firmware, resident software, microcode, etc.), or may be performed by a combination of hardware and software. Any of the above hardware or software may be referred to as a "data block," "module," "engine," "unit," "component," or "system." In addition, aspects of the present disclosure may be represented as a computer product located in one or more computer-readable media that includes computer-readable program code.

The computer storage medium may contain a propagated data signal with a computer program encoded within it, for example on a baseband or as part of a carrier wave. The propagation signal may have a variety of manifestations, including an electromagnetic form, an optical form, or the like, or a suitable combination. The computer storage medium may be any computer-readable medium other than a computer-readable storage medium that may be connected to an instruction execution system, device, or apparatus to enable communication, propagation, or transmission of a program for use. The program code located on the computer storage medium may be transmitted via any suitable medium, including radio, cable, fiber optic cable, RF, or similar medium, or any combination of the foregoing.

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only scheme, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially." Unless otherwise stated, "approximately," "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. An acoustic output device comprising:

a bone conduction acoustic assembly used to generate a bone conduction sound wave;

an air conduction acoustic assembly used to generate an air conduction sound wave; and a housing used to accommodate at least a portion of elements of the bone conduction acoustic assembly and the air conduction acoustic assembly, the housing including a first chamber and a second chamber, the first chamber being used to accommodate at least a portion of the bone conduction acoustic assembly, the housing being provided with a sound outlet communicated with the second chamber, the air conduction sound wave being transmitted to an outside of the acoustic output device via the sound outlet, wherein the housing is further provided with at least one pressure relief hole communicated with the first chamber, the at least one pressure relief hole includes a first pressure relief hole and a second pressure relief hole, the first pressure relief hole is provided farther away from the sound outlet than the second pressure relief hole, and an effective area of an outlet end of the first pressure relief hole is larger than an effective area of an outlet end of the second pressure relief hole;

a frequency response curve of the air conduction sound wave having at least one resonance peak, a peak resonance frequency of the at least one resonance peak being greater than or equal to 1 kHz, wherein the housing is further provided with at least one tuning hole communicated with the second chamber, and the peak resonance frequency of the at least one resonance peak when the at least one tuning hole is in an open state is shifted to high frequency compared to the peak resonance frequency of the at least one resonance peak when the at least one tuning hole is in a closed state;

the housing includes a first side wall and a second side wall disposed on opposite sides of the bone conduction acoustic assembly, and the at least one tuning hole includes a first tuning hole, the sound outlet and the first tuning hole being disposed on the first side wall and the second side wall, respectively;

the housing further includes a third side wall and a fourth side wall connecting the first side wall and the second side wall and spaced apart from each other, and the at least one tuning hole further includes a second tuning hole, the second tuning hole being provided on the third side wall or the fourth side wall;

an effective area of an outlet end of the first tuning hole is larger than an effective area of an outlet end of the second tuning hole; or an actual area of the outlet end of the first tuning hole is larger than an actual area of the outlet end of the second tuning hole.

2. The acoustic output device of claim 1, wherein the sound outlet and the first pressure relief hole is provided on the first side wall and the second side wall, respectively, and the second pressure relief hole is provided on the third side wall or the fourth side wall.

3. The acoustic output device of claim 2, wherein the at least one pressure relief hole further includes a third pressure relief hole, the effective area of the outlet end of the second pressure relief hole is larger than an effective area of an outlet end of the third pressure relief hole, and the second pressure relief hole and the third pressure relief hole are provided on the third side wall and the fourth side wall, respectively.

4. The acoustic output device of claim 1, wherein the at least one tuning hole and the at least one pressure relief hole form at least one pair of adjacent holes, each pair of adjacent holes including one of the at least one tuning hole and one of the at least one pressure relief hole arranged adjacent to each other, and an interval distance between the tuning hole and the pressure relief hole in each pair of adjacent holes is less than or equal to 2 mm.

5. The acoustic output device of claim 4, wherein in each pair of adjacent holes, an effective area of an outlet end of the pressure relief hole is greater than an effective area of an outlet end of the sound tuning hole.

6. The acoustic output device of claim 1, further including:

a sound conduction component connected to the housing, the sound conduction component being provided with a sound guiding channel, the sound guiding channel being communicated with the sound outlet and being used to guide the air conduction sound wave to the outside of the acoustic output device.

7. The acoustic output device of claim 6, wherein an effective area of an outlet end of the sound guiding channel being greater than or equal to a sum of an effective area of an outlet end of each of the at least one pressure relief hole communicated with the first chamber on the housing.

8. The acoustic output device of claim 6, wherein an effective area of an outlet end of the sound guiding channel is greater than an effective area of an outlet end of each tuning hole in the at least one tuning hole.

9. The acoustic output device of claim 8, wherein the effective area of the outlet end of the sound guiding channel is greater than a sum of an effective area of the outlet end of each of the at least one tuning hole.

10. The acoustic output device of claim 1, wherein the bone conduction acoustic assembly includes a magnetic circuit system and a coil assembly, wherein the magnetic circuit system forms a magnetic gap, the coil assembly is provided in the first chamber and extends into the magnetic gap, and the coil assembly being provided with at least one communication hole.

11. The acoustic output device of claim 10, wherein the at least one communication hole is located on a portion of the coil assembly located outside the magnetic gap.

12. The acoustic output device of claim 11, wherein the coil assembly includes a coil and a coil support, the coil support being used to connect the coil to the housing and to make the coil extend into the magnetic gap, the at least one communication hole being provided on the coil support.

13. The acoustic output device of claim 12, wherein the bone conduction acoustic assembly further includes an elastic element located in the first chamber, a central region of the elastic element is connected to the magnetic circuit system, and a peripheral region of the elastic element is connected to the housing, thereby suspending the magnetic circuit system within the housing.

14. The acoustic output device of claim 1, further including:

a communication channel communicating the first chamber with the second chamber, a peak resonance frequency of the at least one resonance peak when the communication channel is in an open state being shifted to high frequency compared to the peak resonance frequency of the at least one resonance peak when the communication channel is in a closed state, an offset to high frequency being greater than or equal to 500 Hz.

15. The acoustic output device of claim 14, wherein the communication channel being provided outside of the housing and connecting the pressure relief hole and the tuning hole.

* * * * *